(12) United States Patent
Waelbroeck et al.

(10) Patent No.: US 7,778,919 B2
(45) Date of Patent: *Aug. 17, 2010

(54) METHOD FOR MANAGING DISTRIBUTED TRADING DATA

(75) Inventors: Henri Waelbroeck, Scarsdale, NY (US); Fred J. Federspiel, Larchmont, NY (US); John E. Lopez, Nesconset, NY (US)

(73) Assignee: Pipeline Financial Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/463,886

(22) Filed: May 11, 2009

(65) Prior Publication Data

US 2009/0281954 A1      Nov. 12, 2009

Related U.S. Application Data

(63) Continuation of application No. 10/310,345, filed on Dec. 5, 2002, now Pat. No. 7,565,313.

(51) Int. Cl.
*G06Q 40/00*      (2006.01)
(52) U.S. Cl. .................................................. 705/37
(58) Field of Classification Search ............. 705/36–38, 705/99

See application file for complete search history.

(56) References Cited

U.S. PATENT DOCUMENTS

| | | | |
|---|---|---|---|
| 5,136,501 | A | 8/1992 | Silverman et al. |
| 5,689,652 | A | 11/1997 | Lupien et al. |
| 5,717,989 | A | 2/1998 | Tozzoli et al. |

(Continued)

FOREIGN PATENT DOCUMENTS

WO          01/61579 A1     8/2001

OTHER PUBLICATIONS

Securities Trade Matching. Hernan Astudillo. Financial System Architects. OOPSLA'2001 Design Fest.*

(Continued)

*Primary Examiner*—Hani Kazimi
*Assistant Examiner*—Clifford Madamba
(74) *Attorney, Agent, or Firm*—Cowan, Liebowitz & Latman; Steven D. Underwood

(57) ABSTRACT

In a preferred embodiment, the invention comprises a computer-implemented system and method of managing market information across a network of data providers, comprising the steps of: (a) electronically receiving first data including confidential information regarding market participants in a first system that protects said first data behind a firewall; (b) electronically receiving second data including confidential information regarding market participants in a second system that protects said second data behind a firewall; (c) electronically receiving an order and targeting parameters from a first market participant; (d) electronically issuing an advertisement request message to said first system and said second system, said advertisement message comprising display attributes of said order and comprising said targeting parameters; (e) electronically prompting said first system and said second system via the advertisement request message to each send a coordination request message to a Coordination Hub, said coordination request message comprising information deduced from said confidential information regarding market participants in said first and second systems, wherein the selection of the information that is sent to the Coordination Hub is based at least in part on said first market participant's targeting parameters; (f) electronically prompting based on the coordination request message said Coordination Hub to issue permissions to advertise the order to selected market participants, wherein market participants are selected based, at least in part, on said received information regarding market participants; and (g) electronically prompting based on the permission to advertise the order said first system and said second system to route information about said order from first participant to said selected market participants.

205 Claims, 7 Drawing Sheets

U.S. PATENT DOCUMENTS

| | | | |
|---|---|---|---|
| 5,724,524 | A | 3/1998 | Hunt et al. |
| 5,724,525 | A | 3/1998 | Beyers, II et al. |
| 5,794,207 | A | 8/1998 | Walker et al. |
| 5,842,178 | A | 11/1998 | Giovannoli |
| 5,845,266 | A | 12/1998 | Lupien et al. |
| 5,873,071 | A | 2/1999 | Ferstenberg et al. |
| 5,924,082 | A | 7/1999 | Silverman et al. |
| 5,950,177 | A | 9/1999 | Lupien et al. |
| 6,236,979 | B1 | 5/2001 | Kawabata et al. |
| 6,260,025 | B1 | 7/2001 | Silverman et al. |
| 6,285,983 | B1 | 9/2001 | Jenkins |
| 6,285,984 | B1 | 9/2001 | Speicher |
| 6,304,858 | B1 | 10/2001 | Mosler et al. |
| 6,317,728 | B1 | 11/2001 | Kane |
| 6,321,212 | B1 | 11/2001 | Lange |
| 6,408,282 | B1 | 6/2002 | Buist |
| 6,421,653 | B1 | 7/2002 | May |
| 6,578,014 | B1 | 6/2003 | Murcko, Jr. |
| 6,766,304 | B2 | 7/2004 | Kemp, II et al. |
| 6,772,132 | B1 | 8/2004 | Kemp, II et al. |
| 6,938,011 | B1 | 8/2005 | Kemp, II et al. |
| 6,985,883 | B1 | 1/2006 | Togher et al. |
| 7,003,486 | B1 | 2/2006 | Condamoor et al. |
| 7,035,819 | B1 | 4/2006 | Gianakouros et al. |
| 7,130,823 | B1 * | 10/2006 | Rayner et al. ............... 705/37 |
| 7,136,834 | B1 | 11/2006 | Merrin et al. |
| 7,162,447 | B1 | 1/2007 | Cushing |
| 2002/0035534 | A1 | 3/2002 | Buist et al. |
| 2002/0046146 | A1 | 4/2002 | Otero et al. |
| 2002/0046149 | A1 | 4/2002 | Otero et al. |
| 2002/0046151 | A1 | 4/2002 | Otero et al. |
| 2002/0049661 | A1 | 4/2002 | Otero et al. |
| 2002/0082967 | A1 | 6/2002 | Kaminsky et al. |
| 2002/0133449 | A1 | 9/2002 | Segal et al. |
| 2003/0004859 | A1 | 1/2003 | Shaw et al. |
| 2003/0009411 | A1 | 1/2003 | Ram et al. |
| 2003/0093343 | A1 * | 5/2003 | Huttenlocher et al. ......... 705/35 |
| 2004/0193524 | A1 | 9/2004 | Almeida et al. |
| 2004/0236669 | A1 | 11/2004 | Horst et al. |
| 2005/0004852 | A1 | 1/2005 | Whitney |
| 2006/0020538 | A1 | 1/2006 | Ram et al. |
| 2006/0080215 | A1 | 4/2006 | Warsaw et al. |
| 2006/0259394 | A1 | 11/2006 | Cushing et al. |
| 2010/0030720 | A1 | 2/2010 | Stephens |

OTHER PUBLICATIONS

Order Preferencing, Adverse-Selection Costs, and the Probability of Information-Based Trading. Kee H. Chung, Chairat Chuwonganant, D. Timothy McCormick. Springer Science + Business Media, LLC 2006.*

U.S. Appl. No. 09/504,939, filed Feb. 16, 2000, Christopher R. Stephens.

A Paper presented in Maastricht NL Aug. 2004: Harald A. Benik et al. "A Study of Neo-Austrian Economics using an Artificial Stock Market" pp. 1-41.

Artificial Life, vol. 4, No. 2, pp. 183-201: Christopher R. Stephens et al. "Self-Adaptation in Evolving Systems" (Spring 1998).

Jose L. Gordillo et al. "Analysis of Financial markets with the Artificial Agent-based Model—NNCP*'" pp. 1-10 (ENC01 (INEGI), pp. 251-263 (2001).

Christopher R. Stephens et al. "Testing Efficiency in a Simulated Market using Excess Returns" pp. 1-17 (publication date unknown).

Handbook of Marketing Research—Uses, Misuses, and Future Advances, eds Grover & Vriens (Sage Publications) Christopher R. Stephens et al. "An Introduction to Data Mining" pp. 1-39 (published Jun. 23, 2006).

Genetic Programming and Evolvable Machines, vol. 1, pp. 363-378, Christopher R. Stephens et al. "Effective Fitness as an Alternative Paradigm for Evolutionary Computation I: General Formalism" (Oct. 2001).

Genetic Programming and Evolvable Machines, vol. 2, pp. 7-32, Christopher R. Stephens et al. "Effective Fitness as an Alternative Paradigm for Evolutionary Computation II: Examples and Applications" (Mar. 2001).

J. D. Farmer and N. Zamani, "Mechanical vs. Informational Components of Price Impact," 2006; http://www.santafe.edu/research/publications/workingpapers/ 06-09-034.pdf; pp. 1-19.

Madden, Bartley J., "Structural Changes in Trading Stocks," The Journal of Portfolio Management, Fall 1993, pp. 19-27.

Domowitz, I., "A Taxonomy of Automated Trade Execution Systems," Journal of International Money and Finance of Butterworth Scientific, Guilford, GB, vol. 12, 1993, pp. 607-632.

* cited by examiner

FIG. 4

TARGETING FORM

LIQUIDITY TRACKER ROUTING PARAMETERS

FIND ACTIVE CONTRA TRADERS

[ 1 ] MARKET MAKERS

[   ] LIQUIDITY TRACKER TRADERS

SEND [O]s TO [   ] SPONSORED INSTITUTIONS

☐ CYCLE ADD RECIPIENT EVERY [   ] SECONDS

☐ LIMIT SEARCH TO TRADES IN PAST [   ] MINUTES

OK

CANCEL

FIG.5

METHOD FOR MANAGING DISTRIBUTED TRADING DATA

CROSS REFERENCE TO RELATED APPLICATIONS

This application is a continuation of U.S. patent application Ser. No. 10/310,345, filed Dec. 5, 2002, entitled "METHOD FOR MANAGING DISTRIBUTED TRADING DATE," currently pending which claims priority to U.S. Provisional Application No. 60/336,775 filed Dec. 5, 2001, and U.S. Provisional Application No. 60/400,467, filed Aug. 1, 2002. The entire contents of each application are incorporated herein by reference.

BACKGROUND OF THE INVENTION

In the securities markets, market mechanics and trading psychology create high costs to the disclosure of information required for any efficient search for a contra party for a large trade. By publicly revealing his intentions, a market participant assumes the risks of adverse price action.

In a co-pending application, U.S. patent application Ser. No. 09/870,849, "A Method for Directing and Executing Certified Trading Interests," filed May 31, 2001 (the entire contents of which are incorporated herein by reference for all purposes), a system is described for using confidential market data to route information about Previously Presented live, confidential orders specifically to likely contras, based on certified trading interest information such as the trades a possible target has recently executed. This system is particularly well-suited when data is naturally aggregated at a particular market center, as is the case for members of a stock market or an exchange, known as "sell-side" firms.

Sell-side firms typically represent a plurality of clients on the "buy-side"—the end buyers or sellers of the security. Each buy-side client normally works through multiple sell-side firms as the client is working its orders, so there is no central repository of buy-side trading data, short of the Depository Trust & Clearing Corporation (DTCC)—a holding company whose subsidiaries provide clearance, settlement, and custody of investment transactions in the U.S.

One known method for routing information about orders to buy-side clients is the use of Indications of Interest (IOIs) by brokers. AutEx, for example, offers a bulletin board for posting IOIs and supports targeting IOIs to specific groups of buy-side firms. One problem with this IOI system is that there is no incentive for brokers issuing IOIs to target them precisely to firms that have a genuine interest in the contra side of the order, since this is primarily an advertising mechanism for their firm to display activity in a particular security. It also offers no mechanism for targeting based on data pooled across multiple brokers. There is also no incentive for brokers to remove IOIs after they have been issued, even after the original order has been canceled or executed, because it is always in the broker's interest to receive a call about an IOI even if there is no longer an executable order on the opposite side. So recipients of IOIs generally attach little value to them and will avoid leaking information by calling up a broker about them.

Some Electronic Communications Networks (ECNs) let their users post IOIs about individual live executable orders, but said ECNs do enable routing based on aggregate trading information. For example, they do not anticipate a system that enables users to route IOIs based upon the potential targets' net trading position, counting a plurality of trades. They also do not anticipate a system that enables routing based upon information provided on an as-needed basis by multiple data providers that wish to keep their data within their own facilities, and protected behind an electronic firewall. They do not enable an auction server or matching engine to route IOIs through routing engines installed at said data providers that maintain the confidentially of said data providers' clients to said matching engine or auction server. Said ECNs' IOI systems also do not anticipate a system wherein the IOIs are automatically removed when the underlying order was filled or canceled, becoming in effect closer to a private quote and hence of greater interest to the recipient. These systems also do not anticipate that said live executable orders may be held in a separate matching engine or auction server wherein said orders are not exposed to the order flow through said ECN's matching book, or wherein said orders are not subject to losing execution priority to a small better-priced order on said ECN's matching book, in the practice known in the art as "penny jumping", or wherein a recipient of the IOI may enter a large Immediate Or Cancel (IOC) order that can only be executed against the advertised order, leaving any residual size unfilled and without leaking information to other users of said ECN. Existing ECN-based IOI systems also do not anticipate providing their users the additional benefit of being informed when there was a contra in the security that satisfied the routing parameters and order attributes on said users' orders, to enable the users that enter said orders to know when an IOI was indeed routed.

LiquidNet has recently been launched to facilitate the discovery of natural counterparties to a trade through information contained in buy-side Order Management Systems. Although this approach offers the benefit of using buy-side trading information that resides behind the Institutions' firewalls, it does not anticipate a system that lets the order entry participant request that the order be routed only based upon certified trading interest information, whether said certification is based upon the reporting of trades for clearing purposes or the entering of a live electronically executable order in a matching book with parameters that ensure that it is reasonably likely to be executed based upon the rules of said matching book. Instead, LiquidNet users must trust the integrity of the data, which pertains to the same buy-side firm that stands to benefit from receiving information about orders. The temptation therefore exists for an ill-intentioned firm to put "fake" data in the system, such as an order that the firm does not presently intend to execute, for the purpose of attracting information about parties that may have a large order on the opposite side. Another important problem with the LiquidNet model is that it uses one firm's information to route information to another firm (an invitation to negotiate); this leaks confidential information from the Order Management System, and this is unacceptable to most large buy-side institutions. To cope with these problems LiquidNet uses a "country club" approach of limiting its subscriber list to a certain class of relatively tame buy-side firms, excluding for example most hedge funds and other potentially aggressive parties. Since this club consists of like-minded players who tend to be trading on the same type of information, there is less opportunity for differences in stock valuation and hence relatively few trading opportunities.

SUMMARY OF THE INVENTION

The present invention implements a search for counterparties across a plurality of data providers. In the preferred embodiment the system comprises a matching engine or auction server and a plurality of network-connected computer systems, called "routing engines", and/or interfaces to remote databases, collectively called "data providers." A search is initiated when a first participant enters an order to buy or sell a given security into the matching engine or auction server, and requests that this order be advertised to counter-parties that have expressed a trading interest on the contra side. The system preferably defines a protocol for specifying such advertisement requests with a few parameters; for example, the first participant will type the characters "B2" in a text message field to indicate that the order should be advertised to the two buy-side firms that have most recently traded 10,000 shares net on the contra side in the given security. If the first participant does not specify such parameters, the system preferably inserts default advertisement parameters.

A search for counter-parties is preferably implemented in a manner that provides benefits to each participating data provider as well as to end parties that receive information about orders. The search preferably is based on two principles: the first is that the end target's information is used only to determine when it should receive information about a Previously Presented order. The second is that the interests of a party that provides data are protected. This second principle preferably is implemented by enabling data providers to elect to participate in one of two possible ways. The first type of data provider will keep its data behind a firewall and allow access to said data on an "as needed" basis—only for the purpose of executing a specific type of query request, and only when said query request is directly related to a revenue-generating opportunity, such as the possibility of facilitating a successful trade or of being party to such a trade. For example, the query may be requested for the purpose of advertising a live, electronically-executable order, and return only the identity of the firm that has most recently bought at least 10,000 shares, the time interval during which this accumulation has taken place, and the list of fills that the firm has received on both sides of the security in said time interval. The system preferably provides an Applications Programming Interface (API) that allows data participants of this type to develop their own software application that will work behind their firewall and process the query requests. The data returned in response to a query may be stored together with similar data from other data providers for the purpose of executing a query to implement the first participant's instructions on how to find likely contra parties—for example, by identifying the two firms that have most recently accumulated 10,000 shares. The second type of data provider also keeps their trade data behind a firewall and further elects to keep the identity of the end client permanently masked from the matching engine or auction server issuing the query request. For example, it may be a broker with an established sales channel to the end user. This second type of data provider hosts a subsystem, referred to herein as a "routing engine," that resides behind a firewall and protects the confidentially of the data it accesses by intermediating subsequent communications between the matching engine or auction server and the end client.

The system preferably enables a first participant entering an order to request a search for likely contras by combining the results of queries at a plurality of databases to produce a distribution list for displaying said first participant's order. When all data providers allow the identity of the end client to be returned, the requesting system preferably asks for and receives all the data that is required to compute said distribution list. When one or more data providers do not wish to disclose the identity of the client that satisfies the query parameters, but instead host a routing engine that will intermediate further communications with their client, each such routing engine will preferably determine based upon the query type whether or not a given target must be validated by combining data across the whole network of databases using a central Coordination Hub service. For example, a first participant request to advertise the order to the two firms that have sold the largest net amount of the given stock in the current trading day requires validation since a single routing engine cannot know if its ranks among the top two firms across the network. If targets must be validated across the network, each routing engine will report to said Coordination Hub, providing only the minimal information that is required to determine the rank of its targets in the distribution list. An example of a query request that does not require validation across a plurality of databases is one where the first participant has requested that the order be shown to the party that took part in a prior trade between the same two parties. The matching engine receives the first participant's order, and asks the routing engine that was involved in the prior trade to notify its client that this Previously Presented order is available. Another example of a query type that requires validation is one mentioned previously where the first participant has requested that the order be displayed to the two parties that have most recently accumulated 10,000 shares on the contra side. In this example, each routing engine will return the timestamps of the targets that have to its knowledge most recently traded 10,000 shares net, but will not disclose the identities of the parties. The Coordination Hub determines which two proposed targets win the contest for "most recently" accumulating 10,000 shares, and responds to each routing engine with a message authorizing that routing engine to display the first participant's order only to its winning target(s).

Once the contra parties have been identified, the preferred auction server or matching engine issues a message containing information about the first participant's order as instructed by order display attributes attached to the first participant's order. The message is routed to a second participant and possibly others as determined by the advertising instructions in the first participant's order, through any routing engines that may have facilitated the process of discovering the identity of the second participant. The second participant preferably is enabled to enter a response order, which is then routed back to the matching engine or auction server through the same channel that delivered the IOI message to said second participant. The auction server or matching engine then preferably matches and executes orders as instructed by the order attributes and reports the trade status back to the first and second participants. For example, in a call auction the first participant order contains the time of the call, which is displayed to the second participant through the IOI message. The second participant's order is stored in an auction book, and at the time of the auction call, all orders received are matched using the auction's rules. For example, the auction match can be a Dutch auction, as is known in the art. In another example, the orders are placed in a matching engine that checks all orders on arrival to see if they match with a previously entered order, and if so executes the corresponding trades; in this embodiment orders are processed on a first come first served basis. Other examples of matching engine or auction server designs will be comprehended by those skilled in the art, and/or are described in co-pending U.S. patent application Ser. No. 09/870,849.

In an extension of the preferred embodiment, the routing engines may themselves externalize query requests to third-party data repositories, such as for example the databases of buy-side Order Management Systems (OMS). If multiple routing engines have access to the same third-party database and need to validate targets with the Coordination Hub, they will preferably use a common key to identify the end client to the Coordination Hub, so that Coordination Hub knows that the targets proposed by two routing engines are one and the same and therefore should only be counted once. A trusted key provider preferably provides the key on a "fire-and-forget" basis, so the Coordination Hub cannot infer the identity of the client by correlating information from multiple events.

The system preferably enables the optional aggregation of data from a plurality of routing engines. If a routing engine opts to allow the Coordination Hub to aggregate its data with data from other (perhaps similar) routing engines, it requests a key from the trusted key provider named in the query request message and identifies its clients to the Coordination Hub using this key. The key is used to mask the true identity of the proposed targets to the Hub, while at the same time enabling the Coordination Hub to determine when potential targets being proposed by two different query engines are in fact one and the same. In query requests with aggregation, each participating routing engine preferably reports detailed data to the Coordination Hub, so the Hub can combine data from multiple data providers to determine the best targets. For example the data reported may be a list of fills pertaining to Institutions that are alleged to be likely contras for the first participant's order, and the Hub ranking is performed based upon a query in an aggregate table where fills from the same Institution may have been entered by a plurality of routing engines. The ability to anonymously aggregate trading interest information from multiple sources helps to avoid potential misuse of the system by unscrupulous parties who might indicate a buy interest in one place and compensate with a sell interest in another, effectively combining the two to attract information about orders on both sides. Due to this potential gaming problem, and also due to the fact that large buy-side institutions spread their trading data across a plurality of brokers that stand to participate as data providers in the present system, there is clearly multiplicative value in being able to aggregate buy-side trading interest information across a plurality of databases. Large brokers such as Goldman Sachs use this to their advantage through the work of their sales desk, maximizing internalization rates. ECNs in effect face the same situation when they seek to achieve "critical mass." For example, Instinet is able to charge a greater fee for accessing the liquidity on its book because of its depth of institutional liquidity In the business of finding a contra for a large order, this points to a potential for creating a "natural monopoly" in brokerage data management, if this can be conceived as a service to all. The DTCC, for example, has the required data to perform such a function. It has not done so, presumably because its business model precludes using its position as data aggregator to compete with its members.

The system and methods described herein provide alternatives to existing systems by creating what could be termed a "federated data management system," where no central party controls the system and every member can decide whether to enable aggregation based on the case at hand.

This federated data management system with aggregation preferably is based on the following principles:

1) Protecting data providers. When the subject system uses data provided by parties that wish to keep the identity of the end clients confidential, said system enables all communications between the system and the end client to be routed through the data provider's own communication channels to the end client.

2) Client confidentiality in aggregation. Buy-side clients may only permit their trade data to be aggregated if the party that performs the aggregation cannot discover the identity of the client. In a preferred embodiment, a client ID used for aggregation is incomprehensible to the party performing the aggregation and is used only once ("fire and forget").

3) Protection from collusion. Each participant can decide whether to permit anonymous aggregation based on the identity of two parties: the party performing the aggregation, and the party who provides the aggregation key. The participant will determine whether it is confident that these two parties will not violate the confidentiality of the aggregation key.

4) Voluntary aggregation. Each participant can decide whether to permit anonymous aggregation based on the message type (to be delivered to the winning client), and query type. For example, a query seeking the largest institutional seller of a given security during a whole month may be considered unacceptable, since it risks indirectly revealing the identity of the targets through a comparison with the quarterly filings of known buy-side Institutions. The same query with a 15-minute time window would present no such risks. If a party does not enable aggregation, it will participate in the system based solely on its own data.

5) Multiple data providers for the same target. When a client wins a query based on data aggregated from multiple data providers, configurable rules determine how the revenue from a subsequent trade is to be shared with the data providers. For example, the revenue can go exclusively to the party that provided the most recent data entry, or it can be shared among data contributors in proportion to the volume of data they contributed to the aggregation. Data providers can elect to accept or reject the aggregation request based upon the choice of rule.

In a preferred embodiment, the invention comprises a computer-implemented system and method of managing market information across a network of data providers, comprising the steps of (a) electronically receiving first data including confidential information regarding market participants in a first system that protects said first data behind a firewall; (b) electronically receiving second data including confidential information regarding market participants in a second system that protects said second data behind a firewall; (c) electronically receiving an order and targeting parameters from a first market participant; (d) electronically issuing an advertisement request message to said first system and said second system, said advertisement message comprising display attributes of said order and comprising said targeting parameters; (e) electronically prompting said first system and said second system via the advertisement request message to each send a coordination request message to a Coordination Hub, said coordination request message comprising information deduced from said confidential information regarding market participants in said first and second systems, wherein the selection of the information that is sent to the Coordination Hub is based at least in part on said first market participant's targeting parameters; (f) electronically prompting based on the coordination request message said Coordination Hub to issue permissions to advertise the order to selected market participants, wherein market participants are selected based, at least in part, on said received information regarding market participants; and (g) electronically prompting based on the permissions to advertise the order said first system and said second system to route information about said order from first participant to said selected market participants.

BRIEF DESCRIPTION OF THE DRAWINGS

FIG. 4 depicts a preferred Previously Presented Order form.

FIG. 5 depicts a preferred Targeting form.

DETAILED DESCRIPTION OF PREFERRED EMBODIMENTS

Figure 1A:
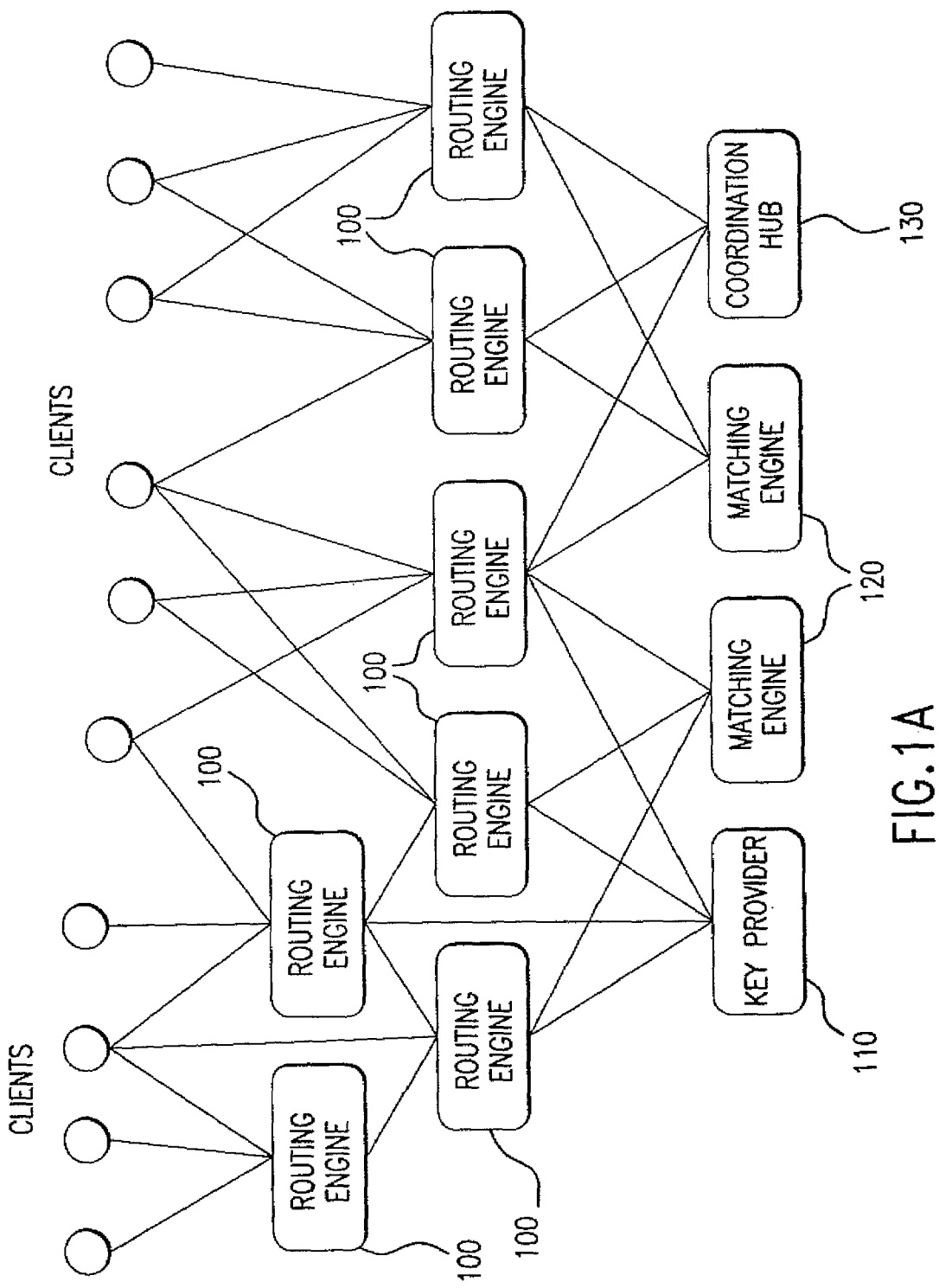
FIG. 1A depicts network architecture for an embodiment that comprises several routing engines.

Definitions. A "client" is an individual or entity that will receive targeted messages. An "implementation" is a single deployment of the disclosed distributed computer system, connected to a communication network. A "participant" is an individual or entity that agrees to host an implementation of said distributed computer system. The "score" of a client is a real number that represents the net value of showing information to this client, considering the positive contribution from the likelihood that the order will be filled and subtracting the negative contribution from the risks associated with information leak. A "score evaluation function" is an algorithm for determining a client score from data that is contributed by one or more data providers.

A preferred embodiment of the present invention comprises a system that lets a first participant (the "initiator"): (1) enter an order to buy or sell a fungible item such as a publicly traded security into a matching engine or auction server; (2) request that the system create a distribution list to contain "likely counter-parties," based on specific criteria, which preferably entail executing a distributed query across a plurality of databases; and (3) request that the system display information about the order (which may include the security, the side, the quantity or a less quantity, and/or the limit price or a less aggressive displayed price) to the members of the distribution list.

The initiating participant ("initiator") typically does not know the identity of the client(s) that are to receive the messages. Therefore, communications with this client are routed through the party that provided data on the client. In this way, data providers intermediate communications between initiator and client.

Alternatively, the data-providing party can be the client itself, and an anonymizing intermediary (a "router") can be used to mask the client's identity. For the purposes of this description, we will consider the router to be the "data provider," since it effectively has access to the clients' data and intermediates all communications between the initiator and clients.

Each implementation of the system preferably enables an operator to configure how the system should respond to queries based on the message type that is to be delivered. Preferred options are: (a) do not respond; (b) respond but do not permit aggregation; or (c) respond and permit aggregation. The message type preferably is specified by the data query that is to be executed, the identity of the aggregation key provider and the aggregating party, and the rule for sharing revenue when multiple data providers are involved in selecting a client for a transaction.

Aggregation preferably is performed according to a table (see exemplary Tables A1-A4 below) that comprises one row per client known in the system (union set of the clients known to at least one participant) and a column for each party that submits data for aggregation.

In the example shown in Tables A1-A4, Table A1 shows the full aggregation table, which is known to the key provider only. Table A2 shows the information that is known to a Coordination Hub that is enabled to aggregate data, when said Hub is hosted by a neutral party, i.e., one that does not also host a routing engine. Table A3 gives an example of the information that is known to routing engine A and used to issue keys to describe its clients to the Coordination Hub. Table A4 shows the aggregation table known to a Coordination Hub that is hosted by the same firm that also operates routing engine C; column C is removed from the table since it would reveal the client identities known to this routing engine, and the lines are reordered at random. Routing engine C will also have a table similar to Table A3 for use when aggregation is to be performed through another Coordination Hub.

The primary case of interest is one where N participants possess quantitative data concerning clients enabling the evaluation of the clients' scores. No participant typically is willing to share the data about named clients with the other parties, but each participant will permit the aggregation of their client's data with other participants when this improves its chance of being selected to intermediate a transaction involving the client. A line in the aggregation table gives the ID (a character-string) that each participant will use to identify a client. The aggregator will receive messages from a plurality of participants comprising information on clients. It aggregates information on a client when it finds that the client-ID associated with the information reported by one participant is in the same line of the aggregation table as the client-ID associated with information reported by another participant.

TABLE A1

|  | Routing Engine A | Routing Engine B | Routing Engine C |
| --- | --- | --- | --- |
| Fidelity | 123-dfg-543 | Sdfl-w34-45 | Gjw-239-sdj |
| Putnam | 3834-fh-387 | Askdf-2134-wsfe | Sdfkh-234 |
| T. Rowe Price | Asfh-283-345 | We-234-ert | Asdhf-234-gdf |
| TIAA Cref | Sdfk-23k-sdf | Sdf-234-sd | Sdkf-234-sdf |

TABLE A2

| Routing Engine A | Routing Engine B | Routing Engine C |
| --- | --- | --- |
| 123-dfg-543 | Sdfl-w-34-45 | Gjw-239-sdj |
| 3834-fh-387 | Askdf-2134-wsfe | Sdkfh-234 |
| Asfh-283-345 | We-234-ert | Asdhf-234-gdf |
| Sdfk-23k-sdf | Sdf-234-sd | Sdkf-234-sdf |

TABLE A3

|  | Routing Engine A |
| --- | --- |
| Fidelity | 123-dfg-543 |
| Putnam | 3834-fh-387 |
| T. Rowe Price | Asfh-283-345 |
| TAII Cref | Sdfk-23k-sdf |

TABLE A4

| Routing Engine A | Routing Engine B |
| --- | --- |
| Asfh-283-345 | We-234-ert |
| Sdfk-23k-sdf | Sdf-234-sd |
| 3834-fh-387 | Askdf-2134-wsfe |
| 123-dfg-543 | Sdfl-w-34-45 |

The aggregation table itself is preferably created by a central trusted key provider that maintains a list of clients based on a globally recognized name for each client and creates a unique client-ID string per client for each participant. A participant that wishes to be a data aggregator may request an aggregation table that will contain the client-IDs known to other participants but will not contain the client-IDs known to itself, so a participant can be an aggregator for all but its own data without being able to infer the identity of the clients involved in the aggregation.

In an alternate embodiment, there are no aggregation tables but the central key provider provides all routing engines that participate in aggregation with an encryption key. The routing engines use this key to encrypt the globally recognized name of the client's firm—for example, using the firm naming convention of a third party such as Bloomberg or Reuters. Since the Coordination Hub does not know the matching key, it is not able to decrypt the client ID to determine the true identity of the client firm—it simply sees the same client-ID (same character string with no obvious meaning) when two routing engines provide data that pertains to the same client, thereby enabling aggregation of the data.

In a preferred embodiment, the system comprises one or more matching engines, or an interface to a third party matching engine, such as a FIX interface to an ECN, and a plurality of routing engines. (The Financial Information eXchange (FIX) protocol is a messaging standard developed specifically for the real-time electronic exchange of securities transactions.) Each routing engine utilizes one or more query engines that will access local and/or remote databases to execute a database query, with the same effect as if all the data were held locally. When accessing remote databases it preferably will receive in response only the information that is needed to evaluate the proposed target's quality as a likely contra for the first participant's order. This enables each data provider to determine, based on the type of query and the purpose of the query, whether or not to provide access to its data. For example, a data provider may provide access only when needed for the purpose of facilitating a successful trade, and only for a query that will return the sequences of trades done by firm(s) that have led to a recent accumulation of 10,000 shares net on either the buy or sell side in a given security. The preferred system effectively inserts the results of an externalized query in its local database when the external data provider accepts the request, or proceeds without the benefit of said external data when said data provider refuses the request or has no relevant data to offer. The system preferably stores information that includes the parties that provided data that helped to find a counter party for the first participant's order and the specific data provided by said parties, and makes that information available to a billing system for the purpose of providing payments to data providers when their data helps to facilitate successful trades.

Each routing engine preferably connects to one or more auction servers or matching engines. When the routing engine is configured to connect to a single matching engine or auction server, it receives requests to advertise an order from this single auction server or matching engine, routes IOIs to the targeted second participants as described herein, and routes subsequent transactions back and forth between the matching engine or auction server and said second participant(s). When the routing engine is configured to connect to a plurality of auction servers or matching engines, it processes requests from any auction server or matching engine and routes subsequent related trade messages back and forth between the second participant(s) and the auction server or matching engine that entered the corresponding request. In embodiments that enable aggregation of data from multiple routing engines, each routing engine connects to one or more aggregation key providers. When there are more than one participating key providers, a request to advertise an order through aggregate data queries preferably carries the name of the key provider that should be used, or a global default key provider that is common to all routing engines. In an alternate embodiment, each routing engine chooses a key provider and aggregation is enabled only by groups of routing engines that choose the same key provider. In embodiments that support requests where a Coordination Hub must decide the winning target from those proposed by a plurality of routing engines, the routing engine also connects to one or more Coordination Hubs. A request to advertise an order through aggregate data queries must carry the ID of the Coordination Hub that should be used, or a global default Coordination Hub for this type of request that is common to all routing engines. For example, one Coordination Hub may provide services for ranking targets based on trade information, while another Coordination Hub may rank targets based on data on unfilled orders.

Figure 1B:
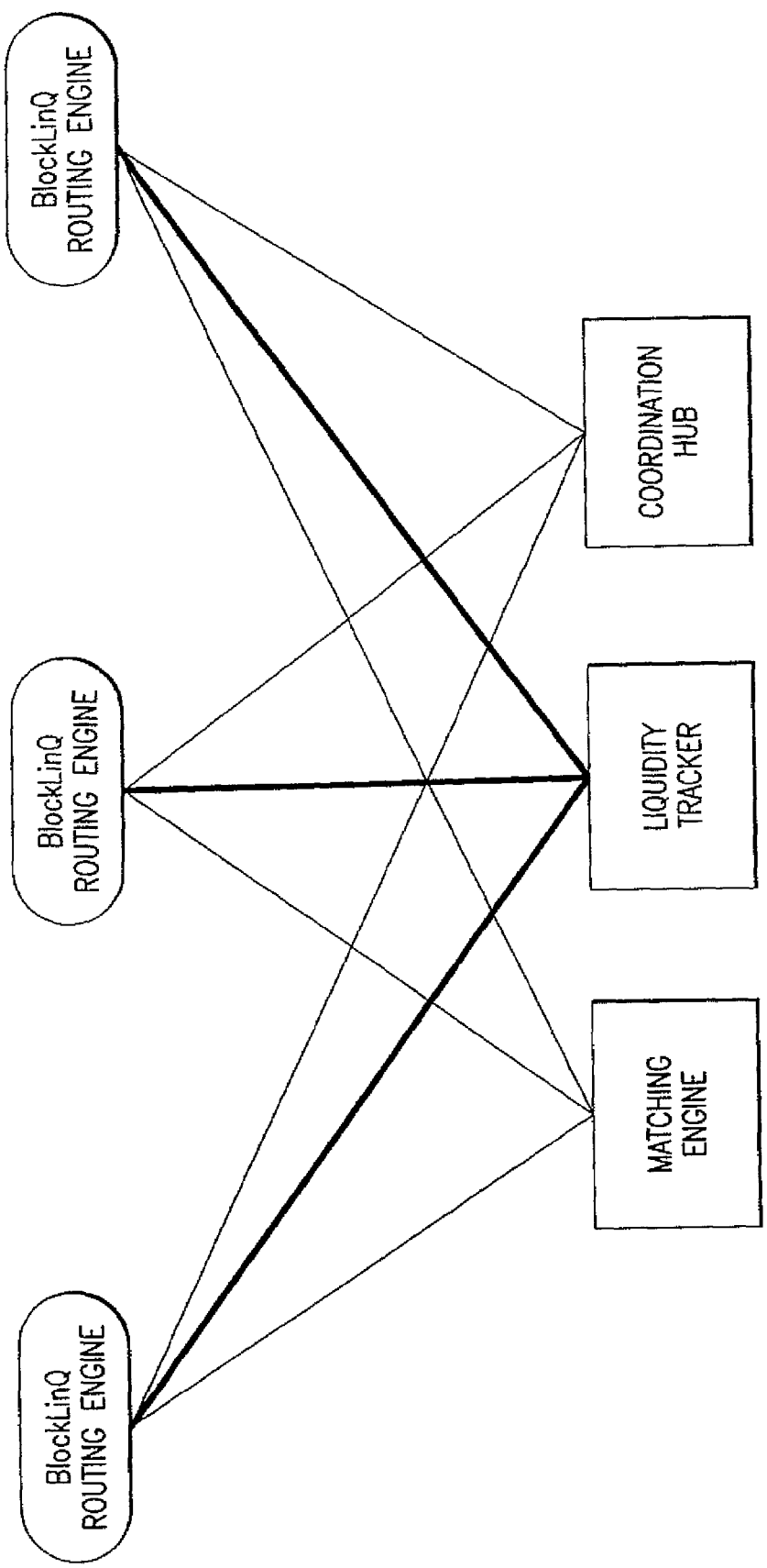
FIG. 1B gives an example of a network configuration that was described in U.S. Provisional Application No. 60/336,775.

The network configuration in a preferred embodiment is a star network with multiple star centers, one for each matching engine, one for each key provider, and one for each coordination hub. Each star center is connected to a plurality of routing engines; the routing engines are the rays that extend from the star's center. As shown in FIG. 1, the routing engines in turn are connected to one or more and clients through a communications network such as a FIX network. FIG. 1A shows the network architecture for a general embodiment that comprises several routing engines, each of which can be connected to a plurality of matching engines, and can coordinate their communications with the Coordination Hub using an aggregation key provided by a Key Provider. FIG. 1B gives an example of a network configuration that was described in U.S. Provisional Application No. 60/336,775, comprising two Matching Engines (being Nasdaq's Liquidity Tracker trading facility and one other Matching Engine), a single Coordination Hub and three Routing Engines, each of which is connected to the Hub and to both Matching Engines. The end clients are not shown in FIG. 1B.

A preferred embodiment of the invention is described below in a configuration that comprises a single matching engine, a coordination hub, and an aggregation key provider. Other configurations are extensions of this one wherein the software enables an operator to specify which matching engines a given routing engine connects to, which coordinated services it supports, and what key providers are enabled. A system with multiple services preferably rely on the method known in the art as data-driven routing, which enables an operator to configure routing tables and associated routing logic to specify where a message should be routed based on the routing table and the content of the message. For example, orders in Nasdaq-listed symbols may be routed to Nasdaq's Liquidity Tracker facility whereas orders in securities listed on the Previously Presented York Stock Exchange would be routed to an alternate Matching Engine.

A preferred matching engine, such as the matching book of an Electronic Communications Network (ECN) or an auction server such as in U.S. patent application Ser. No. 09/870,840, receives an initiation order from a first participant and initiates a multiparty search wherein each routing engine that connects to this matching engine is invited to advertise the first participant's order to participants that have demonstrated a firm, verifiable interest in taking the contra side to said first participant's order. A preferred routing engine receives requests to advertise an order and places them in a queue for processing. Upon processing a request to advertise, a routing engine can search for a good contra based on its own data and the responses from queries into the databases participating external data providers, which can be implemented over a virtual private network (VPN), or forward the invitation to advertise said first participant's order anonymously to a configurable list of other routing engines. Each such rotating engine preferably applies similar processing, either advertising the order or anonymously forwarding the message to other routing engines. Requests to advertise a first participant's order preferably carry a unique order identifier (such as a Globally Unique Identifier, ("GUID")) that is generated by the matching engine and preserved throughout the chain. To avoid redundant processing, each routing engine reads requests to advertise an order off a single input queue and acts only on the first message it receives that contains a given GUID. It disregards redundant copies of the same request that may have arrived through other paths.

Preferably, the initiation order contains routing and display instructions. The matching engine or auction server broadcasts an IOI to all routing engines that subscribe directly to it, together with the routing and display instructions. In one embodiment, the IOI is a FIX IOI and any routing and display instructions are placed in the text message field. Table C below gives an example of a compression mechanism to encode structured query instructions in a short text message field. An alternate embodiment uses a proprietary protocol over a dedicated TCP-IP connection to deliver IOIs with routing instructions. Yet another embodiment uses the Extended Markup Language (XML) to enable an extensible language of routing attributes. Other communication protocols will be recognized as appropriate by those skilled in the art.

The text message in a Previously Presented order message as described herein can be used to carry optional order display attributes that are not supported by standard industry protocols such as FIX or internal order delivery protocols such as CTCI (Computer To Computer Interface) protocols. For example, the instructions on how to execute a database query to select targets to advertise an order are not supported in such protocols, because their designers did not anticipate the present invention.

In an alternate embodiment, the optional order display instructions are encoded using the extended markup language (XML), as is known in the art. To encode the optional order display attributes in a text message that is limited to a few characters, a compression algorithm can be used. For example, one can use a position-based protocol: (a) the number of sell-side targets (between 0 and 99) can be encoded in the first two characters; (b) the number of buy-side targets to display the order to would be encoded in the characters 3 and 4 (again, 0-99); and (c) one can use the fifth and sixth character to specify whether the targets should all be notified at once or Previously Presented targets should be added one by one with some delay between one target and the next (with a cycling delay between 0 seconds, for no cycling, and 99 seconds). Other implementations and extensions of such a position-based protocol to support the features of the various embodiments of the invention described herein and obvious extensions thereof will be recognized by those skilled in the art. In another example, one can use a hybrid between a tag-value protocol such as XML and a position-based protocol, limiting the tag to a single character and using special characters to indicate that certain positions will be used for a given string, to compress the information without losing the flexibility and extensibility of a tag-value protocol. For example, users can type the characters "D5M" to request that the system display only 5000 shares, "M" being the Roman numeral notation for one thousand. The tag in this case is the character D and the contiguous numbers following this tag give the corresponding parameter value. A user can type "$02" to request that the order be displayed with a price that is 2 cents less aggressive than the true limit price, or type "N5" to show the order to 5 sell-side targets based on Nasdaq's data. If users want to use many such options they can use a compression algorithm where the first character points to a table, which is used to translate the meaning of subsequent characters. For example, if the first character is A, then the next four characters will be used to specify the execution ID of a prior trade to request that the order be advertised to the counter party in said previous trade (*69 functionality). The two following characters will specify the additional targets that the order should be advertised to as follows:

TABLE B

| Character | Sell-side targets | Buy-side targets | Cycle [Sec] | Look-back [Min] |
|---|---|---|---|---|
| 0 | 0 | 0 | 0 | 1 |
| 1 | 1 | 0 | 5 | 1 |
| 2 | 2 | 0 | 10 | 1 |
| 3 | 3 | 0 | 15 | 1 |
| 4 | 4 | 0 | 20 | 1 |
| 5 | 5 | 0 | 30 | 1 |
| 6 | 0 | 1 | 0 | 3 |
| 7 | 1 | 1 | 5 | 3 |
| 8 | 2 | 1 | 10 | 3 |
| 9 | 3 | 1 | 15 | 3 |
| A | 4 | 1 | 20 | 3 |
| B | 5 | 1 | 30 | 3 |
| C | 0 | 2 | 0 | 5 |
| D | 1 | 2 | 5 | 5 |
| E | 2 | 2 | 10 | 5 |
| F | 3 | 2 | 15 | 5 |
| G | 4 | 2 | 20 | 5 |
| H | 5 | 2 | 30 | 5 |
| I | 0 | 3 | 0 | 10 |
| J | 1 | 3 | 5 | 10 |
| K | 2 | 3 | 10 | 10 |
| L | 3 | 3 | 15 | 10 |
| M | 4 | 3 | 20 | 10 |
| N | 5 | 3 | 30 | 10 |
| O | 0 | 4 | 0 | 30 |
| P | 1 | 4 | 5 | 30 |
| Q | 2 | 4 | 10 | 30 |
| R | 3 | 4 | 15 | 30 |
| S | 4 | 4 | 20 | 30 |
| T | 5 | 4 | 30 | 30 |
| U | 0 | 5 | 0 | Day |
| V | 1 | 5 | 5 | Day |
| W | 2 | 5 | 10 | Day |
| X | 3 | 5 | 15 | Day |
| Y | 4 | 5 | 20 | Day |
| Z | 5 | 5 | 30 | Day |

4-character options are shown below in Table C: 2-character Order Id (# implicit); 2-character Order Id (# implicit); 2-character "B" option event ID. In the absence of the # option the corresponding positions will be space filled. Note: when the # option carries only one character, a space is used to fill the other allotted space (example: "# 7").

TABLE C

| | | | | Outbound Orders to IFIDs | | | | | |
|---|---|---|---|---|---|---|---|---|---|
| | First Character | | | | Second Char. | | Third Char. | Fourth Char | |
| Int | Agr | Discr | Disp | L | N | B | R | Cycle | Lookback |
| A no | P | no | no | | | | | | |
| B no | BBO | no | no | 1 | | 1 | | 5 | |

TABLE C-continued

Outbound Orders to IFIDs

| | First Character | | | | Second Char. | | Third Char. | Fourth Char | |
|---|---|---|---|---|---|---|---|---|---|
| | Int | Agr | Discr | Disp | L | N | B | R | Cycle | Lookback |
| C | no | MID | no | no | 2 | | | 2 | 10 | |
| D | yes | P | no | no | 3 | | | 3 | 15 | |
| E | yes | BBO | no | no | 4 | | | 4 | 20 | |
| F | yes | MID | no | no | 5 | | | 5 | 30 | |
| G | no | P | no | yes | | 1 | | 1 | | 1 |
| H | no | BBO | no | yes | | 2 | | 2 | | 3 |
| I | no | MID | no | yes | | 3 | | 3 | | 5 |
| J | yes | P | no | yes | | 4 | | 4 | | 10 |
| K | yes | BBO | no | yes | | 5 | | 5 | | 30 |
| L | yes | MID | no | yes | 1 | 1 | 1 | 1 | 5 | 1 |
| M | no | P | no | no | 1 | 2 | 1 | 2 | 5 | 3 |
| N | no | BBO | yes | no | 1 | 3 | 1 | 3 | 5 | 5 |
| O | no | MID | yes | no | 1 | 4 | 1 | 4 | 5 | 10 |
| P | yes | P | yes | no | 1 | 5 | 1 | 5 | 5 | 30 |
| Q | yes | BBO | yes | no | 2 | 1 | 2 | 1 | 10 | 1 |
| R | yes | MID | yes | no | 2 | 2 | 2 | 2 | 10 | 3 |
| S | no | P | yes | yes | 2 | 3 | 2 | 3 | 10 | 5 |
| T | no | BBO | yes | yes | 2 | 4 | 2 | 4 | 10 | 10 |
| U | no | MID | yes | yes | 2 | 5 | 2 | 5 | 10 | 30 |
| V | yes | P | yes | yes | 3 | 1 | 3 | 1 | 15 | 1 |
| W | yes | BBO | yes | yes | 3 | 2 | 3 | 2 | 15 | 3 |
| X | yes | MID | yes | yes | 3 | 3 | 3 | 3 | 15 | 5 |
| Y | | | | | 3 | 4 | 3 | 4 | 15 | 10 |
| Z | | | | | 3 | 5 | 3 | 5 | 15 | 30 |
| 0 | | | | | 4 | 1 | 4 | 1 | 20 | 1 |
| 1 | | | | | 4 | 2 | 4 | 2 | 20 | 3 |
| 2 | | | | | 4 | 3 | 4 | 3 | 20 | 5 |
| 3 | | | | | 4 | 4 | 4 | 4 | 20 | 10 |
| 4 | | | | | 4 | 5 | 4 | 5 | 20 | 30 |
| 5 | | | | | 5 | 1 | 5 | 1 | 30 | 1 |
| 6 | | | | | 5 | 2 | 5 | 2 | 30 | 3 |
| 7 | | | | | 5 | 3 | 5 | 3 | 30 | 5 |
| 8 | | | | | 5 | 4 | 5 | 4 | 30 | 10 |
| 9 | | | | | 5 | 5 | 5 | 5 | 30 | 30 |

Figure 4:
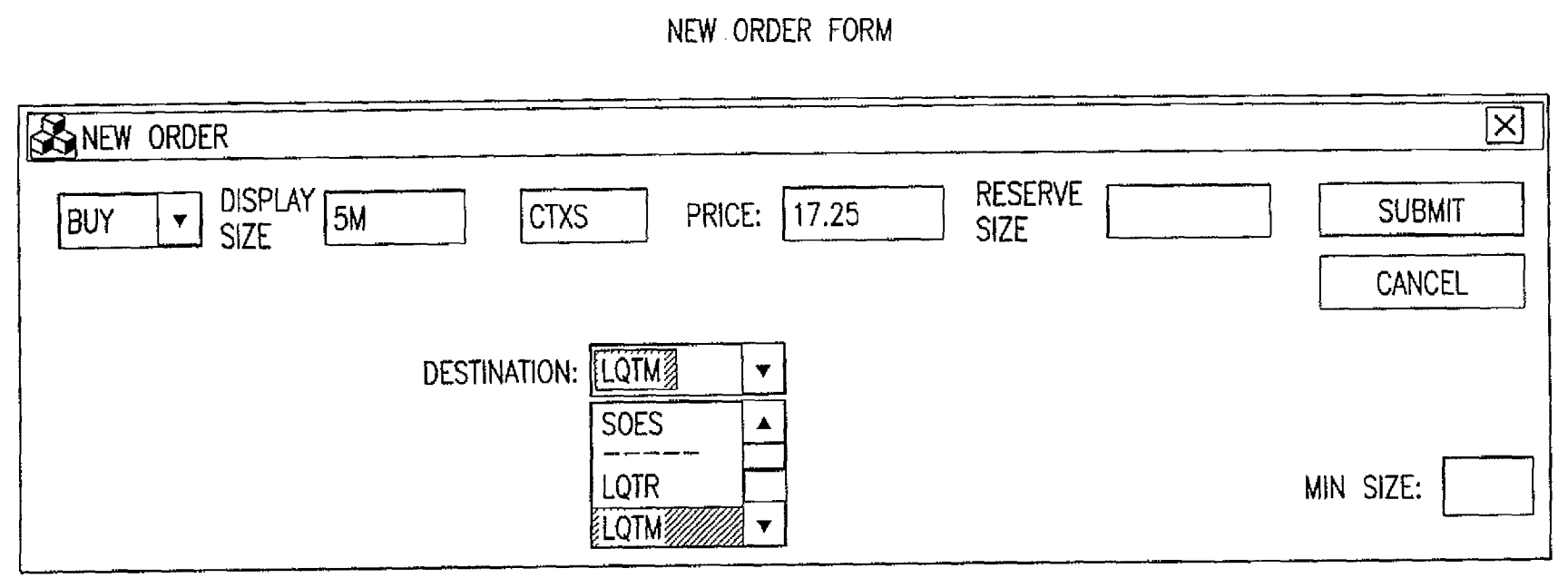

In a preferred embodiment, the user enters the order to the matching engine with routing and display instructions. In an alternate embodiment, the routing instructions can be configured by the first participant before entering the order, using a web GUI, a desktop application, or java applet, as is known in the art. Orders can then be entered through third party user interfaces that may not enable users to specify order routing attributes or type a text message field that could be used to carry such attributes. An example of a preferred third party order entry interface is depicted in FIG. 4. A preferred configuration screen that enables participants to configure their default routing options is depicted in FIG. 5.

Figure 2:
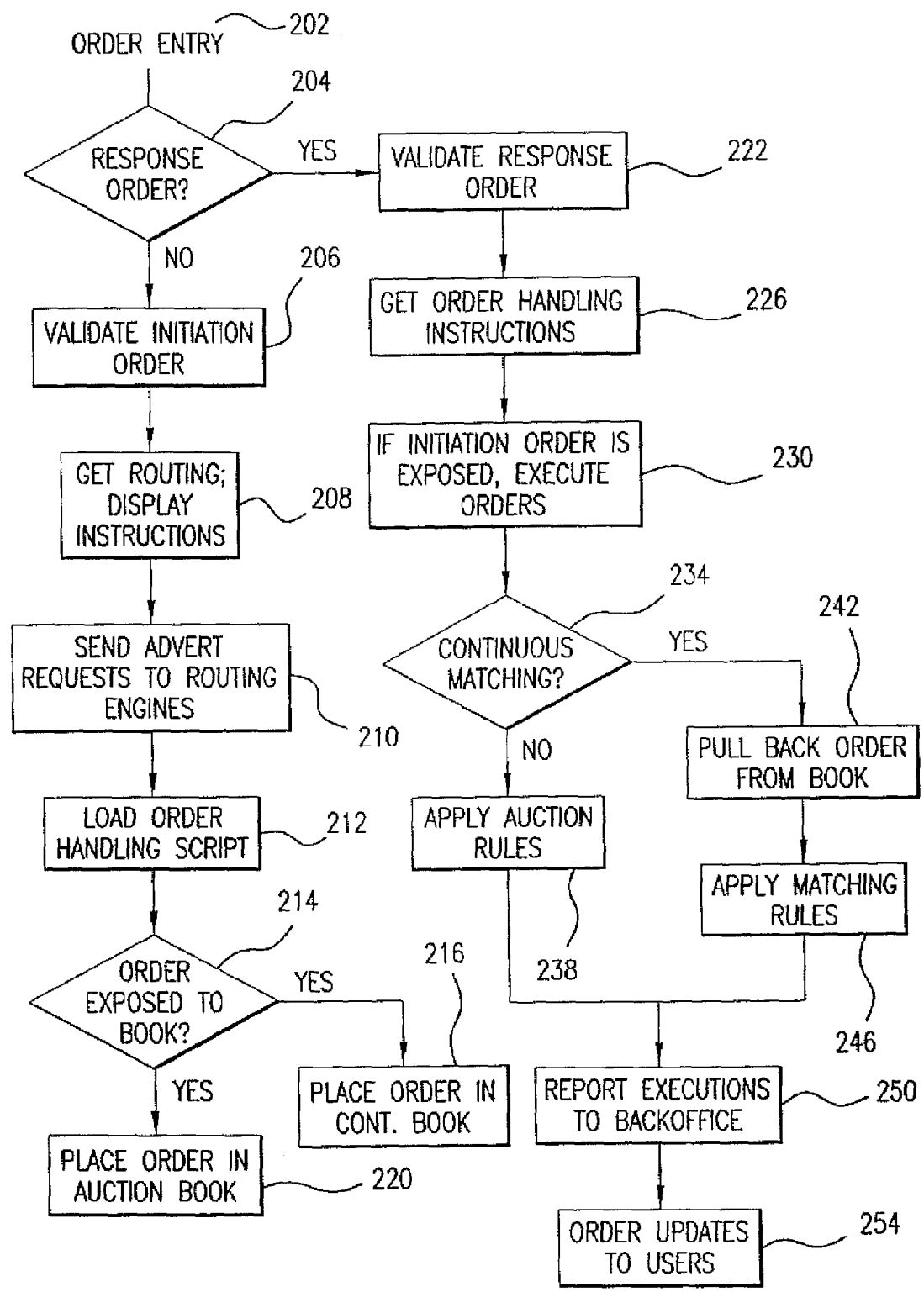
FIG. 2 illustrates operation of a preferred matching engine.

Referring to FIG. 2, a preferred matching engine 120 (see FIG. 1) decides upon receipt of a Previously Presented order whether (step 204) it contains an IOI-ID that points to a prior IOI, in which case the order will be validated as a response order (step 222), or validated as a Previously Presented order (step 206). The preferred matching engine requires valid response orders to be immediate or cancel orders with a valid IOI_ID, while a valid initiation order is preferably required to have a time in force that is 3 minutes or more and is priced at least as aggressively as the NBBO. In step 208 the preferred matching engine reads the routing and display instructions from order attributes and the text message field on the order, or attaches default routing instructions if none were provided with the order. In step 210 the preferred matching engine broadcasts advertisement request messages including routing instructions based on a query type and parameters to all participating routing engines. In step 212 the preferred matching engine loads an order handling script that determines how Previously Presented orders should be handled, based on the content of the Previously Presented order message. For example, in the preferred embodiment orders in NYSE-listed securities are routed to the local matching book whilst an order in a Nasdaq-listed security would be routed to Liquidity Tracker. In an alternate embodiment the orders in Nasdaq-listed securities are split with the lesser of half of the order or the display quantity routed to Liquidity Tracker and the remainder being placed in the book. In another alternate embodiment the order is first routed as "fill-or-kill" to a list of electronic market centers to try to execute any hidden or reserve-size orders that may reside in said electronic market centers, before any residue is subsequently placed in a Matching Engine with a request to send IOIs as described herein. Other order handling scripts can easily be imagined by those skilled in the art. In an alternate embodiment the matching engine makes an additional decision (step 214) based on said routing and display instructions whether the order should be exposed (step 216) to the order flow through an electronic book such as an Electronic Communications Network or the Nasdaq SuperMontage system, as will be described in more detail below, or be placed to be liable only in the local matching engine or auction book (step 220). If the order was classified as a valid response order, in step 226 the order handling instructions are parsed from the content of the order message—for example, these instructions will specify if the order has a minimum fill quantity, or other optional order handling attributes that are known in the art. In step 230 the preferred matching engine or auction server determines if the initiator's order was itself exposed to immediate execution by incoming response orders, as described in co-pending U.S. patent application Ser. No. 09/870,849, and if so proceeds to execute any matching quantity at the price of the response order if said response order price is within the limits specified by the first participant's order. In an alternate embodiment wherein the first participant's order has been exposed to order flow (step 234) in a continuous matching book or electronic market such as an ECN, in whole or in part, any residue from step 230 causes the matching engine to pull the order back from the electronic market to eliminate risks of double executions and, when successful, execute the pulled-back order against the residue of the response order (step 242). If the first participants order was not exposed to order flow, at step 234 the residue on the response order is subjected to the applicable rules, which can be preferably to decline any unfilled quantity, or in an alternate embodiment, place the unfilled residue of the response order in the auction book (step 238) where it will be subject to match check events as specified in co-pending U.S. patent application Ser. No. 09/870,849. In step 250 executions that follow from the above-mentioned steps are reported for back-office processing, and the users are notified of the Previously Presented status of the orders at step 254.

In a preferred embodiment, a routing engine can also serve as an order entry intermediary: users enter orders through an order entry GUI or through a standard interface such as a FIX interface. The routing engine enables an operator to configure to which matching engine a Previously Presented order should be routed based upon the characteristics of the order, such as the exchange where the security is listed. It also enables the operator to configure default routing and display attributes that are to be used when the user does not or cannot place said attributes on an individual order. In the preferred embodiment the default routing and display attributes are configurable per firm and per security. These attributes can preferably be set through a help desk GUI, or a web GUI that can be made available to the end user.

In a preferred embodiment the routing engine also supports specifying user attributes, including an interest list that gives the set of fungible items that the user is interested in (such as a list of securities). The user can then apply changes to default routing and display instructions to this list of securities in a single step, or specify channels through which the trader wishes to be notified when an order advertisement in one of these fungible items is targeted to the trader's firm. Such channels may comprise email, FAX, pager alerts, or a message pushed through a channel such as FIX or other push-enabled distribution channel. An alternate embodiment comprises a messenger application that the trader preferably can easily download and that preferably results in displaying a small window when an advertisement comes in. The window preferably rises from the lower right corner of the screen and stays visible for a few seconds. While visible, it contains a brief text description of the advertised order, for example: "Buyer of 10000 DELL at Midpoint." The user can click or this text to bring up a response order entry dialog with all fields filled with default values. In the above example, this would be an order to sell 10000 shares of DELL at the midpoint. The user can edit the relevant fields (for example, to sell a different number of shares) then click on a "Submit" button to place the response order. When the auction server or matching engine reports the execution, the line "Filled: 5000 DELL $10.15" appears as text on the lower portion of the response order dialog, then after 2 seconds the dialog disappears. The information preferably is still available in an order management window associated with this user interface, as is known in the art.

Figure 3:
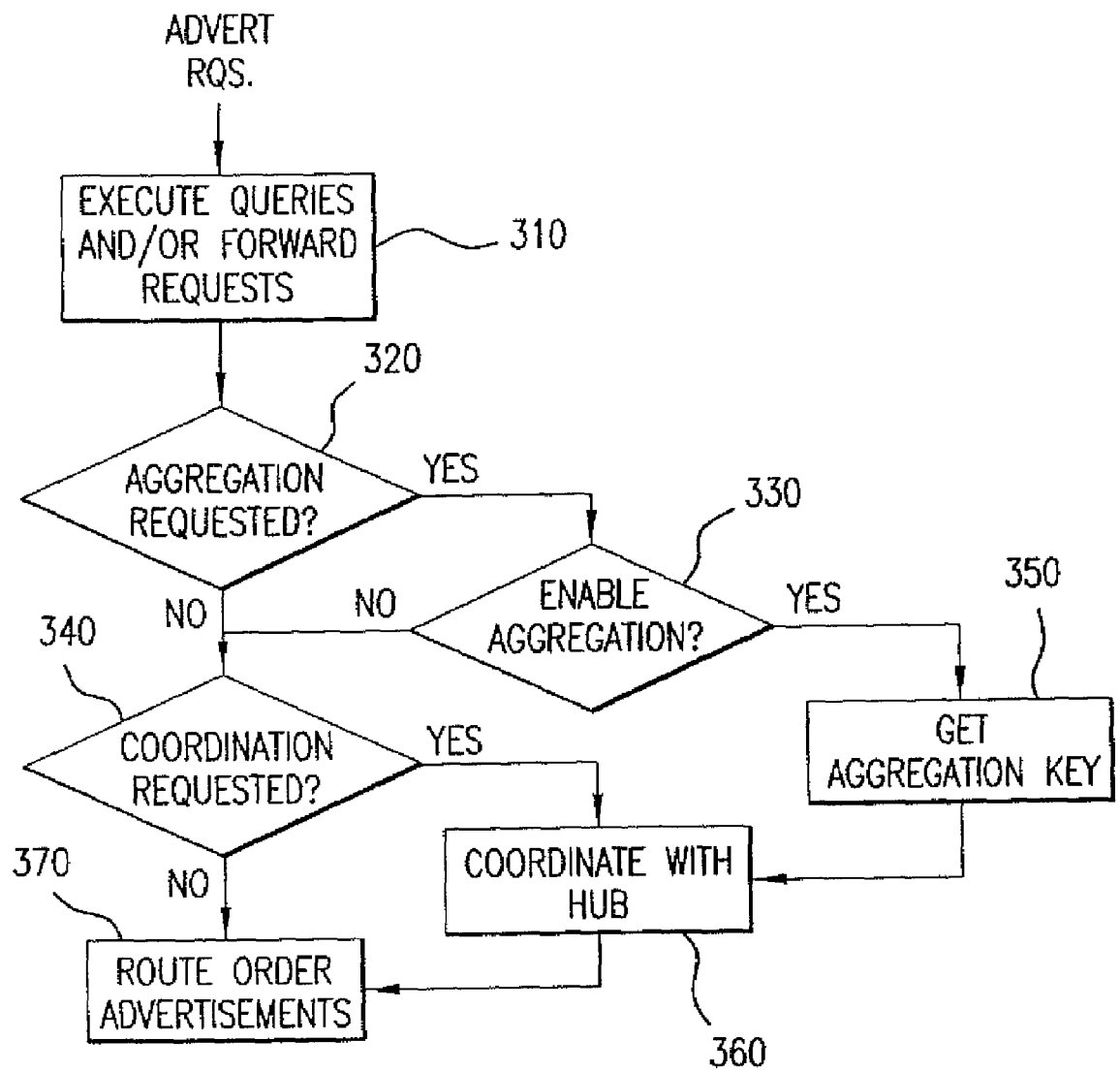
FIG. 3 illustrates operation of a preferred routing engine.

The routing engine processes advertisement request messages as shown in FIG. 3. In step 310 the routing engine preferably executes queries against its local database and forwards query requests to any external data providers it has access to. In an alternate embodiment, in step 320 the routing engine determines based on an advertisement request message if aggregation is requested, and if so decides (step 330) based on the query type, the revenue-sharing rule, the identity of the requesting party and the identify of the proposed Coordination Hub 130 and Key Provider 110 if the request to aggregate is to be accepted. This decision is preferably based on a configuration table where an operator has specified the outcome (accept or refuse aggregation) for each possible combination of the above-listed deciding factors. If the aggregation request is accepted, the routing engine proceeds in step 350 to get a key from key provider 110 to communicate in step 360 information about potential targets to the Coordination Hub with clients identified using said key. In the contrary case it will communicate with the Coordination Hub using Client-Ids that are not shared with other routing engines. In the preferred embodiment, or in the alternate embodiment where aggregation was requested but denied, when the advertisement request message requires coordination with a Hub 130 the routing engine sends in step 340 a message to Hub 130 requesting authorization to send IOIs to its selected clients, and receives in response a list of which selected clients ranked among those that were selected as optimal targets across the data network, as determined by the first participant's routing instructions. If some but not all of the routing instructions require coordination with the Hub, a routing engine that was configured not to accept Hub-mediated requests will only be able to route IOIs based on those routing instructions that did not require said coordination. In step 370 the routing engine delivers IOIs to said selected and authorized clients.

In a preferred embodiment, different types of routing instructions are supported. Routing instructions may be local only—in which case the routing engine simply executes a query against the data it has access in order to evaluate the dissemination list—or may involve coordination with out routing engines. For example, the coordination may be to limit the total number of parties to be notified of an order to a given upper bound (for example, show this order to at most three participants). If the routing instructions require coordination, each routing engine preferably sends a message to a Coordination Hub 130 (see FIG. 1) describing the proposed targets to deliver IOIs to with sufficient information to determine how they rank compared to similar targets proposed by other routing engines and the unique order ID (preferably a GUID) that describes this order advertising event. Once the hub 130 has received proposed targets from all routing engines that subscribe to its ranking service, or a configurable time delay from reception of the first target list expires (for example, one second) the hub sorts all proposed targets based on the associated ranking algorithm and sends a response message to each routing engine giving the global rank of their targets.

For example, a first participant may request that his order be advertised to the 3 buy-side institutions that have most recently accumulated (bought) 10,000 shares of a given security, looking back no further than 3 days. Each routing engine will effect a query in a trade database looking for firms that have recently bought or sold a total of 10,000 shares net or more, looking back from the present time and scanning backward in time until they find three candidate targets that trip either the buy or the sell threshold, or the specified time limit is reached. Each routing engine will send a message to the hub 130 in this case containing the time and date wherefrom the proposed target has net bought or net sold 10,000 shares. For example, target A will have accumulated 10,000 or more since 11:40 today, target B has accumulated 10,000 or more since 9:45, etc. The hub receives similar messages from all query engines, combines information pertaining to the same clients when applicable, possibly netting sells reported by one routing engine with buys reported by another, and ranks all targets by the timestamp from which the proposed target has accumulated 10,000 shares. The Coordination Hub then responds to each routing engine by giving the global ranks of its proposed targets. For example a routing engine might receive a response specifying that its target A has rank=1, target B has rank=7, etc.

The routing engine receives the response message from the hub and applies the routing instructions. Knowing that the order is to be advertised to the top 3 targets only, it can determine that the first target with rank=1 should receive the 101 but the second target with rank=7 will not be notified. In an alternate embodiment the routing engine confirms that the target has indeed been notified; if it is not possible to notify a given target, it walks down a padded list of possible targets in ranked order, until the desired number of end parties has been notified. In the example above, the routing engine has received the ranks 1 and 7 from the hub, so it is expected to notify only one of the three targets since it has one of the top three targets. If however it is unable to notify target number 1 it will replace it with the next best target, which was given rank 7. In an alternate embodiment, when the routing engine was unable to deliver the IOI to the ranked target and does not have the next best ranked target, it reports the failure to deliver the IOI to the coordination Hub 130, which then sends a message to the routing engine with the next best ranked target resulting in an IOI being sent to the next best target.

In a preferred embodiment where coordination is required, all routing engines report to the hub with code names for the clients that are unknown to the coordination hub, so that the hub treats each proposed target as different and hence is not able to aggregate data when more than one routing engine has relevant routing data on the same target firm. In an alternate embodiment, the hub receives the true identity of each firm and hence can aggregate data from different routing engines. In yet another alternate embodiment, the routing engines preferably use a common client-ID as given by a trusted key provider to describe their clients to the coordination Hub 130, allowing the Hub to aggregate data from multiple routing engines without enabling it to infer the identity of the proposed targets. In this embodiment, the common key to identify targets is provided by the trusted key provider for the individual event and used only once, so that the coordination Hub 130 cannot infer the target's identity by correlating subsequent events.

In a preferred embodiment of this invention with aggregation, the routing engines use a trusted key provider to produce the key; the matching engine that initiates the order advertisement process selects the key provider. In this embodiment, the routing engines may determine, based on the identity of the matching engine and the identity of the key provider, whether to enable aggregation by using the global key for their clients, or to not enable aggregation, by using a key name for their clients known only to themselves. In an alternate embodiment, all routing engines necessarily report to the hub with the key provided by the chosen key provider and all subscribers to the matching engine implicitly trust the key provider's confidentiality. In a further alternate embodiment the matching engine itself provides the aggregation key. In a still further alternate embodiment the matching engine performs the function of the Coordination Hub, and a separately hosted hub is not needed.

To enable aggregation without revealing the identity of the firm whose data is being aggregated, one or more key providers preferably maintain a list of target firms that are supported by one or more of the routing engines (potential targets to receive IOIs), and maintain a dictionary of unique firm identifiers that will be used to identify potential targets to the coordination Hub 130, or an encryption key that enables the routing engines to generate the tables giving the ID of each client firm by encrypting the globally recognized name of the client firm. Whenever a Previously Presented client is added to its list of potential targets, a routing engine notifies the key provider of this Previously Presented client name. The key provider then determines whether this client name was previously entered by another routing engine, possibly correcting minor differences in naming. If there are more substantial differences that cannot be automatically corrected, the key provider alerts a human operator (through an operations interface) who will decide whether the client is a duplicate of one that already existed in the system, and if so, decide on a unique name for this client. The key provider reports the globally recognized client-ID (for example, "Fidelity") to the routing engines to ensure that different routing engines use the same name for the same clients. In an alternate embodiment, all routing engines use a common dictionary of firm names (such as that provided by Bloomberg) and the key provider does not play a role in coordinating the firm names across the network.

If more than one key provider is used, the matching engine initiating a distributed query will identify which key provider should be used in communications with the hub. Each routing engine decides whether this key provider is trusted, based on a system-configurable table. A routing engine that does not trust the aggregation key provider may still participate in the IOI forwarding request by submitting its targets to the hub using its own code names for its client firms. If it does so, its clients' data will not be aggregated with data from other routing engines, thereby reducing the likelihood that its clients receive a high rank to receive IOIs.

In embodiments with aggregation, the routing engines transmit enough information to a hub to enable it to rank potential target firms based on those firms' aggregate trading activity across multiple brokers. For example, to enable aggregation in a query for the most recent firm to accumulate 10,000 shares to more, each routing engine would provide a list of potential targets and a list of trades for each target with timestamp, side, and quantity of each trade. The routing engine posing the query will extend the list to propose a greater number of potential targets than requested—for example, sending three times the requested number of targets or a minimum of 10 targets—because a target that is ranked lower based on the data of a single routing engine may end up being ranked higher based on aggregate data. The hub will merge the trade lists from equivalently-ranked end clients and identify which end clients have most recently accumulated the requested shares. In another example regarding aggregation, the first participant requests that the order be routed to the firm with the largest total size bought (or sold) during the last 5 days. In this case, each routing engine will simply report the total net size accumulated in days for its top targets, once again padding the list of targets, and the hub will sum the sizes by firm to rank based on aggregate size across the multiple routing engines.

In a preferred embodiment, an end client that receives an advertisement for an order can elect to enter a response order. The response order preferably is electronically routed back through the same string of intermediating routing engines as was used in advertising the order to this end client. The response order preferably is incorporated into the order book of a matching engine or auction server, applying matching rules to determine the opportunity and nature of an execution. For example, the matching rules may be to place all response orders in a single queue. Orders are read from the queue and checked for a possible match with the initiation order. If the price of the response order is within the limit set by the initiator, and the size is at least as large as the initiator's minimum quantity, the matching engine will execute the lesser of the initiator and response order quantities at the price specified by the response order. Other matching rules can easily be apprehended by those skilled in the art, or have been described in co-pending U.S. patent application Ser. No. 09/870,849, including but not limited to call auctions, VWAP auctions, midpoint crosses, and randomly-timed match check events.

In an alternate embodiment, the IOI message to a second participant that was identified as a likely contra for an order contains information on the location of the matching engine or auction server where the first participant's order is available, and the client can enter a response order directly into said matching engine or auction server. The matching engine or auction server in this alternate embodiment preferably stores a record of the trade together with information as to which data providers or routing engines provided data that helped to identify that this would be a likely contra party to the first participant's order. This information is preferably produced by the system to support billing functions that enable payment to data providers in proportion to the usefulness of their data contribution, as mutually agreed among the parties through a contractual arrangement.

In a preferred embodiment, the same channel used to deliver the advertisement to the end used can be used to place a response order. The routing engine preferably supports a FIX engine that routes the advertisement as a FIX IOI and receives in response a FIX order containing the IOI-ID from the IOI. FIX orders with a valid IOI-ID are interpreted as response orders, whereas orders without a valid IOI-ID are treated as Previously Presented orders for routing to the specified matching engine, as described above. In a preferred embodiment when the IOI-ID is absent but the response order is on the contra side of a security for which the routing engine has one or more outstanding IOIs, the IOI-ID is added automatically assuming the order is a response to the most recent IOI in the security.

In an alternate embodiment, the system facilitates a firm negotiation back and forth between the first and second participants. In this embodiment, the second participant that was notified of first participant's order may enter an order that does not in itself match the terms of the first participant's order, but proposes other terms for a trade, with instructions to show an order quantity and price to the first participant. The message from the second participant is preferably a FIX Previously Presented order message with an IOI-ID that points to the IOI that notified said second participant of the first participant's order, and with a display quantity that is set to a value greater than zero. The system then preferably routes an IOI message to the first participant indicating the displayed price and size of the second participant's counter-offer. The system preferably allows the first participant to revise the order that it had originally placed in the matching engine or auction server to accept the terms offered by the second participant, or to propose a counter-offer that comes closer to the second participant's terms. If the order revision message carries a display size attribute, once again the system preferably routes a Previously Presented IOI message to the second participant with the Previously Presented displayed size and price of the first participant's revised order. The system preferably enables the first and second participants to continue to negotiate back and forth in this way until the terms of the trade have been agreed by both parties, then reports these terms as a FIX execution message to both parties.

The system preferably removes the IOI when the first participant cancels the underlying order in the matching engine or auction server, or when this order expires or becomes filled by a response from a second participant. Likewise, the IOI message is preferably removed and replaced when said first participant modifies the terms of the order, such as the displayed price or quantity. In an alternate embodiment, the IOI is removed when the underlying order is canceled, expired, or filled, but it is not replaced to reflect changes in the underlying order. In this embodiment, the first participant is not allowed to revise the underlying order in a way that would reduce the price aggression or quantity of that order, but said first participant may freely increase the size and price aggression of the order.

In the preferred embodiment the first participant does not receive any information back on the results of the queries that led to the routing of IOIs to likely contras; the only return information is that which comes when an execution message indicates that a second participant has entered a matching response order. In an alternate embodiment, the first participant receives only enough information back to determine whether the queries successfully identified one or more targets, or if no targets were notified at all. Preferably, in this alternate embodiment the matching engine or auction server provides this information by declining the first participant's order when there were no targets. In another alternate embodiment, the first participant's order is not declined, but a message is sent back to the first participant to notify the first participant whether the order was displayed to a contra party or not. In another alternate embodiment the first participant additionally receives a delayed message 30 seconds after having entered the order, specifying the number of parties the order was displayed to.

The matching engine or auction server preferably imposes minimum quantity, price aggression, and time in force conditions on the first participant's order to discourage a first participant from using the system solely for the purpose of extracting information about the nature or number of likely contra parties, without a real intention to trade, by entering a very passive order with requests to advertise that order to likely contras. The preferred embodiment rejects a first participant's order unless it is (a) priced at least as aggressively as the National Best Bid or Offer (NBBO); (b) will not be cancelable for a duration of 5 seconds; (c) utilizes routing instructions and parameters from a set of possible instructions and parameters that the system exposes as being likely to identify likely contras in this security; and (d) has an order quantity of at least 10000 shares and a minimum quantity not greater than the lesser of the whole order or 5000 shares. In this example, any order that fulfills these conditions is likely to be filled, discouraging the use of the system for reasons other than to execute legitimate trading interests. In another example, the price can be up to 5 cents below the National Best Bid for a buy order, or 5 cents above the National Best Offer for a sell. In yet another example there are no conditions on quantity or on the time in force and the price condition is the only requirement on the first participant's order. In another example, the system accepts all orders with any time in force value and simply holds cancel requests or order expirations in a pending state until the 5-second timer is exhausted. This list is not exhaustive; other sets of rules can be designed to ensure that only truly liable orders can be entered into the system, as can easily be imagined by those skilled in the art. In another embodiment, the first participant's order is not rejected when it is judged to be too passive, but the return information described above is provided only if the order met the sufficient price and size aggression conditions. In the contrary case, where the order is judged to be too passive, the order is displayed to likely contras as normal but no information is sent back to the first participant about the number or nature of parties that the order was displayed to. In the embodiment, where the information on the number of targets is sent back after a 30-second delay, this delay when coupled to the minimum price and size conditions described above helps to protect the information of data providers and the end clients from first participants that would enter orders specifically for the purpose of finding out how many firms satisfy the given routing criteria. Indeed, an aggressive order would stand a high likelihood of getting filled if left open for the span of 30 seconds, leaving the first participant that entered the order with a position risk that outweighs the potential benefits of the information it was hoping to gain by placing the order to learn the number of parties that satisfy the query conditions as likely contras.

The routing engine preferably also supports an HTTPS push channel for communications with a client GUI. The client GUI preferably displays an advertisement as a temporary message window on the lower right-hand corner of the screen, as discussed above. Users may click on this window to bring up a response order dialog with the fields filled in advance to match the quantity and price attributes on the order advertisement. The user may modify these attributes at will, and click on the "Submit" button to deliver the order back to the routing engine. See FIG. 4.

In another embodiment, the routing engine is hosted at a broker that has its own client communication servers. The routing engine in this embodiment provides an interface to deliver the order advertisements to the hosting broker's servers, which then forward these messages to the broker's existing client GUIs. Response orders are delivered to the routing engine back through the host broker's systems through the same interface. This interface preferably is a FIX server and the communications between the routing engine and the host broker follow known industry protocols for delivering IOIs to a broker's clients and for receiving routed orders from a broker's clients. Other implementations of the interface to a hosting broker will be recognized by those skilled in the art.

In a preferred embodiment the routing engine is enabled to receive orders directly from a client, In an alternate embodiment the routing engine is hosted at a third party site and the end users that enter orders into the system may elect a sponsoring broker from a drop list of brokers that elect to participate in this manner. The routing engine preferably sends a message to the sponsoring broker to trigger the credit verification and back-office processing that normally accompanies the order entry process. In this embodiment, the routing engine can be configured to wait for an acknowledgment message back from the broker, so as to enable pre-trade credit checking functionality that allows the broker to block the order if the credit verification fails. This configuration preferably can be set per firm, so that some client firms will be subject to pre-trade credit checking and others will not. The system preferably enables a help desk operator to configure client accounts that do not require a pre-trade credit check with the broker to have their trade reports to the broker delayed until the end of the trading day. In an alternate embodiment, the credit-checking rule is a global system configuration. In another alternate embodiment, the broker assigns a credit limit to its clients, and this credit limit is stored within the routing engine database, so that pre-trade credit checking can be applied locally. In all these embodiments, the message that triggers back-office processing can be a FIX order on behalf of the client, with routing instructions to deliver the order back to the routing engine for further processing. The routing engine may wait for the routed order back to itself or proceed without delay, as described above. In another embodiment there is no credit limit whatsoever but clients loaded into the system are trusted to be able to cover the liabilities incurred with whatever order they choose to enter into the system.

In a preferred embodiment with ranking based on aggregate data, if more than one routing engine sends data that participated in a winning aggregation, each contributing party is permitted to send the advertisement to its client. The end user may then receive advertisements (IOIs) through more than one routing engine, and may elect to respond through either one of them. In an alternate embodiment, only the routing engine with the largest net number of shares is selected to forward the advertisement. In another alternate embodiment the trader that receives an IOI can always use a drop list of participating brokers and request that whichever broker they choose from said drop list should sponsor the response order. In yet another embodiment, the order advertisement is delivered through the routing engine that provided data including the most recent trade known amongst those that participated in the winning aggregation. In yet another embodiment, the winning routing engine is selected by random draw among the firms that participated in the winning aggregation. The above list is not exhaustive—other selection mechanisms within the scope of the present invention will be easily imagined by those skilled in the art.

In a preferred embodiment, multiple choices are supported for the rule on how transactions are intermediated when multiple routing engines participate in an aggregation. In this embodiment, the initiation of the advertisement message contains the rule, and routing engines may determine based on this rule whether to enable aggregation by using the aggregation-enabling key or communicate with the hub using their own key for their clients. In an alternate embodiment, the intermediation rule is fixed.

An alternate embodiment of the subject invention enables a first participant that enters an order to specify (1) a price limit at which the order is immediately executable, and (2) a price range wherein a second participant would attract a notification upon entering an order on the contra side. For example, the first participant may enter an order to buy at $10 and request that the system notify any seller with a standing order to sell for $10.05 or less; we will refer to this second price as the notification limit below. If there is a second participant with a matching contra order (at $10 or less), the system will automatically process the execution at $10 and notify both parties of the trade. If there is an existing second participant order within the notification limit, the system sends the second participant information about said first participant's order, as instructed. If there is no such second participant on order entry, but such a second participant order is entered at a later time, the execution or notification event occurs upon entry of the second participant's order.

The second participant's order may similarly comprise instructions to notify contra orders within some price range up to a notification limit. If both the first participant and second participant are in each other's notification limits, both parties will be notified, or if the first participant is within the second's notification limit but not vice versa, the first participant only gets notified of the second participant's order, the two processes being independent from each other.

In addition to the above, the alternate embodiment preferably comprises an alert mechanism that takes effect when there is at least one buy order and at least one sell order present at the same time within the system. This alert mechanism provides additional information only to the traders that have the highest matching priority on either side of the book, based upon a price time priority rule. In an alternate embodiment, another priority matching rule is used, such as price size. Other suitable rules will be apprehended by those skilled in the art. The traders with the highest matching-priority orders can see the price gap between their order and the best contra order on the opposite side. These traders furthermore receive an alert message whenever there is a change in this price gap, or when they lose the ability to see that price gap because another trader has placed an order with a higher matching priority. Preferably, the system decides which traders are eligible to see the price gap, considering only orders that do not carry a minimum quantity condition in excess of a system-wide minimum quantity. For example, this system-wide minimum order size can be 10,000 shares for orders priced at $25 above and higher amounts to ensure a total liability in excess of $250,000. Traders with a worse price and an order that does not exceed the specified minimum quantity condition will known that there is a better offer within the system at this time, but they will not be able to see the price gap that separates them from a possible match, or indeed whether there is even any order on the contra side in the security. In an alternate embodiment, traders with a worse price will also know when there is an order available on the contra side and are thereby encouraged to improve the current best offer to be able to see the price of the contra side order. To facilitate competition among traders on the same side, in a preferred embodiment the system provides a "Previously Presented best offer" feature that allows a trader to improve his offer to a price that is one increment better than the prior best offer (for example, one cent higher for a buy order or one cent lower for a sell order), and thereby become the Previously Presented best price within the system.

In an alternate embodiment, minimum quantity orders at the best price level also benefit from information on contra orders on the other side if said contra orders are large enough to fill their minimum quantity. If a contra order is canceled and the next best contra order is not large enough to match the minimum quantity, the system seeks the best priced contra order among those that are large enough to fill the minimum quantity condition and displays the price gap to the order.

In another alternate embodiment, in addition to the minimum quantity condition the system also requires that the price gap be displayed only to the party or parties that meet the additional condition that their order should not be priced too passively, such as the condition that the order be no further than 5 cents away from the national best bid or offer (NBBO). Other implementations may set this price aggression level differently for different stocks, or set it in proportion to a measure of the liquidity of the stock, such as the spread.

In an alternate embodiment, multiple parties at the same price level benefit from the ability to see the gap to the other side. In this alternate embodiment, each party is notified of their priority rank (priority by time within a given price level), and traders with a worse price can use a feature to automatically re-price their orders to join the others at the best price level. The informational advantage of being able to see the price gap that would have to be bridged to make a trade happen provides an additional incentive for traders to compete in price and thereby help to narrow the price gap itself, in turn making it more likely that the gap will be bridged.

In an alternate embodiment of the auction system just described, users can enter orders with a different price available for a large execution than for a small one. For example, a first participant might be willing to trade 100,000 shares at $20.05 but will only pay $20 for smaller fills. This general type of order is not novel—for example, it was introduced by Optimark and is practiced today by Instinet among others. What is novel in the context of the present invention is how this affects the ranking of orders and the decision as to who gets to see information about what lies in the auction book. If the best second participant order on the opposite side meets the size requirement for the first participant's order to trade at $20.05, then the first participant will be ranked in consideration of this price, possibly getting a higher rank than a third participant on the same side with a price of $20.01, for example. However, if the second participant's contra order were of lesser size than that which would activate the $20.05 price, then the first participant's priority ranking would be determined based upon the $20.00 price which is applicable at that size level. In the embodiment where the traders at the inside are permitted to see both the price and size of the order opposite to theirs, the price that was used in the priority ranking algorithm is the same as the price that is shown to the best contra party. This could be the discretionary price ($20.05 in the example) or the best low volume price ($20.01) depending upon the size of the second participant's order.

In the preferred embodiment of the present invention, users are allowed to enter orders with a displayed price attribute, which will be shown to the top ranked contra as described above, and a discretionary price that is the true limit up to which the first participant is willing to accept an execution. If a second participant's order on the contra side is entered or revised to a price level that falls within the discretionary price limit, the system will automatically execute the trade at the second participant's displayed price.

In the preferred embodiment, users are also able to elect to show less than the full size of their order. Once again this display attribute only applies to the top-ranked order on the contra-side, which is the only party able to see any information about what is in the auction book, otherwise it operates in the same manner as in a regular matching book. The lesser size is shown to the best ranked contra participant, but a second participant order with matching price will be executed to the full overlapping size including both display and reserve size. In an alternate embodiment, the auction is held as described above but the price is set relative to the volume weighted average price from the time of execution to the end of the day. The main purpose of this embodiment is to price a trade in a way that is not as susceptible to manipulation by small-size orders on the continuous market. In yet another alternate embodiment, the price is set in relation to the volume weighted average price over the entire day, or daily VWAP, including trades past and trades to be executed from the present time to the end of day. The daily VWAP will generally not be a fair price for a trade in the course of a day so traders will need to identify a fair price difference or delta that should be added to the VWAP. For example, if the price in the security has been falling, with a neutral assumption as to future price evolution for the rest of the day one would assume that the VWAP would be higher than the current market price due to earlier trades that day that occurred at a higher price, and buyers would not be willing to take a VWAP unless they can lock in a negative delta. A seller is faced with lower prices for the rest of the day and will be willing to accept a loss by taking a negative delta and still get a better price than the current market. To help steer users to price such a trade the system provides a continuously updated estimate of the expected daily VWAP, taking a neutral assumption for future price (i.e., the current market price will be the average price from now to the end of day) and using the normal volume profile for the stock to estimate what fraction of the daily volume lies ahead, V_future, versus the fraction of the volume that lies in the past, V_past. The estimated daily VWAP then will simply be the average of two prices, one being the VWAP over the trades done before the present time and contributing to V_past, and the second being the present midpoint price, this being the best presently available estimate of the expected average price for the rest of the day, weighted by the respective volumes associated with these two prices, V_past and V_future.

In this embodiment, traders enter orders to buy or sell at the VWAP plus or minus a delta price value, creating an auction that will set the fair market price for the quantity delta. Again, the trader with the best offer is permitted to view the best bidder, and vice versa, while other buyers or sellers see only that their order is not ranked at the front of the queue. Here also, traders on both sides are allowed to set notification parameters to request the system to automatically send a notification message to any trader that has or enters an order on the contra side that is priced within a specified notification limit, which is beyond the execution limit, but close enough to merit notifying the other side.

In an alternate embodiment, there is no notification based on near-matching orders but the system simply operates as a "black box" trading system, but with the substantial difference that top priority orders are able to see the gap that separates them from the other side of the spread, whereas traders that are not at the top priority level only see that they are not at the top priority level.

In another alternate embodiment, the system operates as described above but also enables traders to request that notifications of their orders be sent to parties that have an order on the contra side in their order management systems. Since this in itself is no guarantee that the contra order is an expression of a firm trading interest at the present price levels, this alternate embodiment preferably limits participation to a "country club" of well-behaved institutions. In another embodiment, all firms that grant access to their order management systems are permitted to participate, but the system monitors their behavior in the system by keeping track of the percentage of times the trader fills the whole order or a minimum of 10,000 shares, for the purpose of avoiding sending IOIs to firms that do not tend to fill them. In this monitoring process, *69-routed initiations or other attempts to repeat trades with the same client that has recently filled an order are not counted as separate initiations: if a party once filled 10,000 shares, then that party will not be penalized for not responding to repeat notifications from the same initiator. Having discounted these events from the count of IOIs received and response orders executed, the system enables initiators to require that notifications be sent based on OMS information only to those firms whose trading history indicates that they have in the past responded positively to similar notifications. The system offers default "in the box" filters and allows traders to design and save their own filters. An example of a system-provided filter is one that will notify only firms that have responded affirmatively to <n> of their last 5 notifications in this security, where the first participant specifies the value of n upon entering its order. The system preferably offers a plurality of filters and lets the first participant that enters an order control parameters on the filters so that firms that fail one filter can still be notified through other means and thereby have an opportunity to achieve a better track record of participation in the system. In yet another alternate embodiment, the notification system based on OMS orders includes an audit right for the party operating the system to verify that the OMS order was indeed filled within a reasonable time of the notification event, so that it can be argued that the order was legitimately entered in the OMS with the intention of filling it but the price or market conditions at the time did not warrant its immediate execution, even for the 10,000 share minimum.

In an alternate embodiment, the first participant who enters an order into the matching engine or auction server can simultaneously request that the order be exposed to the flow of orders through an electronic market, such as an ECN. In this embodiment, the system enters a placeholder order on the electronic market, in the form of a suspended order, to register the existence of the order in the matching engine or auction server. The suspended order is similar to a normal order on the electronic market's book for all purposes except that the electronic market does not execute matching contra orders against it, but instead delivers matching contra orders to the matching engine or auction server for execution. This allows the matching engine or auction server to decide race conditions between orders coming in through the electronic market and response orders to the IOIs that it has published through the coordinated routing system of the present invention. The preferred system in this embodiment lets the first participant specify whether the order should be thus exposed to order flow through the electronic market, and if so, what part of the order should be displayed to subscribers of the electronic market. An example of this alternate embodiment is one wherein the firm that hosts the matching engine or auction server receives a market participant ID (MPID) that is configured on Nasdaq's SuperMontage system as an order delivery ECN. Another example is one wherein said auction server or matching engine is hosted by an ECN, such as Instinet, and the ECN provides an interface to place a suspended order on its book. In both examples, users have access to all the order handling and display attributes made available to subscribers of the electronic market, such as completely hidden orders, or block discretion orders that offer a better price only if a minimum quantity can be filled in whole, and additionally may specify a query type and parameters for routing IOIs to advertise said order to likely contras as described herein.

This alternate embodiment preferably enables the first participant to decide if any size that is to be shown on the electronic market's book of quotes (such Nasdaq's montage) should be displayed anonymously under an acronym such as "SIZE" or displayed as attributed to an MPID that the users of the system can recognize as being associated with the matching engine or auction server, such as LQTM for the Liquidity Tracker Midpoint facility. In another embodiment, this choice is determined by a system configuration parameter. When placing the order as attributed, the first participant indicates to subscribers of the electronic market that there is probably an institutional order behind this displayed quote, since LQTM is known to be an Institutional trading system, and thereby encourages parties on the contra side to enter larger orders. In the case of LQTM, which is the acronym for the Nasdaq Liquidity Tracker Midpoint facility, said acronym also indicates that the price will be improved to the NBBO midpoint price. This acronym therefore effectively lets the first participant show a midpoint order on a public book without directly moving the price. Indeed, normally if a trader enters an order that sets a Previously Presented best price this would change the NBBO, by definition, possibly leading to further price moves when other traders follow suit. In the embodiment described here, the orders displayed with an MPID that is publicly known to provide price improvement have conditions such as a minimum quantity condition that prevent them from being displayed as a regular better priced limit order on the montage. When the electronic market delivers contra orders to the matching engine or auction server order, the matching engine or auction server completes the trade only if the contra order meets said conditions, otherwise it declines the delivered order. In an alternate embodiment, there are no such conditions. One difference between an order attributed to an MPID that provides price improvement and a better-priced quote is that the former can be used to effectively provide sub-penny price improvement, as is the case for example with a LQTM quote at the bid in a market where the bid-offer spread stands at the minimum value of one cent. Another difference is that the midpoint price may fluctuate, so the LQTM order is not the same as an order priced at the midpoint when entered. This distinction is important in that a pegged order is not considered by market regulators as being a priced order in what relates to market rules. An example of such a rule is the quote rule, which requires a Market Maker that shows a priced order to more than one other party to make said order available for the entire market by displaying it on an authorized electronic display facility. Since a midpoint order is not a priced order, the electronic market that shows an order as being good at the midpoint is not required to show a better price to subscribers of other competing systems. Other attributed quotes can be used to show different levels of price improvement, as can easily be comprehended by those skilled in the art. For example, the system can attribute orders to LQT1, LQT2, etc., to offer a price improvement of 0.1 cents, 0.2 cents, etc., as defined relative to the NBBO.

Preferably, the ability to attribute an order to an MPID that is recognized to provide price improvement is made available only to a limited membership composed of traders that do not engage in the practice of penny jumping (wherein a short-term trader places an order ahead of a larger institutional order). The preferred matching engine or auction server in this embodiment records the activity of each participant that shows an attributed price improvement order on the electronic book, and automatically generates an operator alert whenever such a participant enters a non-block order ahead of a larger institutional order—for example, placing an order to buy 1000 shares at the bid as LQT2 to offer the bid plus 0.2 cents, when there was an open order to buy 10,000 shares of the same security displayed at the bid as LQT1, which effectively offers the current bid plus 0.1 cents. Participants that trigger abnormally high numbers of such alerts in comparison with their part of the trading volume are suspended from the system. For example, the suspension can be imposed when more than 10% of said attributed price improvement orders from a given participant in the course of a week triggered an alert. In another embodiment there is no monitoring of the system usage but traders are required to enter orders for at least a minimum amount of 10,000 shares, or an amount set per stock to enforce a minimum liability of $250,000. In another embodiment, there are no restrictions to system usage.

In a preferred embodiment, the electronic market automatically incorporates the expected execution price in its priority ranking algorithms for filling market orders, giving priority to an order with price improvement over a regular bid at the same price level but that does not provide price improvement, whether or not the price improvement order was attributed to a publicly recognized MPID. In an alternate embodiment, the electronic market bases its execution priority on the displayed price only, but allows users to preference orders specifically against the MPID that is recognized as one that provides price improvement.

In an alternate embodiment, the orders that are placed on the electronic market do not offer price improvement and an improved price can be obtained only be responding directly to the IOIs distributed as described herein. In another alternate embodiment, the order on the electronic market is available at the quoted price but has a better price available if a minimum block quantity is met—for example, the first participant will instruct the system to display 100 shares to buy at the bid on the electronic book, attributed to LQTM, and simultaneously show a larger size to selected likely contra parties as described herein. When a second participant enters a market sell order to the electronic book, a sell order will be delivered to the matching engine, which will execute orders for up to 10,000 shares at the bid, but improve the price to the midpoint if the order is at least as large as the minimum block quantity of 10,000 shares. This embodiment preferably uses a global system-configured block quantity, which may be set per stock, so that traders on the contra side that see the corresponding MPID know the size for which they can expect price improvement to the midpoint. In an alternate embodiment, the first participant entering the order may specify a minimum block quantity; in yet another alternate embodiment, the smaller size posted at the BBO is never executed but is used only to attract larger orders that are to be filled at the improved price if they exceed the specified minimum quantity. In another alternate embodiment, users that did not receive an IOI advertising an order may nevertheless enter an order directly into the auction server or matching engine to obtain price improvement.

In an alternate embodiment that aims to facilitate the trading of coupled orders such as pairs or baskets, a first participant enters an aggregate order to the auction server or matching engine, where the aggregate order comprises a plurality of individual orders to buy or sell fungible items such as securities, and instructs the system to advertise the individual orders independently using the distributed queries as described herein, but execute only the entire aggregate order, or otherwise enforce rules that couple the individual orders. For example, the first participant may wish to sell a security only if he can simultaneously buy any one of three other securities with a dollar amount of the purchased securities between 80% and 120% of the dollar amount sold. The simplest aggregate order, known as a pair, is an order to buy a given number of shares of one security only if one can simultaneously sell a given amount of another security, with the ratio of the price of the security bought to the security sold not to exceed a given limit. In general, the aggregate order is a set of individual orders with a Boolean rule that gives the value TRUE (proceed with the trade) if a trade meets specified conditions, or FALSE (do not proceed with the trade) if the trade does not meet said conditions. The preferred system stores the individual orders in its database and adds a flag next to each order in the database to indicate that there is a coupling, together with a pointer to a plug-in component that applies the Boolean-valued function returning the value TRUE or FALSE, as specified in the terms of the aggregate order. It then initiates the process to advertise each individual order to likely contra parties as described above, with the distinction that the IOIs delivered to likely contras mention that there is a coupling on the order, for example by adding the word COUPLED in the text message in the FIX IOI, so respondents know that their response order may not get executed immediately. In an alternate embodiment, the coupling is not shown on the IOI message and respondents simply specify the time in force of the response order. The preferred auction server or matching engine receives the response order and checks if the coupling rule is satisfied. If the coupling is satisfied, all orders involved in the aggregate are executed and the trades are locked in using methods known in the art. If not, and the response order to the IOI was not an "Immediate Or Cancel" (IOC) order, that response order is stored while the system awaits further response orders that could complete the coupled trade.

In an alternate embodiment, when the system receives a response order from a second participant and finds that the Boolean rule is not satisfied, it automatically launches a process to determine, based on the Boolean rule, if it is possible to satisfy said Boolean rule by executing a single other order in the basket at current market prices, and if so, lock the response order in a non-cancelable state while routing said other individual order to the market. If the order routed to the market is filled, the Boolean condition is then satisfied and the response order can be unlocked and executed. In an extension of this alternate embodiment, when it is not possible to satisfy the Boolean rule by filling a single order at present market prices, the system looks for pairs of orders that, if filled at current market prices, could satisfy said Boolean rule. If so, it simultaneously routes the two orders to the market as market orders or sweep orders, as is known in the art, to ensure speedy execution of both orders, then locks in the three trades involving these orders and the response to the IOI against the individual orders from the first participant's aggregate order. This process can be extended to three or more market orders, as can be apprehended by those skilled in the art. In another alternate embodiment, if the system finds that it cannot satisfy the Boolean rule with a single market order, but could do so if one of the orders in the pair or basket could be filled against possible hidden orders within the bid-ask spread or against a reserve quantity order at the best market price, the system automatically routes a fill-or-kill order in succession to all electronic marketplaces such as ECNs that support such hidden orders or reserve quantity orders, as is known in the art, so that the order is either filled in whole or returned unfilled after having checked that there is no hidden liquidity in said electronic marketplaces that would satisfy said Boolean rule.

The preferred matching engine or auction server declines the first participant's order if it is unable to find any target that satisfies the first participant's criteria to identify likely contra parties, either locally or through participating routing engines. In this embodiment, when the first participant has requested that the order be exposed to order flow through an electronic market as described above, this takes place only if the system was also able to find at least one target that satisfies the first participant's criteria. In an alternate embodiment, if the first participant requests that the order be exposed to order flow the system will not decline the order, even if it could find no targets, but instead simply exposes the order as specified and rePreviously Presenteds the attempt to find targets through distributed queries every 30 seconds, until either the first participant's criteria are fully satisfied, or the order expires or is filled or canceled. An alternate embodiment enables the first participant to request that the system work the order in this manner regardless of whether or not it is exposed to order flow. If no special query parameters are provided, but the first participant only requests that the order be worked in this manner, the system applies a default query type and parameters every 30 seconds until the order is filled, expired, or canceled. The first participant may access this functionality, for example, by typing the character "W" in the text message field.

The auction server or matching engine preferably enables a coupling between the IOI routing mechanism described herein and what is known in the art as a "slice and dice" engine: an algorithm that works a large order by cutting it into smaller slices which can be more easily traded on the market through either market orders or limit orders. In this coupling, IOIs are sent out to advertise the full order, while simultaneously smaller slices of this order are processed through said slice and dice engine. When a contra order is entered in response to the IOI, the system attempts to pull back any open orders that may have been placed on the market through the slice and dice engine, as needed to execute the response order. This embodiment preferably automates the process of advertising an order when needed, by allowing a first participant to specify a rate at which the order should be worked through the slice and dice engine, and if at the end of any one-minute interval it turns out that the order did not get filled at the requested rate, the system launches a process that attempts to accelerate the execution of the order by distributing IOIs showing a greater quantity or more aggressive price to likely contras through a distributed query, as described herein.

In a preferred embodiment, the data that is made available for queries to identify likely contras for an order comprises data on executed trades, as this is the truest statement of trading interest. Alternate embodiments employ other types of data, as can easily be imagined by those skilled in the art, and enable users to request the execution of distributed queries to identify likely contras based on other types of data. One example of such another type of data that has been mentioned previously is data on unfilled orders as can be found on a broker's blotter, or in the database of a buy-side Order Management System (OMS). Unfilled orders, especially on the buy-side, are not always eligible to be filled at current market prices, so the preferred embodiment of routing based on unfilled orders enables users to qualify these orders to indicate the price and size that can be considered as being firm at current prices. The preferred system allows different data providers to apply different criteria to define what a "firm" trading interest in this context means. For example, the broker Harborside asks its subscribers to give it indications of interest to buy (sell) a given stock only if they are willing to buy (sell) 25000 shares or more at the midpoint price. When they receive such indications on both sides of a security, the Harborside sales traders proceed with telephone calls to close the trade. The personal relationship between the sales trader and the originator of the indication ensures the quality of the trading interest information in this system. By contributing its indications of interest as data in the context of a routing engine as described herein, a firm such as Harborside can enable its customers to attract indications of interest when a first participant entered an order in the matching engine or auction server with instructions to advertise that order to likely contras based on information about unfilled orders. In another example, some brokers use the concept of a "natural" IOI to distinguish indications of interest that it views as particularly firm; these brokers consider that the firm's name stands behind these IOIs and therefore will only send them out when the trading interest is legitimate. Service bureaus that publish such IOIs can provide access to such information as data providers or by hosting a routing engine as described herein.

When a plurality of data providers participate in the routing network with different types of data, the Coordination Hub preferably implements an algorithm that ranks targets that were selected based on different types of data. This ranking algorithm preferably is optimized to maximize the fill rates for the first participant's order. This optimization can be based on an assessment of the quality of the trading interest data pertaining to different types of data being contributed by each routing engine. For example, the Harborside indications as described above would be considered to be of greater quality than trading interest data collected from unqualified orders in an order management system, since the latter may include orders that are not tradable at the present market price. The Coordination Hub preferably gives precedence to targets proposed by routing engines known to have data of higher quality. The ranking algorithm is preferably revised at the end of each month based upon an assessment of the number of times orders were filled; if it is found that a particular data provider statistically leads to higher fill rates, it would be given a higher level of precedence within the Coordination Hub. In an alternate embodiment, the Coordination Hub maintains a score that rates the average quality of targets proposed by each routing engine. In this embodiment, the Coordination Hub picks targets randomly with a weight that is proportional to the rank given to the routing engine that proposed said target. For example, a first participant may request that the order be displayed to at most three firms that have an unfilled order or indication of interest for 10,000 shares or more on the contra side, ranked by size. The Hub will receive proposed targets from various routing engines that each have orders to indications of at least that size. It will rank targets from a single routing engine by the size of the order or indication, and select routing engines with targets stochastically, with a probability of selection of a given routing engine being proportional to its "quality." If a routing engine is selected twice, it is permitted to notify two customers, and so forth. In this embodiment, the score of each routing engine preferably is updated at the end of each month—for example, by setting it in proportion to the average percent of times a target that was selected through its data ended up entering a response order that matched the terms of the IOI.

In another example of different types of data that can be used to select targets most likely to fill the first participant's order, the routing engines provide access to past usage data including IOIs delivered, and responses entered, if any. A first participant may specify criteria for selecting likely targets that combine trade and/or order data with past usage data. For example: "Send an IOI to at most two firms with an order for 10,000 share in the contra side that satisfy the further condition that they have not failed to fill the lesser of 5 IOIs or 20% of IOIs they received in the current week, across all securities." Other examples can be apprehended by those skilled in the art. By letting the first participant control the filter parameters, targets that have failed to fill a few IOIs will never find themselves permanently blocked out of the system, so they continue to have an opportunity to improve their standing by receiving and responding to IOIs. Since usage data through an individual routing engine may be statistically thin, it is clear that there is much value in this case to able to aggregate usage data across all data providers. This aggregation function can be performed, as with other examples described herein, by reporting the data to the Coordination Hub using an encrypted client-ID.

Target Finder Requirements

Definitions: "TradeNotes" are advertisements of an electronically executable order in a blind matching system, referred previously herein as Indications of Interest (IOIs).

"Liquidity Tracker" ("LQT") is the system disclosed in co-pending U.S. patent application Ser. No. 09/870,849 for directing and executing certified trading interests. "Liquidity Tracker" is a registered trademark belonging to NASDAQ. Liquidity Tracker's outbound Market Maker orders are examples of TradeNotes; to reach buy-side targets, GUI and FIX TradeNotes preferably are used. We will use the terms IOI and TradeNotes interchangeably herein.

"Advert Request" is a request to advertise an electronically executable order. Liquidity Tracker orders to Target Finder are advert request messages.

"Target Finder" ("TF") is a preferred embodiment of the routing engine described herein, that receives Advert Requests from Liquidity Tracker and Auction Server and forwards TradeNotes to selected buy-side firms; it also routes Previously Presented orders from its users to LQT or AS. It can be licensed into agency brokers (like ECNs) and Order Entry ("OE") firms (OE firms are brokerages that can enter orders into the Nasdaq market but are not permitted under present market rules to receive orders from other participants).

"Auction Server" ("AS") (see U.S. patent application Ser. No. 09/870,849) is a matching engine component that can be added to Target Finder to support local execution of trades; some systems may want AS, or there may be regulatory reasons why OE firms prefer to let SelectNet execute for them. Auction Server differs from Liquidity Tracker or a conventional matching engine in that it enables timed call auctions and other types of matches that are not automatically triggered by the entry of a Previously Presented order.

"BlockLinQ Hub" is a preferred embodiment of the Coordination Hub described herein: a facility that ranks target lists from multiple Target Finder systems and identifies the best N targets. BlockLinQ Hub is described separately in great detail in the latter portion of this description.

A "ticket" contains a buy-side trader's order management info on a given symbol. Buy-side traders preferably start the day sending a FIX order with the amount of shares they want to do during the course of the day; this is their target in that security. A ticketing application keeps track of the trader's progress towards this target, and rejects Previously Presented orders that would exceed the target.

Target Finder will direct TradeNotes to institutions that are accumulating a position on the contra side to a Liquidity Tracker or Auction Server order. Response orders will be routed back to LQT/AS for execution. Target Finder preferably advertises orders from LQT/AS to client firms and routes client orders to LQT/AS. AS can be hosted locally (by an ECN) or it can be remote.

TF functionality preferably includes the following:

(1) Process repeats to advertise order: (a) query to find likely contras; (b) get BlockLinQ permission to send TradeNotes; and (c) send TradeNotes to selected targets.

(2) Forward response order to execute: (a) check response order for any local TF ticket (see below, under Ticketing Facility); (b) check response order with ECN (the ECN will OK or reject the order, implementing credit checking etc., but not match the order against their book); (c) if OK, forward response order to execute the advertised order; and (d) if successful, send execution message to ECN and client; cancel any unexecuted shares.

(3) Previously Presented order entry: (a) check for local ticket; (b) check order with ECN; (c) if local adverts only, route order to LQT/AS with internalization flag; and (d) if external targets are sought, route to LQT/AS with Advert request.

(4) Auction Server: Auction Server is an optional facility of Target Finder. AS holds orders, coordinates advert requests with multiple Target Finders and controls the execution of response orders. Auction Server supports NYSE trading, and pulls in internalized trades in Nasdaq symbols that would otherwise be done in LQT.

System overview: The system preferably: (1) is installed at an ECN or broker-dealer; (2) comprises a data feed interface and query engine; (3) has a Help desk to configure push channels for buy-side traders; (4) pushes to clients using FIX and/or SOAP communication protocols; (5) provides sell-side communications via SelectNet; (6) provides Auction Server communications via a WAN-enabled communication channel; (7) exposes a proprietary API to standardize integration with host brokers (credit, order management and reporting); and (8) provides order handling consistent with LQT rules: (a) same targeting logic as LQT, with buy-side data instead of ACT; (b) response orders must be routed back to the initiator without crossing the ECN's book, to avoid the so-called "penny jumping" problem; and (c) Target Finder will only accept response orders from targeted firms.

Coordinating multiple TF systems: LQT users preferably limit the number of firms they want to notify of an order. A BlockLinQ hub (described below) receives target lists from all TF systems and ranks the best targets globally. Initiators control the number of parties that get notified: e.g., "B3" in the text message field will send TradeNotes to 3 buy-side firms; BlockLinQ finds the best 3 targets across all TF systems. TF bids to BlockLinQ contain only information needed to rank targets: (a) net accumulated size and starting timestamp for each target; (b) Event ID, to map messages from different TF systems; and (c) query quantity (number of shares sought).

Advertising orders—principal use cases: Target Finder advertises LQT and AS orders to buy-side clients and routes response orders to execute. Below is a preferred list of cases where TF will receive and process a "request to advertise":

(1) LQT orders with the "B" and "T" options. LQT users preferably type "Bn" to reach n buy-side firms via BlockLinQ. LQT preferences every known TFID. When TF receives a LQT order with the "T" or "B" option in the text message field, it will find the n most recent contras and submit these targets to BlockLinQ. If BlockLinQ does not respond within 2 seconds, TF will decline the LQT order. The "T" (Target Finder) option is essentially the same except that TF looks at Target Finder trades only, not counting other trades in the feed.

(2) LQT # option. If a Liquidity Tracker order contains a text message containing #q7, TF will look for the most recent trade from LT where the order reference number in the counter that followed the execution ended with the characters q7 and route an IOI to the contra. There may be multiple # options (#q7#r).

(3) LQTR(M) orders with an "Ln" option: TF finds the n most recent firms to have traded with LT in that security, and sends IOIs to the corresponding contras.

(4) LQT to TFID using targeting based on Nasdaq's ACT clearing data. A TF host may receive Liquidity Tracker orders without the "B", "T", "L" or "#" options, when its ACT data indicates it is a recent net buyer or seller in the security. In that case it will send a single TradeNote to the buy-side firm that has most recently accumulated the net position, or decline the LQT order if none have done so. If the text message from Liquidity Tracker contains "N1", or if it is blank, TF sends a single IOI to the most recent contra.

(5) Auction Server advert requests. Auction Server preferably will send Target Finder advert requests over a WAN-enabled communications channel. Target Finder preferably will route response orders back to Auction Server for execution. For Nasdaq symbols, it preferably will route the order back over SelectNet; otherwise, the response order will be routed back over the same WAN-enabled channel. Auction Server advert requests preferably will support the Liquidity Tracker "B", "T" or "#" options.

(6) Internalization priority. If a Target Finder client enters an order and this Target Finder finds the requested number of contras with the full query quantity, TradeNotes preferably are sent out without BlockLinQ intervention; the order is routed to LQT/AS with an internalization flag. LQT/AS returns with a message that the order is received and ready to be executed. LQT will put an "internalization flag" in the text message back to this TF to indicate that this order has already been advertised. If some of the local contras meet the parameters, but the initiator wanted more contras, the order is sent to LQT/AS with advert parameters to prompt the other TF systems to seek the additional targets. TF sends BlockLinQ a message alerting it that some targets met the full quantity; BlockLinQ will not permission any targets for a lesser quantity.

(7) SelectNet Advert Requests. TFID preferably also can process SelectNet orders from some other Market Participants (MPIDs), configured in a table of permissioned MPIDs (for example, the host broker's MPID). Response orders are converted into SelectNet executions or auto-executable counters. This allows host brokers to automate their sales desk operations by advertising the top of their book to any customer who has been working on the contra side. Two text message options preferably are supported: "In" (send to n internal contras), and "ALL" (send to any internal contra that either has recently accumulated the displayed quantity, or has accumulated any net quantity on the contra side to this order during the past 24 hours).

Targeting logic: (1) Default query: Target Finder preferably will display orders to the N buy-side institutions that have most recently accumulated a net position on the contra side of the order—e.g., for the greater of 5000 shares or the order's displayed quantity.

(2) Penalty Box: If a trader receives a TradeNote and fails to respond, the trader may be excluded from receiving further TradeNotes in that symbol for a period of 30 minutes (more on this below). The initiating user can cancel and re-enter the order. With non-respondents in the penalty box, TradeNotes automatically get delivered to the next targets.

(3) Watch List: Users preferably can set watch lists to receive TradeNotes in certain symbols or in all symbols, watch only TradeNotes above a certain quantity, or at least as aggressive as the NBBO or midpoint. Advert Request messages carry a price aggression flag, which is set by Liquidity Tracker to be the character "P" (Passive) if the order is a buy order for less than the National Best Bid for the security, or a sell order for more than the National Best Offer; it is set to "B" if it is at least as good as the NBBO but not as good as the midpoint, and to "M" if it is a buy at or above the midpoint, or a sell at or below the midpoint. Since it receives this price aggression flag, Target Finder does not need a level 1 feed (i.e., an information source providing the current NBBO prices in real time) to implement trader filters by price aggression.

(4) Target only reachable traders: When looking for TradeNotes targets, Target Finder preferably will only consider firms that have a push channel and watch list to receive the TradeNote.

Systems integration; communications and interfaces: Target Finder is an IOI smart routing service. It is not a trading system and does not create a separate liquidity pool. It preferably leverages SelectNet and Auction Server for execution services, and it supports FIX and web client communications. An API standardizes integration with the host broker.

(1) SelectNet interface: Target Finder preferably interfaces with SelectNet through a Previously Presented MPID, which is set up within SelectNet as a Previously Presented firm type that doesn't post a quote. Previously Presented TFIDs (TF identifiers) don't post a quote. TFIDs decline any order that is not from Liquidity Tracker or from another TFID. TF executes/counters LQT orders same as a MM. SelectNet trades involving TF orders will clear with the TFID.

(2) Client Interface: TF preferably supports FIX, and optionally a trader GUI. Traders can enter tickets via FIX from their Order Management Systems (OMS), and choose to receive FIX executions. FIX orders versus FIX tickets: FIX orders with an IOI ID are response orders. Firms preferably will specify how TF should interpret FIX orders that do not carry an IOI ID: Option 1: They are always placements (add the size to the ticket). Option 2: If they have a price attribute or a peg they are executable orders, else they are placements. Option 3: All FIX orders are executable orders. Previously Presented orders entered via FIX may have targeting parameters in the text field to be parsed as per the Liquidity Tracker protocol, or they will be given default advertisement parameters if the text field was not used. SOAP: push agents deliver TradeNotes to a desktop messenger-type application; clients can click to pull up a response order form.

(3) ECN interface: Target Finder preferably exposes a proprietary API for integration with host brokers. Help Desk API: Help desk operators can add or block push channels, add/remove users, give client support with certificates, passwords, etc. A data feed processor detects Previously Presented firms and prompts the Help Desk to configure the corresponding push channels. A preferred embodiment provides a default help desk GUI, or the hosting brokers can build their own GUI. Trading API: (a) validate client orders: TF sends a message with the client order details, gets a message back with an accepted or rejected status; (b) order updates: report executions/cancels to the host broker. Order Management (local or at host): a preferred TF ticketing application receives FIX placements and checks response orders against the trader's target. If there is no TF ticket, the order validation prompts the host to check the firm's ticket on the ECN. To display the ticket on the trader's GUI, TF requests the ticket data from the host ECN.

Auction Server: Target Finder preferably supports routing Nasdaq and NYSE orders. To support trading in NYSE listed securities and internalizing trades on Nasdaq symbols, the Auction Server software may be licensed to an ECN or broker-dealer. Auction Server will handle midpoint and priced orders as private "auctions," open for execution only by response orders from notified parties. It will use Target Finder for internalized trades or, if it doesn't find the requested number of internal contras with the full order quantity, will send TradeNotes through other Target Finder systems. Trade data alone may not provide sufficient targeting capabilities for small cap and listed stocks, so Auction Server preferably will use additional targeting data, including data on orders. Target Finder and BlockLinQ add corresponding functionality.

Target Finder regulatory status: Target Finder offers IOI services; the possibility of internalization is included within the LQT regulatory umbrella. Auction Server regulatory status: ECNs that host Auction Server should be able to process Nasdaq trades without a Previously Presented regulatory filing and, it follows, NYSE trades, since the same trading logic applies. 1997 Order Display rules: These rules stipulate that orders smaller than 10,000 shares that are displayed to more than two market participants should be displayed to the entire market. Target Finder will add only IOIs to buy-side firms; the host brokerage will not have view access to outbound IOIs, so the proposed service is not affected by the 1997 rules. Order Handling rules: Response orders will be labeled as "not held," so they will not be subject to rules governing the interaction of held orders with market liquidity. For example, they may execute outside the market.

Exclusivity: In a preferred embodiment, Target Finder will only look at fills data pertaining to buy-side firms. It will look at the clearing MPIDs on the trade record to know which parties are buy-side (same MPID as the host broker or a Target Finder MPID) or sell-side (any other MPID). Target Finder preferably is configurable to filter out fills data based on the firm type (buy-side or sell-side). Interbroker trades on Nasdaq National Market (NM) securities will be executed over SelectNet. NYSE listed trades may be printed on Nasdaq's Intermarket.

LQT/TF/AS preferred fee structure: All trades involving ACT data, explicitly listed MPIDs or Liquidity Tracker data (such as the "L" option) are considered LQT trades and incur a LQT fee on the initiator and the respondent. When users enter an order as a LQT OE firm using the "B" (or "T") option, LQT will charge the order entry fee and a system operator will charge an equivalent fee for the TF respondent. *69 trades are repeat trades and inherit the billing type of their parent. Orders entered from a Target Finder host and executed with a counterparty that was found with the use of Target Finder data will pay the system operator on both sides of the trade. If the counterparty to a TF-entered order was found by LQT, then LQT charges the recipient fee, and the system operator charges the OE fee. LQT will not bill for internalized trades where the same TF has both the OE and the MM side of the trade. When Auction Server executes an internalized trade as a service bureau, or trades between one TF as OE and another TF as respondent, its hosting broker will charge a fee similar to a SelectNet fee, for the service bureau functionality.

Preferred billing requirements: TF preferably will recognize the following types of trade for billing purposes (counting separately small caps, National Market and NYSE symbols). The billing code is extended from LQT; some cases do not apply (marked "N.A."): (a) N.A.; (b) LQT-TF with a "B" or "T" option; (c) LQT-TF with no "B" or "T" option; (d) TF-LQT without a "B" or "T" option; (e) N.A. (TF does not distinguish D and E type trades); (f) TF-TF internalized trade executed by Liquidity Tracker; (g) TF-LQT with a "B" or "T" option; (h) TF-TF internalized trade executed by local Auction Server; (i) TF-TF internalize trade executed by a foreign Auction Server; (j) Remote TF-OE leg of an AS-executed trade (TF routes NYSE orders to AS); (k) Remote TF-MM leg of an AS trade where the MM leg was executed over SelectNet; (l) Remote TF-MM leg of an AS trade where the MM leg was not executed over SelectNet; (m) Host broker to own Auction Server (e.g. GSCO to GSTF); and (n) any other broker to Auction Server (that is not LQT, host broker, or TFID). In each category, there may be per share fees with a possible minimum execution fee (for example, pay the greater of $10 or 1 cent/share), an order entry fee, and a possible cancellation fee. Target Finder preferably will produce a monthly billing report.

Push Channels

GUI/Web: (1) User authentication: users who want to use the trading GUI will sign up, get a login ID and password, and download a certificate. All users are either Security Administrator (SA) or Trader. A Security Administrator is a type of user with all the rights of a trader plus the power to add or delete other users. When a trader is added, he can start trading immediately. A user with a certificate will also be able to pull TradeNotes on a web site. Other web functions are accessible without a certificate (see trading GUI description below).

(2) User watch list: receive notifications over all symbols or a list of symbols. User can filter out notifications with displayed Qty less than WLMinBlockSize (e.g., 1000 shares), or filter out notifications that aren't at least as aggressive as the BBO or the midpoint. The price and size filter applies to all symbols.

FIX: (1) Firms can specify whether they wish to receive FIX IOIs. If they do receive FIX IOIs they always have a push channel so they can be targeted, and will be placed in the penalty box if they don't respond. FIX orders that carry an IOI ID are interpreted as response orders.

(2) FIX watch list: a firm can configure a watch list to receive FIX IOIs for all symbols or a list of symbols, with a size threshold, or filtering out notifications that aren't at least as aggressive as the BBO or the midpoint.

Reachable firms: A firm is "reachable" for a given notification if either: (a) it has an open channel to receive FIX IOIs and has a FIX watch list to receive this notification, or (b) it has at least one logged-in user with a watch list to receive this notification. If a firm is not reachable, it will be excluded before executing the query to find targets. It is expected that almost all firms will receive FIX IOIs.

"Liquidity in DELL": Even if they don't have the GUI installed, traders can call the help desk and set up a pager number or email address and a user watch list, or do the same over the web. When their firm receives a TradeNote from TF they'll get a (non-secure) message calling their attention to this Previously Presented TradeNote, with only the symbol information (no side or size). They then can go look at their IOIs and enter a response order.

Penalty Box

Add: when the firm has received a notification indicating that the order was at least as aggressive as the midpoint, was for at least PBMinBlockSize shares with a Min Qty no greater than PBMinBlockSize, stayed open for at least PBMinTIF and the trader did not fill either the displayed quantity or PBMinPartialFillSize.

Remove: after PBDuration or when a trader at the same firm has entered a Previously Presented order with a displayed quantity of at least PBMinBlockSize that either filled PBMinBlockSize or stayed open for PBMinTIF.

Default values: sizes 1000 shares, PBMinTIF=1 min, PBDuration=30 min. Note: PBMinBlockSize=WLMinBlockSize, so a firm can elect to see only notifications that would throw them in the Penalty Box (PB).

Ticketing Facility

The FIX ticketing facility receives FIX messages carrying a number of shares the trader wants to work through TF, and keeps track of the number of shares he's worked, the number that are in the form of open orders, and the number that still needs to be worked. This information is provided to the user and used to check Previously Presented orders and reject them if they exceed his anticipated limit or go in the opposite direction.

Ticket: There is at most one ticket per firm and symbol. A ticket preferably will comprise the following data:

| Attribute | Description | Comments | Type |
| --- | --- | --- | --- |
| Firm | | | String |
| Symbol | | Up to 5 characters | String |
| Security Type | | TF will reject orders on opposite side. | String |
| Side | | | Char |
| Target | | Number of shares to do during the course of the day. | Int |
| Filled | | Number of shares up to this point. | Int |
| Working | | Total size in currently open orders. | Int |
| Leaves | | Target-Filled Previously Presented order should not exceed (Leaves-Working). | Int |

Lifespan: Tickets stay open during the course of a day, and are canceled before starting the next trading day.

Messages that affect the tickets: (1) Order entry: If the firm uses a local ticketing application, check the Previously Presented order against Leaves—Working. If it exceeds the size, the lesser size will be allowed to proceed while the remainder will be canceled. If there is no ticket, the order will be checked with the host broker's ticketing application. If it gets rejected by the host broker it will be canceled in whole.

(2) Previously Presented placement; cancel placement: For a Previously Presented placement, add the shares to the target. If a trader cancels a previous placement, the Previously Presented target will be the greater of: (a) the previous target less the canceled shares, or (b) the number of shares already worked or being worked in that security (Filled+Working), or zero.

(3) Order check OK: When the host broker has checked a Previously Presented executable order, add the corresponding shares to "Working."

(4) Execution; cancel: When shares are successfully executed, remove them from "Working" and add them to "Filled." If shares are canceled (as in a partial fill, a rejected execution, or a user cancel), remove them from "Working."

Ticketing Facility API: The trader GUI preferably will display the ticket information per symbol.

Order Manager Message Processing

Preferred network topology: multi-centered star network, where every Auction Server, Liquidity Tracker and BlockLinQ are each connected to all Target Finders, but are not connected to each other, as represented in FIG. 1B.

Messaging Overview: Target Finder customers enter orders with advert requests. These can be local (the contra is a Target Finder client) or external. Target Finder implements local advert requests and routes the order with any external advert requests to Auction Server or Liquidity Tracker, depending on a preferred Configuration Table (see below). Auction Server receives orders with external advert requests, keeps the order and broadcasts advert requests out to TF systems. Target Finder receives Advert Request messages from LQT/AS, processes them and routes response orders back for execution. Nasdaq response orders go over SelectNet.

Target Finder processing of Advert Requests: (1) Advert requests: Liquidity Tracker will use SNET (SelectNet) orders as an implementation of an Advert Request message within the SelectNet protocol. Validate MPID: TF will decline all orders from MPIDs other than LQTR, LQTM, and Target Finder MPIDs. "LQTM" is the MPID preferably assigned to Liquidity Tracker. System operators will add/remove AS MPIDs; removal takes effect immediately. If there are multiple AS MPIDs one will be selected as a routing destination for Previously Presented orders. Decode text message field: the text message field from LQT will be encoded. Advertise: (a) if it isn't an internal order, apply targeting instructions to find targets, and if there are no targets at all in that symbol, decline the SNET order; (b) for "B" or "T" options, get BlockLinQ permission to notify targets; (c) send out adverts to selected targets; and (d) if no targets, decline the order.

(2) Auction Server Advert Requests: Target Finder will expose an interface to receive advert requests directly from Auction Server. Auction Server to TF communications will be based on Secure Socket Layer (SSL) technology as is well known in the art. They preferably maintain a heartbeat. Orders are canceled on loss of connectivity.

Clearing supercap: Target Finder preferably will listen to risk management messages over Nasdaq's Service Delivery Platform (SDP) indicating when firms exceed their clearing supercap: a credit limit set by a clearing firm on a correspondent (a broker) so that an alert is broadcast to the marketplace when this correspondent's aggregate trade volume surpasses said credit limit. If either the Target Finder MPID or the MPID of an Auction Server host broker exceeds its supercap, Target Finder preferably will reject its Advert Requests and cancel orders that would otherwise have been routed to this Auction Server. Auction Server Advert Requests to Target Finder support: (a) Market type (NYSE, Nasdaq Small Cap, or Nasdaq NM); (b) Min Quantity; and (c) all LQT "text message field options" (see above). Process is preferably essentially the same as for SNET orders.

(3) SelectNet Advert Requests: (a) Is this MPID permitted to advertise its orders? If not, decline, (b) Apply D and $ options to create outbound advert size and price. (c) Request price quote from SDP, for watch list and penalty box logic. In general, if an advert request doesn't carry a price aggression flag, then get it from the SDP. (d) Process advert request as for LQT advert requests. The text message field preferably is not compressed. TF will recognize the following text message field options in SelectNet advert requests: (i) Price discretion: $; (ii) Display Quantity: D; (iii) Most recent Institutional contras (local only): "I" option; (iv) Contra in a previous execution based on the order reference number (same two MPIDs): #; (v) All contras: type "ALL" in the text message field; (vi) Not supported: "N", "L", "B", "T", and "*69."

Response Orders Validating the order: (a) If a FIX order carries an IOI ID, it is a response to a TradeNote. The IOI ID will be compared to the ID on the FIX IOI sent to that same firm. (b) No price validation: the executing party (LQT/AS) will execute only if the price is valid. For SelectNet, use the price override flag. (c) Order Management and FIX placements: (i) If the firm has a made a FIX placement to Target Finder, check local ticket; (ii) Else, or if the check failed, mark the order for ticket checking with the host ECN. TF ticketing facility preferably maintains state as to which ticket the order came from. (d) Check with broker: send message to host broker with order details and flag to apply (or not) the host's OM functionality. Host broker will respond with an accept/reject message. If rejected, cancel the response order with the client. If valid, route to the execution point with the respondent's price and size, following the applicable protocol as described in the cases below.

(1) Response to LQT Advert Requests: Counter with the respondent's price and size, and type the applicable routing option in the text message field of the counter (using one of the following characters: N, L, B, T or #). If the attempt to execute the LQT order fails because the order is no longer there (e.g., race condition, order was canceled), TF will get a cancel UM on the original advert request order and the counter will not be declined. If the execution fails because of a mismatch in price or minimum quantity (Min. Qty.), LQT will decline the counter and leave the advert request order open. If an execution is successful, an execution UM with the true size and price of the trade and a subsequent counter carrying the LQT billing flag in the text message field are expected. Note that if LQT doesn't decline a counter, that means the response was too passive for penalty box purposes.

(2) Response to Auction Server Advert Requests on Nasdaq symbols: Send a Previously Presented SelectNet order to the ASID and expect an execution UM or decline UM back (SelectNet orders, recently renamed SuperMontage directed orders, are orders to buy or sell a Nasdaq listed security routed from one market participant to another using Nasdaq's SelectNet trading system). The SelectNet order will carry the IOI ID in the text message field so AS can identify it as a response order.

(3) Response to Auction Server Advert Requests on NYSE symbols: Send an execution request message over its direct channel; the response will indicate the size and price of the execution for reporting back to the party who entered the order. A subsequent UM indicates the trade has been locked-in and can be reported to the broker (4) Response to SelectNet Advert Requests: Execute the order or counter with parameters that will auto-execute; do not counter with greater size or a non-matching price. Rare case: the auto-executable counter or execution could convert into a counter to the MM in the event that the order had just timed out. If this happens, TF preferably attempts to cancel the counter; or failing that, waits for the order update UM (execution or cancel).

Previously Presented order from GUI or FIX client: (a) Validate as for response orders (see above). (b) Send TradeNotes to any local targets and reduce advertisement instructions for finding external targets. For example, if the trader had asked for three targets and two local ones are found, the reduced advert parameters will seek one additional target. The reduced advertisement instructions are passed on to the executing system (AS or LQT) together with the order. (i) If the initiator requested buy-side targets ("B" or "T" options), run local query to find the number of contras with the full query quantity. Send TradeNotes to these contras. If fewer than the requested number of targets met the full quantity, add the remaining targets to the list of those that must be found externally (see below), and send BlockLinQ a message that some targets did meet the full quantity. If no local targets meet the full quantity, pass the full "B" option with the external advert request and send BlockLinQ a message with the best local contra. (ii)*69 and # orders: when the user enters an order with a request to send an advert to the contra from a previous trade, TF will identify the execution point where the trade took place. If it's a local execution, send a TradeNote and remove this *69 target from the list of targets to find externally. If it's external, place the execution ID assigned by the executing party in the advert request message. LQT will expect the MM order number, AS will expect an AS-generated execution ID including the executing AS's own identification, since there could be more than one AS. (c) Route the order and external advert requests based on security type (Nasdaq or NYSE), the type of targets sought (buy-side or sell-side), and whether the Auction Server is local or remote, as specified in the Configuration Table below. *69 targets are "buy-side" if the prior trade executed on an AS system, or "sell-side" if it was a LQT trade.

Configuration Table

| Security Type | Targets | Auction Server | Destination |
| --- | --- | --- | --- |
| Nasdaq | Sell-side | Local | LQT |
| Nasdaq | Sell-side | Remote | LQT |
| Nasdaq | Buy-side | Local | AS |

-continued

Configuration Table

| Security Type | Targets | Auction Server | Destination |
|---|---|---|---|
| Nasdaq | Buy-side | Remote | LQT |
| Nasdaq | Both | Local | LQT and AS (*) |
| Nasdaq | Both | Remote | LQT |
| NYSE | All | All | AS |

(*) If there are both buy-side and sell-side advertisements, TF will split the order into two parts: it will route the lesser of the display quantity or the available reserve quantity (reserve minus display) to LQT, and the rest to AS. If the reduced quantity of the LQT order is less than the display quantity, then reduce the display quantity to match the LQT order quantity.

Note:
If a TF1 system normally routes its orders to AS1 and a TF1 customer enters an order with a *69 advert request that points to an execution that was mediated by another Auction Server/Target Finder system (AS2), then AS1 does not know which TF system is able to notify the *69 contra. AS1 will broadcast a *69 advert request message to all TF systems with the AS2-generated execution ID. The Target Finder that held the contra to the previous execution processes the advert request.

(c) Supported order attributes and routing options:

|  | Description | Auction Server | LQT |
|---|---|---|---|
| Security Type | Nasdaq, NYSE | Yes | Nasdaq only |
| Symbol |  | Yes | Yes |
| Limit Price |  | Yes | Yes |
| Midpoint Peg | Will execute at NMBBO midpoint. | Yes | Yes (LQTM vs. LQTR) |
| Price Discretion | Not applicable to midpoint orders: $02: price will be displayed 2 cents more passive. | Yes | Yes |
| Time In Force | Minutes, or "day". | Day only. | Yes, Min = 3 minutes. |
| Mm Quantity | All quantities will be rounded to whole lots; AON odd lots are rejected. | Yes | Yes |
| Quantity |  | Yes | Yes |
| Display Quantity |  | Yes | Yes |
| "N" | Maximum number of ACT targets. | N.A. | Yes |
| "B" | Max Number of BlockLinQ targets. | Yes | N.A. |
| "#" | Recent contra identified from past trade. | Yes | Yes |
| "*69" | Most recent contra(s) to this OE firm. | No | Yes |
| "C" | Cycling. | No | Yes; not applicable to orders with "B/T" option. |
| "L" | Most recent contras that traded on LQT. | N.A. | Yes |
| "T" | Most recent net buyers counting only Target Finder trades. | Yes | N.A. |

SelectNet Order Update UMs: (1) Timeout or Cancel on an order from LQT: (a) Cancel the TradeNote; if it was a FIX IOI, remove the FIX IOI. (b) Check penalty box rules and update status accordingly. (c) If the cancel/timeout UM follows an execution (with "queued" status), then cancel the response order with the host broker and the user. (The responding firm will not be placed in the penalty box).

(2) Execution UM (following counters to LQT, orders routed to LQT, and response orders to AS via SelectNet): (a) Update the response history data; check penalty box rules for possible removal. (b) Send an execution message to the host broker. (c) If the client was configured to receive FIX executions, send a FIX execution. If the order was from a user GUI, send an execution to the user. (d) Grab LQT billing flag in counter text message field and update billing data for TF and LQT billing.

(3) Decline or Timeout following counters to LQT, orders routed to LQT and response orders to AS via SelectNet: (a) Cancel message to broker, GUI client, or FIX if it was a FIX order. (b) A declined response order to LQT was too passive (or the LQT order was too passive) so it has no effect on PB logic; it remains as if the firm had not responded. (c) AS declines the SelectNet order whenever it can't execute. As in the LQT case, a decline on a response order will not have any effect for PB purposes. Since AS is the book of record, TF will only accept execution or decline UMs as valid order update messages on its AS-routed response orders. It cannot assume that a response order has timed out or been canceled should SelectNet service be lost; its response orders have Lifespan=Day.

Number of Targets Notified: BlockLinQ sends the initiating Target Finder a message containing the number of external targets that were notified (and the displayed quantity if no one met the full query quantity). Target Finder will report the total number of buy-side targets to the user after 30 seconds, adding local targets and sell-side. LQT does not reveal the number of targets, but TF will know when there are no sell-side targets at all: LQT declines the OE when it doesn't find a target. Auction Server Remove Advert Message: When the order is filled or canceled, AS sends a message to remove any posted adverts on the order. If a firm entered a valid response order but lost a race condition, it will not be placed in the penalty box. To enable this, the AS cancel advert message to that TF preferably lists response order numbers with a status flag: (a) too passive; (b) lost due to a race condition; or (c) executed.

Data Feed Handler and Query Engine

This functionality preferably is similar to that of Liquidity Tracker's query engine facility.

ECN trade data feed: An operator of a preferred system may specify the feed protocol. Each trade record preferably must contain a firm ID for each side of the trade, containing symbol, side, and quantity. Optionally, the host broker can include a FIX address for each firm in the trade. TF preferably supports filtering out all data pertaining to firms that do not permit viewing of their data.

Previously Presented trade record: TF get fills from the ECN data feed and maps them to push channels for delivering TradeNotes. When a Previously Presented trade record refers to a firm that doesn't yet have a push channel, one may be created dynamically, or if that is not possible the help desk may be alerted and that firm added to a list of firms that are not properly configured. The help desk operator can then pull up this list and configure push channels. Case 1: a firm is identified as participating firms with configured push channels: store corresponding fills for query engine. Case 2: a firm is not recognized: store fills record, if the trade report contained a FIX address store it as push channel; else prompt help desk to create a push channel.

Query engine: (1) Exclusions. The following are not eligible targets: (a) firms in the "penalty box"; (b) firms that do not have a configured push channel; and (c) firms where the only alert rated push channel is the GUI and all logged-in users have watch lists that will not receive this advertisement.

(2) Processing query requests: Looking only at firms that are not excluded, return the list of <n> most recent net buyers or sellers (unit=firm), looking back at most 24 hours (configurable), or the largest net accumulator if no firm meets the whole query quantity. The returned data must include the time stamp of the first trade in the sequence and the total net quantity since then.

(3) Find *69/# contra: LQT advert requests preferably carry the # option with the last characters in the order reference number that maps to a prior LQTR or LQTM event. AS advert requests preferably will carry an execution ID on a past trade. Client advert requests preferably will carry a client execution ID. TF preferably will map this ID to the MM order reference number if the prior trade was on LQT, or the AS execution ID if it was on AS. The MM order reference number is that which appears in the text message on the counter following a LQT execution UM.

Operational; Security; Logging; Capacity and Sizing

Recovery: Operating, licensing, and maintenance costs are preferably minimized. Target Finder's main function of advertising orders is not mission critical and therefore some loss of data is acceptable in processing advert requests. Loss of data regarding open liabilities (orders and executions) is not acceptable. (1) Target Finder preferably is a high availability service. (2) Preferably, no trade data can be lost: all client messages involving trading activity (orders, order updates, etc.) are recoverable. The FIX engine preferably is also able to resynchronize with clients so it can't lose any data. (3) When Target Finder fails, an operator preferably will cancel all of its liabilities within SelectNet. In the event of a partial failure the system will automatically cancel any open orders in the securities handled by the failed subsystem. (4) While TF is down, operators preferably will launch a backup application that declines all LQT/AS orders. (5) TF preferably can recover within 30 minutes. Redundant hardware may be stored on site. (6) Auction Server preferably is the book of record for trades executed by Auction Server (whether or not SelectNet is involved). (7) SelectNet preferably is the book of record for trades executed by LQT. (8) When TF recovers, it preferably will query all relevant AS systems and scan SelectNet to learn the status of any pending LQT IOIs or orders. If a SNET/AS trade had been locked-in but did not get processed fully prior to TF failure, the system preferably will complete processing on recovery. This includes: host broker execution, TF query facility update, and FIX or GUI execution. (9) TF-AS communications preferably include a heartbeat; all orders routed over this channel are canceled upon loss of communication. (10) TF preferably will not maintain a heartbeat with the client GUI. If a trader shuts down his GUI, his orders won't be canceled. (11) Heartbeats preferably are not required on the TF-host broker connection. The system rejects orders than can't be validated and queues all other broker messages (order updates). (12) When TF loses the ability to service a client firm's electronic requests to cancel his orders, it preferably will automatically cancel all the firm's orders. This means both TCP-IP and FIX connectivity is lost. A 2-minute delay in detecting loss of connection is acceptable. (13) Redundant SDPs: TF preferably has 2 SDPs. (14) Security model: preferably public key encryption and password authentication model. (15) Operator consoles preferably will indicate whether the system is operating normally and report loading and average latency on order processing.

No View Access: Outbound TradeNotes are confidential—the host brokerage will not have view access to outbound TradeNotes. This preferably will be subject to independent audits.

Logging: All message traffic through the system's SDP, FIX and API interfaces should be logged. The help desk will need to be able to trade sequences of events concerning an order, including number of TradeNotes sent to local contras, response orders received, SelectNet execution, and related UMs.

Capacity and sizing: (1) Capacity of a preferred embodiment is to process 5 orders per second on average. If backed up, TF preferably will decline Previously Presented LQT/AS orders. Latency on sending TradeNotes on Previously Presented orders should not exceed 10 seconds. (2) Latency on passing response orders through to SNET/AS preferably will not exceed 0.5 seconds, and likewise for reporting SNET or AS executions or cancels. (3) Data feed processing, latency, and query engine capacity requirements are preferably the same as for LQT.

Latency: (1) Advert requests: Latency on processing advert requests preferably is less than two seconds for sending a TradeNote for a LQT order with the "N" option. Up to four second latency is acceptable for other advert requests, including those that require BlockLinQ permission.

(5) Response orders: TF preferably will seek to minimize the latency on executing response orders. If response order handling fails at any point, the response must be canceled. A 0.1% failure rate is acceptable in handling response orders. Examples of failures include cases where the broker check fails to complete by timeout and failed delivery of a message.

Help Desk

A help desk preferably will be operated by the host brokerage, which has the best knowledge on client relationship management, authentication, etc. The preferred software enables a broad range of operator functions, including user and firm management.

Create/modify firm: A firm preferably is identified with a value of the FirmId field in a Previously Presented trade data entry from the hosting broker. It maps to a push channel for delivering TradeNotes. A firm is automatically created when it is detected in the trade data feed. The help desk preferably is able to add a firm prior to this, and configure or modify its communications, including the FirmId that will identify it in the trade data feed. When incoming trade data pertains to a Previously Presented firm but does not carry sufficient instructions to open a FIX session with this firm, the help desk will be prompted to act. Help desk operators will pull up a list of firms with trade data and that do not have a push channel, select a firm and edit the relevant data to add a FIX address and/or user push channels, or mark them as firms that are known to the system but do not want to receive TradeNotes.

Preferred features: (1) Permission to store data: "Yes" by default, but the help desk should be able to turn off data storage for a firm if clients insist they don't trust the system. (2) FIX address. (3) FIX IOI: does the firm want to get FIX IOIs? (4) FIX executions: does the firm want to get a FIX execution message from Target Finder? If yes, they will get FIX executions for all TF mediated executions, whether or not the corresponding order was entered via FIX. (5) FIX ticketing logic: does the firm use FIX to enter placements directly to Target Finder, or should FIX orders from that firm be interpreted as executable orders with default targeting parameters. (6) Set/modify default targeting parameters (applicable to orders entered via FIX): (a) number of buy-side targets; (b) number of sell-side targets (LQT); (c) number of recent TF contras; (d) number of recent LQT contras; and (e) maximum displayed quantity (will display whole order if less). (7) FIX watch list: create or modify the firm's watch list to receive FIX IOIs.

Create/modify user: A push channel preferably is identified with a user. There can be 0, 1, or a plurality of users per firm. Users must provide a phone number and email address; if they want to use the GUI they'll choose a login name (unique by firm) and a password, and download the GUI. A test lets the user verify that the push channel is operational. A user has the default role of a trader; also, a user may be entitled to manage its firm's users, in which case that user gets the role of security administrator. Users can also be set up to get brief messages announcing TradeNotes, for example "liquidity in DELL." They can provide a paging number for that purpose, or specify that such messages should be sent to their email address. Help desk operators preferably will assist users in downloading certificates. Firms that elect to manage their own users preferably access a web site; the Security Administrator preferably must authorize Previously Presented users via email.

Help desk operators preferably can pull up a list of firms with active push channels and block one from receiving TradeNotes, or reactivate one that was previously blocked.

Help desk operators preferably can pull up a list of firms and expand the list of users in a given firm, then modify user settings including password, telephone number, email address. For password assistance, a help desk operator may authenticate the user using by user data, then email the password.

The help desk preferably also is able to pull up the orders entered by firm and symbol, and for each entered order see the related external messaging events: order routing events, order status updates.

Default settings: When a firm is created and given a FIX destination, it preferably will initially have a watch list supporting all symbols, and a size threshold to cut out IOIs that display a size below PBMinBlockSize or are too passive. When a user is created it will get a watch list with these same settings, whether or not the trader uses the GUI. Messages announcing TradeNotes will be sent to his email address until he calls up to cancel the emails or responds to the email requesting removal. A trader can send an email to the help desk operators to subscribe to email notifications; this request may be handled manually—help desk operators will authenticate the trader. Default targeting is 2 BlockLinQ targets (as "B2" option in LQT).

Trader GUI; Web Settings

TradeNotes are preferably displayed as short messages. They preferably come to the trader's attention without taking over central portions of the screen or impeding his current activities. A message (for example, "Buyer of DELL, 10M w. reserve") should stay visible for a few seconds (user configurable), then disappear. While the message is visible, the trader can click on it to bring up a pre-configured response order form similar the response order forms known in the art, for example the order form that comes up when a trader clicks on an IOI in an Order Management System, such as the MacGregor OMS. A tool tray icon lets the trader bring up a list of TradeNotes and click to respond.

The GUI should facilitate the trader's workflow. For example, if there was no reserve, then the size can only be ticked down. For priced orders, the OE's price also shows up—if there was price discretion, an arrow lets the recipient choose a more passive response. The time to bring up a pre-configured response order form is preferably less than half a second. Traders that need the liquidity want to get to it quickly.

Users that have downloaded a certificate will be able to pull their TradeNotes using a web browser. A system web site preferably supports other user functions that don't require a client side certificate, such as editing a watch list, setting default advert parameters (applicable for all symbols), or entering an order with custom or default advert parameters. Security Administrators preferably are able to edit their firm's attributes on this site and authenticate Previously Presented users or remove old ones, including all the FIX options (watch list, default advert parameters, etc.). Non-certificate users are able to pull non-secure advert announcement messages, for example, "Liquidity in DELL."

A preferred order entry form includes targeting options, except for targeting based on orders, which is preferably browser based.

If a client firm has access to Target Finder through multiple brokers, there preferably is a drop list of hosting brokers on the order entry form. TradeNotes messages are from individual TF systems, so the response order form does not give the option of choosing the broker. If a user gets targeted through his trading on two Target Finder systems, he'll get two TradeNotes. Multiple TradeNotes preferably do not overlap, so the trader can see all messages.

Right-clicking on the tool-bar icon preferably brings up "exit", "options", or "Previously Presented order." Options let the user configure a watch list, modify the time TradeNotes are displayed, etc.

Auction Server

The Auction Server facility preferably is installed at ECNs that host a Target Finder system and want to execute internalized trades locally and to be a recipient for NYSE listed order flow.

Previously Presented Order: Auction Server receives orders from Target Finder, possibly with a remote advert request. If there is a remote advert request, it generates a BlockLinQ event ID and sends advert request messages out to all available Target Finder systems. This processing is similar to the LQT "B/T" options. Auction Server advert requests preferably include a price aggression flag to specify whether the order, at the time it was received, was priced at least as good as the NMBBO, or at least as good as the midpoint.

Processing response orders: Auction Server preferably receives response orders via SelectNet or its own Target Finder communication channel. It preferably decides executions on a first come first served basis and updates its own record of the trade, then processes the execution via SelectNet or its TF channel and CTCI, respectively. If a SelectNet routed TF response to AS fails to execute, AS preferably will decline the order. TF will expect either an execution UM or a decline UM, or both in the event of a partial fill.

For response orders entered through a direct channel, AS will respond to the submit order message with the order status after match check, including shares filled and price, to reduce latency. A separate order update message preferably is dispatched when the trade has been successfully locked-in (reported for clearing).

Closing orders: If an order times out, is canceled, or gets completely filled, AS will close the order, reject any further attempts to execute, and cancel any local or external adverts. The cancel advert message to a TF system will contain a list of response order numbers from that TF and a status flag on each, which can be (a) too passive; (b) lost due to a race condition; or (c) executed.

If the order was at least as aggressive as the NMBBO, the user preferably finds out how many parties were targeted after a minimum wait of DiscoverTime (30 seconds), and the largest displayed quantity (which could be less than his displayed quantity if no TF system could find a party that accumulated that many shares net). Auction Server will send a message to the TF system that entered the order, for forwarding to the user. If the order is canceled prior to DiscoverTime or if the order was less aggressively priced than the BBO when it arrived at AS, this message never gets sent. BlockLinQ preferably reports the number of externalized targets and the initiating TF system reports the number of local targets; the total is the sum of these two numbers.

In a configuration with two or more Auction Servers (AS1 and AS2), a client of AS2 can enter an order with instructions to notify the contra in a trade that was executed as AS1, where the counterparty was a client of another TF3. AS2 will send TF1 an Advert Request with instructions to send a TradeNote to the counterparty in this past trade; AS2 knows the immediate counterparty was a TF1 client so he forwards the advert request to TF1. Using the trade data, TF1 maps to the order ID of the original order from TF3 and forwards the Advert Request to TF3, referencing the TF3 order ID.

Auction Server preferably uses a pricing facility for executing and validating Midpoint orders. It will handle a level 1 feed and process requests for a midpoint price. It will place the timestamp of the last heartbeat and the most recent quote update on the response. If the feed was lost for more than 5 seconds. Auction Server will not process midpoint executions.

BlockLinQ

BlockLinQ is a subscription-based service that compares data submitted from its subscribing members and responds with a message resulting from all this data. It is designed to support multiple services with different subscriber lists for each service.

BlocklinQ events are initiated when it receives a list of targets from a TF system with a Previously Presented unique event ID for that symbol. The system then receives similar lists from other TF systems; some of these lists may be empty, but each TF system will report. BlocklinQ preferably will wait up to three seconds (configurable) or until all TF messages are received, rank targets from the TF systems that have reported, and respond to each with the number of targets that should get TradeNotes. Late reports after a BlocklinQ event is closed preferably have no effect except being logged with their timestamp.

When advertising an order entered through a TF system, the initiating TF identifies itself as the initiator within the target list message. BlockLinQ adds the total number of targets and maximum displayed quantity in its response to the initiating TF system. The user that entered the order receives a delayed order update message revealing the number of parties that were notified of his order.

BlockLinQ preferably logs each event, including the target lists received, timestamp, and the corresponding ranking results for subsequent analysis; this log doesn't need to support help desk intraday queries.

In an alternate embodiment, Liquidity Tracker may subscribe to the BlocklinQ service in the same was as a routing engine, but using ACT data as fills database and considering the Nasdaq Market Makers as the end clients in the same way as buy-side firms are the end clients of the Target Finder routing engine.

In an alternate embodiment the trader is also enabled to see a list of all trades that have been facilitated through any routing engine in the network, and send an order for more size to a trader who has previously traded on the contra side in the security within said network, this being a natural extension of the functionality described above as the *69 routing option.

BlockLink Specifications

BlockLink is an alternate embodiment of the routing engine described herein, that differs from Target Finder in several ways: (1) The client interfaces are simplified to comply with the industry standard FIX communications protocol. (2) The information management model is generalized to consider the possibility that a BlockLink routing engine can itself relegate the task of finding a likely contra party for a trade to other like BlockLink routing engines or to dependent routing engines called BlockLink Premier. BlockLink Premier, described below, is a configuration of the BlockLink software that reports the results of its queries to one or more primary BlockLink routing engines to which it connects as a dependent (child) system.

BlockLink comprises middleware that may be deployed at any broker that elects to participate in IOI services of the present invention. Its primary function is to provide full buy-side access to LQT through a sponsoring broker. The middleware preferably communicates with Liquidity Tracker through a Nasdaq Service Delivery Platform (SDP), and provides a FIX server to communicate with buy-side institutions through the sponsoring broker.

BlockLink receives SelectNet preferenced orders from Liquidity Tracker and executes encoded instructions to query a buy-side trade database and distribute IOIs to likely institutional contras based on the outcome of the query. It also provides a channel for IOI recipients to deliver response orders to Liquidity Tracker, or to enter Previously Presented orders intended for routing to Liquidity Tracker. When Liquidity Tracker users request that a limited number of IOIs be sent out to institutional contras, multiple BlockLink installations coordinate through a BlockLinQ Hub to select the best targets.

An optional matching engine addition to BlockLink supports trading NYSE listed stocks. To advertise its orders, the matching engine broadcasts FIX IOIs to participating BlockLink systems with encoded routing instructions in the text message field, and processes response orders on a first-come first-served basis, following the same logic as Liquidity Tracker applies in its IOI services for Nasdaq trades.

Message Flow

Figure 6:
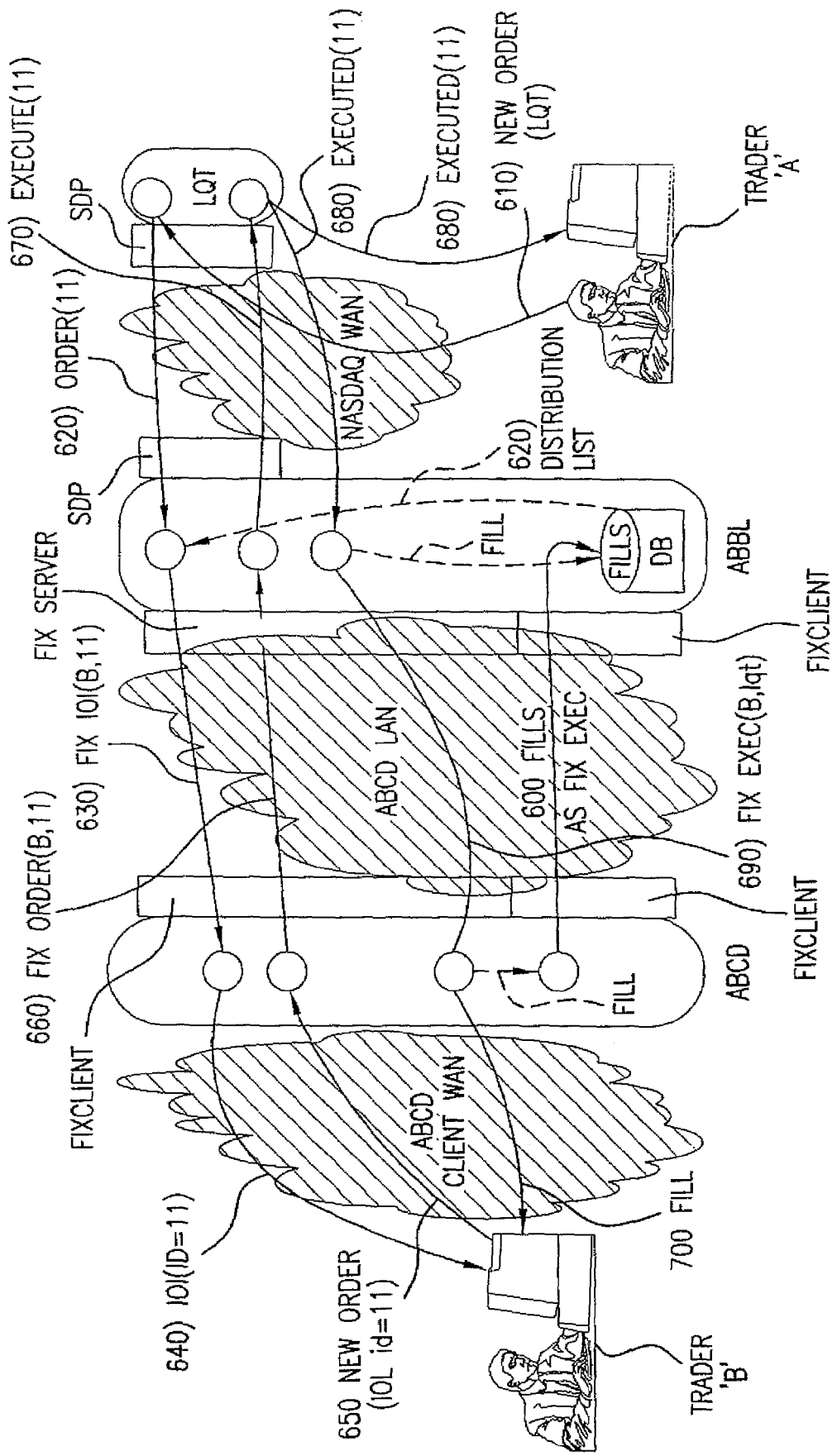
FIG. 6 depicts flow corresponding to a successfully completed trade.

The BlockLink system may be regarded as a smart IOI router with follow-up messaging support sandwiched between a FIX/SDP Client and a FIX Server, as depicted in FIG. 6. In step 600 the broker ABCD is sending FIX "Executions" throughout the day (Fills only) to its installation of BLK for its clients. BLK stores the trade data locally for its routing queries. In step 610, Trader 'A' places an order to Liquidity Tracker requesting that IOIs be sent out to Institutions that are actively trading on the contra side. Liquidity Tracker routes a SelectNet IOI (11) to ABBL. In step 620, BLK receives a the IOI request through the ABBL interface to LQT (as a preferenced SelectNet order); it identifies a firm-id with recent trading activity on the contra side to the order and sends a FIX IOI to ABCD with forwarding instructions to the client (trader 'B'). The selection of the target is based on routing directives from Liquidity Tracker. In step 630, ABCD receives the IOI for 'B' over the FIX connection (same connection for sponsoring orders) and forwards the IOI over its internal network to 'B' (based on the Entering Firm='B'). If it can't forward the order because the destination (Entering-Firm) is unavailable, it sends back Business Message Reject for the particular IOIID being rejected. In step 640 the client 'B' receives the actionable IOI. ABCD's client (Trader 'B') submits an order 650 with the IOI-ID for matching to the advertised order through BLK. In step 660 ABCD receives the order with BLK attributes. In step 670, BlockLink processes the responding order with Liquidity Tracker. In step 680, Liquidity Tracker sends back execution messages, for successfully executed BlockLink execution request. BlockLink forwards it to the broker (ABCD) 690 for routing to the firm in step 700. This fill is reported back to BlockLink data cache as another instance of step 600 as part of the data feed that also includes other fills entered by ABCD. BlockLink uses a subset of FIX V4.2 for proxy order management. When broker ABCD receives updates (rejects, fills, order state, etc.) from BLK 690 for its proxy/sponsored order, it acts on the original (trader_ABCD) mapped order. This includes clearing & reporting trades, and notifying the client trader 'B' 800.

Routing is driven by queries against a fills database fed from a FIX Client connection to the host. When BlockLink is unable to find a target, it rejects the IOI and sends it back to the source.

IOIs are received over FIX or SDP with routing instructions encoded in the text message field and delivered by BlockLink's FIX Server with forwarding instructions in accord with a host's dictionary of end users. The host is responsible for displaying the IOI to the end user and facilitating entry of an order in response to the IOI.

BlockLink receives response orders via FIX and forwards them to the source of the IOI. It processes executions and order update messages back from this source and forwards them along to the host again with forwarding instructions to the end user.

BlockLink is preferably installed at multiple hosts. When routing instructions require coordination between multiple BlockLink installations, each system enters a request to a hub, which will respond with a global ranking of proposed targets. The identity of the targets preferably will not be revealed in any messaging with the hub.

BlockLink hosts preferably are responsible for providing a logon to an SDP with a Previously Presented MPID assigned by Nasdaq to Liquidity Tracker IOI sponsors, and for enabling 2-way FIX connectivity to BlockLink. BlockLink hosts preferably also enable a TCP-IP connection to the hub.

BlockLink matches FIX response orders to IOIs through the IOI-ID field. When this field is not provided or does not match any known IOI the order is routed to Liquidity Tracker as a Previously Presented Order, with routing instructions translated into a LQT text message protocol. BlockLink will expect Order Update and Execution UMs and forward these back to the end user through the host, or receive a FIX Cancel request to kill the Liquidity Tracker order. Previously Presented orders are given internalization priority by checking first whether the user's routing instructions can be fully satisfied using the local fills database.

To support trading NYSE stocks, a preferred embodiment comprises an optional matching engine that receives FIX orders and delivers FIX IOIs with text message encoded instructions to all subscribing BlockLink systems. Brokers that host this matching engine parse the text message on the IOI to identify the forwarding destination and distinguish it from the encoding routing instructions.

Facilities

Query engine: A preferred query facility stores fills data provided via FIX and resolves dissemination lists for IOIs based on query requests from the routing coordinator.

Routing coordinator: Receives FIX IOIs with routing instructions coded in the text message field, parses this field to generate query requests to the query engine facility, and pushes out IOIs to FIX clients with forwarding instructions to the end user. The routing coordinator maintains the mapping between input and output messages to route follow-up messages (orders, executions, etc.).

Matching engine (ME): A matching engine is an optional trade execution system that may or may not be included in a particular BlockLink installation, based on business considerations. A BlockLink system that does not carry the matching engine locally will route its non-LQT orders to a third party matching engine. The matching engine receives orders and broadcasts IOIs to BlockLinks with encoded routing instructions. Response orders are executed on a first come first served basis. Midpoint trades are priced at the NMBBO Midpoint if this price is within the limits set by the matched orders.

A trade pricing facility preferably is deployed in conjunction with the matching engine. The pricing facility receives a level 1 feed and responds to time-stamped requests for the National BBO price and quantity.

Trading API

BlockLink preferably abstracts external communications through an API, to support various channels/protocols. Most I/O messages relevant to the business logic will be delivered through either FIX or SDP; in some cases, the routing and protocol decision will be driven by message content and configurable tables.

BL input messages: (1) FIX Fill: This data feed enables the query engine. The FIX Fill is a FIX execution message carrying quantity, symbol, side, and client ID as a destination for routing IOIs.

(2) 101: BL preferably receives IOIs from Liquidity Tracker over SelectNet and from a Matching Engine over FIX. An IOI message comprises optional order display parameters and routing instructions (query type and parameters). Routing and display instructions not supported in the underlying protocol will be passed through the text message field.

(3) Remove IOI: a Remove IOI message to BlockLink preferably is a SelectNet Cancel UM or FIX IOI message with action code to remove the indication.

(4) Response Order: A response order is a FIX order received through the sponsoring broker and carrying an IOI ID that matches with a prior IOI.

(5) Order Update: An order update is a message from an execution system following an execution, decline, or timeout. SelectNet Order Update 403/404 Message Service UM with filled status and the Execution 500 Message Service UM are dropped as duplicates of the accompanying Counter 400/401 Message Service UM, since the latter carries required information not available in the order update or execution messages.

(6) Previously Presented Order: A Previously Presented Order is a FIX order that cannot be matched to a prior IOI, and is sponsored by a BL hosting broker. The source of this order may be: (a) a buy-side client of the sponsoring broker; (b) a sell-side client of the sponsoring broker (in which case the sponsoring broker will issue an ACT CTCI trade report after any fill to pass on the shares bought or sold); or (c) a sell-side client that has passed the order through its BlockLink with internalization preference, and is requesting matching engine services. Again the sponsoring broker will close any fill with an ACT CTCI trade report. In case (a) above, the sponsoring broker will place its client's firm-ID on the order to support *69 functionality. When the client's firm-ID is not known, BL will apply a globally configured default advert request symbol. If it knows the firm that entered the order, BL will apply the firm's routing instructions (configurable by symbol). Orders with Time in Force ("TIF") longer than 3 minutes are submitted to Liquidity Tracker with a 3-minute TIF and resubmitted upon expiration to walk down the penalty box: the targets that failed to fill the order are placed in a penalty box, as will be described in greater detail below, so that upon resubmitting the order, the system automatically routes IOIs to the next best ranked targets, skipping those that are in the penalty box.

(7) BlockLinQ Hub Target Response: This message gives the rank of proposed IOI targets.

BL output messages include: (1) IOI Forward, which functions as follows: (a) BlockLink issues FIX IOIs to the broker with a client ID as forwarding destination. The client ID is that which the host broker assigns to its clients in the fills data feed. (b) Liquidity Tracker orders sent to Target finder as an alias for their true MPID are forwarded as FIX IOIs, with the MPID in the text message field as a forwarding instruction. (c) BlockLink supports sending a copy of each outbound 101 message for distribution through a third party network.

(2) IOI-alert ("liquidity in DELL"): Email or pager alert fit for communication through a non-secure channel (no order details). The alerted user may go to a screen where the IOI is displayed and follow up with a response order.

(3) Remove IOI Forward: FIX IOI with action code to remove the indication. Forwards a SelectNet cancel UM or FIX Remove IOI message to all parties to whom the IOI was routed.

(4) Response Order Forward: This is a client response order routed to execute the advertised order.

(5) Previously Presented Order Forward: Previously Presented order forwarded to LQT or the matching engine with text message containing advertising parameters. The Previously Presented Order to the Matching Engine ("ME") may be delivered via FIX to an external matching engine or through the API to the local matching engine.

(6) Cancel Order Forward: This message forwards a request from a client to cancel an order on to the Liquidity Tracker or the Matching Engine.

(7) Order Update Forward: Forwards an order update from the execution system (LQT or ME) to the client through the sponsoring broker. The order update is a FIX execution message to hosting broker with status "filled" or "canceled."

(8) BlockLinQ Hub Target Request: Message containing timestamp and size of targets that have recently accumulated the requested size, as well as a BlockLinQ Hub ID.

Summary of BlockLink Message Flow

| Message Type | Description | From | To |
| --- | --- | --- | --- |
| Fill | Feeds the query engine with data. A fill is one side of a trade, pertaining Broker to a party that has agreed to have this data analyzed in order to receive IOIs when natural. | Sponsoring Broker | BlockLink |
| IOI | Request to post IOI; contains order display attributes and routing instructions. | LQT; FIX | BlockLink |
| IOIFwd | IOI with forwarding instructions to buy-side. | BlockLink | Sponsoring Broker; Third Party Network |
| RemoveIOI | Request to cancel IOI. | LQT; FIX | BlockLink |
| RemoveIOIFwd | FIX IOI with action code to remove. | BlockLink | Sponsoring Broker; Third Party Network |
| BlockLinQRqs | Top targets for ranking. | BlockLink | BlockLinQ Hub |
| BlockLinQRsp | Ranked targets. | BlockLinQ Hub | BlockLink |
| IOIAlertMsg | Optional "Liquidity in DELL" msg. fit for non-secure channel. | BlockLink | BL Email Agent |
| ResponseOrder | Client order in response to an IOI. | Sponsoring Broker | BlockLink |
| ResponseOrderFwd | Counter to execute LQT/ME order. | BlockLink | LQT or ME |
| OrderUpdate | From execution system that controls the order. | LQT; FIX | BlockLink |
| OrderUpdateFwd | Notify client of an order update. | BlockLink | Sponsoring Broker |
| Previously PresentedOrder | Client order with optional routing instructions. | Sponsoring Broker | BlockLink |
| Previously PresentedOrderFwd | Previously Presented order to LQT/ME. | BlockLink | LQT or ME |
| CancelOrder | Client request to cancel an order. | Sponsoring Broker | BlockLink |
| CancelOrderFwd | Cancel LQT/ME order. | BlockLink | LQT or ME |
| DelinquentFirmMsg | See below re "Suspensions." | BlockLink | BlockLinQ |
| Glorified Heartbeat | See below. | BlockLink | BlockLinQ |
| Glorified Ping | See below. | BlockLinQ | BlockLink |
| Tape Feed | See below. | BlockLink | BlockLinQ |

-continued

Summary of BlockLink Message Flow

| Message Type | Description | From | To |
|---|---|---|---|
| ActivityReport | See below re "EndofDayActivityReport." | BlockLink | BlockLinQ |

Matching engine input messages: The matching engine holds orders in a book, broadcasts IOIs with encoded routing instructions to participating BlockLink systems, and executes response orders on a first come first served basis. It maintains the mapping between the order ID and the IOI-ID to ensure that orders in the matching engine can only be executed by response orders.

(1) Previously Presented Order Forward: This is a Previously Presented order to be inserted in the book, and advertised through IOIs. In one embodiment, the matching engine supports the same order attributes as SelectNet and all the display and routing attributes supported by Liquidity Tracker.

(2) Response Order: BlockLink message forwarding a response order with an IOI-ID for execution.

(3) Cancel Order Forward: BlockLink message forwarding a request by the client to cancel an order. The matching engine will remove associated IOIs. Response orders are treated as IOC orders against the advertised order; they cannot be canceled while queued for processing.

(4) Supercap: ACR Risk management message broadcast to the SDP indicating that the system shouldn't be trading with a particular MPID.

(5) Level 1 feed: Contains inside quotes for midpoint pricing of trades.

Matching engine output messages:

(1) IOI: FIX IOI with routing instructions in the text message field, delivered to all BlockLink systems.

(2) Remove IOI: Delivered to all BlockLink systems following receipt of a BL Cancel Order Forward.

(3) Order Update: The order update message notifies BlockLink of a Cancel, Timeout, or Fill. It is delivered over FIX if the BlockLink(s) that originated the order is external, or over the proprietary API for a local matching engine.

| Message Type | Description | From | To |
|---|---|---|---|
| IOI | Request to forward IOIs; contains order display attributes and routing instructions. | ME | BlockLink |
| RemoveIOI | Request to cancel IOIs. | ME | BlockLink |
| ResponseOrderFwd | Counter offer to execute a ME order. | BlockLink | ME |
| PreviouslyPresentedOrderFwd | Previously Presented order to ME. | BlockLink | ME |
| CancelOrder | Cancel ME order. | BlockLink | ME |
| OrderUpdate | Cancel Ack; Fill, Timeout | ME | BlockLink |
| InsideQuote | Level 1 feed. | Data provider | ME |
| SuperCapMsg | ACT Risk Management message indicating a broker has exceeded clearing supercap limitations. | Nasdaq SDP | ME |

Interfaces

FIX: (1) FIX Client: BL establishes a FIX connection to the host broker to receive FIX executions to populate the fills database. The system will receive IOIs and executions from an external matching engine. (2) FIX Server: The FIX server supports connectivity with the host broker for the basic workflow of advertising LQT orders. The broker will establish a connection and forward messages to the buy-side end party as required. This FIX connection also facilitates the return flow of orders and cancels from the end user to BlockLink. The FIX server preferably supports a second connection by a third party FIX IOI bulletin board, to add visibility to its IOIs. This secondary channel does not receive response orders directly; all response orders preferably are sponsored by and entered through the primary FIX connection to the host broker.

BL FIX specifications are provided in Appendix A.

SDP Interface Requirements: (1) SelectNet Access Service—LQT preferably uses this interface to gain access to an SDP service.

(2) SelectNet Automated Directory Service (ADS)—LQT preferably uses the ADS interface for deriving the market maker status. It also uses this interface for deriving its own market maker status and therefore the LQT supported securities. LQT preferably supports all securities for which it is eligible to receive SelectNet preferenced orders.

(3) SelectNet ACT Risk Management—LQT preferably uses this interface for enforcing the Risk Management requirements on orders.

(4) SelectNet Transaction Service—This interface preferably is used for order management.

(5) SelectNet Message Service—This interface preferably is used for receiving UMs on ACT Risk Management changes and SelectNet events. LQT will register to receive updates on all its supported securities.

BL I/O messages over SDP: (1) IOI: A Liquidity Tracker IOI is a SelectNet Message Service 403 Order UM with routing instructions coded in the text message field. BL will receive IOIs from Liquidity Tracker within the SelectNet Message Service UMs 403/404 "SelectNet Nonexecution Order Update to Contra Firm Data Fields w/wo Error Explanation Data Fields" with a status of "P." Routing instructions are encoded in the text message field. BL will process this message by parsing, validating, and routing (if-validation passed) to participating buy-side firms.

(2) Remove IOI: Liquidity Tracker cancels its outbound orders to remove associated IOIs. Cancels and timed-out orders are "SelectNet Nonexecution Order Update to Contra Firm Data Fields w/wo Error Explanation Data Fields (403/404)" Message Service UM.

(3) Cancel: A cancel request is a transaction service message 2402; the response indicates whether the cancel was successful.

(4) Counter: BL forwards response orders to LQT in the form of SelectNet counters: SelectNet Transaction Service 2405 message ("SelectNet Counter/Execute Order/Counter"). SelectNet places the counter in a queued status making the transaction service 2405 response meaningless.

(5) Execution: BlockLink will receive SelectNet counter UMs as executions of its LQT-routed orders or counters. A counter is a "SelectNet Nonexecution Counter Data Fields w/wo Error Explanation Data Field (400/401)" Message Service UM.

(6) Previously Presented Order: The originator enters a SelectNet preferenced order "2043" to LQTR over the SDP Transaction Service.

(7) Broken trades: The "SelectNet Nonexecution Delete/ Kill Data Fields" Message Service UM 402 indicates that a trade has been broken. This will update usage tables for billing and metrics.

(8) Decline/Timeout: Liquidity Tracker declines and timed-out orders are "SelectNet Nonexecution Order Update to Order-Entry Firm Data Fields w/wo Error Explanation Data Fields (405/406)" Message Service UM.

Client Configurations

Previously Presented firm: BL preferably identifies client firms through the fills data in real time. Detection of a Previously Presented target-ID in the data feed spawns a process to create a Previously Presented client with default characteristics, and adds this client to a list of non-configured clients for a help desk operator. Help desk operators preferably are prompted at login to configure any Previously Presented clients or check off that this client will not be configured. A non-configured firm is either active or passive in BlockLink by default (system configuration). Previously Presented orders from this client will be associated with the default advertising parameters (system configuration).

Firm configurations: A firm is known to BlockLink principally as an IOI destination, recognized by a Firm-ID, with a BL flag set to active or pending to enable or disable queries against the fills data. Help desk users can add/modify the following attributes:

(a) Firm-ID.
(b) Firm Name.
(c) BL flag.
(d) Default advertising instructions, for all symbols or by symbol. The API should enable applying given advert parameters to all symbols, revert to default for all symbols, or modifying the parameters for a particular symbol or list of symbols. Routing: global default is N2B3, configurable. Display: default is 5000-share maximum display.
(e) Users (state can be active or suspended).

|  | Comments | Values | Type |
| --- | --- | --- | --- |
| Firm_ID | Recognized by host broker |  | String |
| Firm_Name | BizDesc | "PTNM" | String |
| TF_Flag | Receive IOIs? | Y/N | Boolean |
| Default_Routing | LQT routing instructions per symbol | N2B2 | String |
| Default_Display | $, D options | D5M | String |

Trader configurations: A BL API preferably enables sponsoring brokers to give users control of default advertising instructions and alternate IOI delivery channels such as email. It is expected that sponsoring brokers will code against the API and make these functions available to users on their GUIs.

However, the system preferably does support an entitlement system that allows users and head traders to set up accounts and log on to a system web site to perform these functions. If the sponsoring brokers wish to deploy this functionality, they will create a head trader account within Block-Link for each client firm, using Help Desk GUI (described below). The head trader can then log on and set up trader accounts.

(1) User status: active/suspended. Read-only with user entitlement. (2) Login: username and password. (3) Configurable list of supported channels: (a) Channel type: IOI channel (secure) or alert-only channel. (b) Alert thresholds: size (Integer) and price (P=Passive, B=NBBO, M=Midpoint). Thresholds apply to all the securities in the user's watch list, or can be modified for individual securities. (c) Each channel can be enabled or disabled by the user. (d)

The user specifies the addressing details appropriate for each enabled channel (email address, etc.). (e) Supported channels: Email; Pager; other messenger applications.

(4) Watch list: list of securities the user is interested in. This serves two purposes: (a) Modify the firm's default advertising instructions for all symbols on the watch list. The user takes control of the firm's advertising parameters for the securities on his/her watch list. If multiple users watch the same security, one trader will override the other's settings for the shared security. (b) Set quantity or price filters for messages sent through any alternate IOI and IOI alert channels, such as the "Liquidity in DELL" email.

|  | Comments | Values | Type |
| --- | --- | --- | --- |
| User_ID | Internal |  | String |
| Login |  |  | String |
| Password |  |  | String |
| Status | Can reactivate a suspended user | Active or suspended | String |
| Watch List | List of securities user controls |  | Exchange symbols |
| IOI pager alert | Optional | (Pager number) | String |
| IOI Email alert | Optional | (Email address) | String |
| Alert size threshold | Alert if at least this large |  | Int |
| Alert price threshold | Alert if at least this aggressive | P, BBO, MID | Enum |

Help Desk

A help desk may be run by the host brokerage, which typically has the best knowledge on client relationship management, authentication, etc. Preferred help desk software enables a broad range of operator functions, including user and firm management, within a single entitlement class. A preferred help desk GUI supports the following functions.

Create/modify firm, user, configurations: A firm is identified with a value of the FirmId field in a Previously Presented trade data entry from the housing broker. It maps to a push channel for delivering IOIs. A firm is automatically created when it is detected in the trade data feed; the help desk should also be able to add a firm prior to this, and configure or modify its communications, including the FirmID that will identify it in the trade data feed. When incoming trade data pertains to a Previously Presented firm, the help desk will be prompted to configure the firm's attributes in the system. Help desk operators may pull up a list of firms with trade data and that have not yet been configured, select a firm, and edit the relevant data. The help desk GUI preferably enables a help desk operator to create a user for a firm, give this user a head trader or user entitlement level, and modify any firm or user configurations such as those described above, or behalf of a firm or user.

Trading questions: The help desk should be able to search orders by firm and symbol, and for each order, pull up a table showing every relevant external messaging event related to this order. For example: Order routed to LQT; Order Cancel Request; LQT Execution; FIX Execution. The GUI will show clearly which messages are coming in to BL or being delivered by BL.

Managing list of securities: BL preferably lets the help desk enter the list of securities supported, with symbol and security type (small cap, NM, NYSE, etc). Operations or help desk personnel should be alerted if the fills data contains a security that is not known in the system. If an order or an attempt to register in a security is rejected because a security no longer exists, this will trigger an error message that will prompt the operators to remedy the problem.

Beard Services (Liquidity Tracker "Alias"): Liquidity Tracker allows a broker to specify that their LQT orders should be routed to them through a BlockLink system, to ensure permanent anonymity (the "beard") through a sponsoring ECN, and display the liquidity conveniently on an ECN screen. Liquidity Tracker will then route their orders to the specified BlockLink MPID (or ABBL), with the broker's MPID in the text message field for forwarding.

BL help desk personnel will configure brokers that have requested the beard service. BL will send an IOI message to the sponsoring broker with the broker as forwarding address. There are three preferred ways to configure a beard: (1) Execute a database query against fills provided by the target associated with this MPID, and send the IOI only if the query criteria are met (otherwise, decline the order). (2) If query criteria are not satisfied, send to a secondary FIX IOI forwarding destination. (3) Always send the IOI to the first destination. The configuration (1) was designed to meet the needs of firms such as Fidelity that have both an institutional sales desk and a separate Market Making desk, with information barriers between the two. If the Boston sales desk, for example, is not the intended target, BL will decline the LQT order and LQT will then route the SelectNet order to the broker that has requested the anonymity ("beard" service), their market making desk. (2) allows the secondary destination to be reached through a beard as well. (3) is used when there is only one destination for the IOI and the alias is a regular beard service.

Broker and BL/ME Configurations

The following are preferred system configuration parameters that operators may modify while the system is off line. Changes preferably take effect the next trading day.

Supported Advert Requests by execution point: BlockLink preferably supports multiple types of advert requests. For Liquidity Tracker advert requests, the request type is encoded in the text message field of the SelectNet order from Liquidity Tracker. BL will preferably maintain a configuration table listing the supported advert request types to advertise LQT and ME orders. In a preferred embodiment, all options described herein are supported. In alternate embodiments, other types of advert requests and additional BlockLinQ Hub services can be introduced. BlockLink sponsoring brokers decide whether to subscribe to the additional services. If they subscribe to an additional service, they'll begin to support the corresponding advert request option (for example, targeting based on nearly matching orders).

The following table lists advert request types, and the table after that is an example of a configuration table, in an environment with two matching engines issuing advert requests for NYSE stocks (the advert request types are described after the third table below).

|     | "N" | "L" | "#" | "B" | "T" | "NFSC" |
|-----|-----|-----|-----|-----|-----|--------|
| LQT | Y   | Y   | Y   | Y   | Y   | Y      |
| ME1 | Y   | Y   | Y   | Y   | Y   | Y      |
| ME2 | Y   | Y   | Y   | Y   | Y   | Y      |

Order routing: This configuration determines where a Previously Presented Order will be routed, based on the security type (e.g., Nasdaq NM, NYSE, Nasdaq Small Cap). Possible routing destinations are LQT, ME1, ME2, etc. The lists of security types and routing destinations are preferably extensible.

ME Min Aggression: Configure the Matching Engine to reject orders that are not at least as aggressive as the BBO, or at least as aggressive as the midpoint.

BL Min IOI Quantity: BL will not sends IOIs for less than this quantity. BL preferably will decline any advert request that carries a lesser quantity.

Supported IOI and IOI-alert channels: Configure list of supported channels (extensible).

Auto-create firms: passive or active: A Previously Presented firm detected in the fills data can be active or passive by default.

BlockLinQ Hub services: Add/remove supported BlockLinQ Hub services. In a preferred embodiment, there are two services: a "B" option and a "T" option. A BlockLink system preferably can be configured to participate or not participate in these services. Those not participating in "B/T" options preferably just have BlockLink to support the Liquidity Tracker "N" option and *69 functionality. Alternate embodiments comprise BlockLinQ Hub services, such as routing IOIs based on orders.

BL Configuration Table

| | Comments | Values | Type |
|---|---|---|---|
| Add/suspend source of advert requests | LQT, ME, etc. | | String |
| Support BlockLinQ Hub service | Required to support "B/T" options; may add other optional services | Y/N | Boolean. |
| Nasdaq Order routing preference | By security type. | LQT, ME1, ME2 | String |
| Small Cap Order routing preference | By security type. | LQT, ME1, ME2 | String |
| NYSE Order routing preference | By security type. | ME1, ME2 | String |
| ME Min Aggression | ME rejects more passive orders | BBO, MID, other | Enum. |
| DefaultRouting | If firm has not configured its routing options. | N1B2 | String |
| DefaultDisplay | If firm has not configured its display options | NONE | Int |
| MinIOIQty | Will decline advert requests for less quantity | 5000; 10000; 25000; 50000 | Int |
| Supported IOI channels | FIX, GUI | | Enum[ ] |
| Supported IOI alert channels | Email, Pager | | Enum[ ] |
| Auto-activate Previously Presented firms | Firm found in data feed is active by default | Y/N | Boolean |

Query Engine

A preferred query engine facility stores real time fills data received via a FIX client connection and executes queries against this data to determine lists of targets that should receive IOIs. It also supports queries against a repository of BlockLink-mediated trades, such as to identify the counterparty in a prior transaction.

Fills repository: Stores only data of firms that are active in the system. While suspended, a firm's data is not stored. When reactivated, BlockLink will begin storing Previously Presented data on this firm again and immediately enable sending IOIs, but it will not request retransmission of old data. BL stores data for the last MaxDaysStored days, including the present day. It preferably supports a configurable list of query types, each with its own parameter(s).

(1) Default Query: The query quantity (<size>) preferably is the greater of MinQueryQty shares (configurable parameter) or the advertised order's displayed quantity, up to a maximum of MaxQueryQty. Firms are eligible if they are signed up and enable their data to be analyzed, and are not in a suspended state. If a firm is in the penalty box, only the data subsequent to the penalty box time will be considered. Query statement: (i) Find up to <n> eligible firms that have most recently acquired <size> on the contra side. (ii) If fewer than <n> targets have accumulated this net quantity looking back at most MaxQueryLookback hours (configurable parameter), the target list is reduced to the lesser number of targets. (iii) If no firm has accumulated <size>, the target set is the single firm that has accumulated the largest net quantity in the given time period, so long as this quantity is at least equal to MinTargetQuality % (configurable) of <size>. (e) If there are no targets the advert request will be declined.

| Parameter | Description | Expected Value |
|---|---|---|
| MinQueryQty | First try to find a contra with this net qty, then go down to disp. Qty as needed | 10000 |
| MaxQueryQty | Never query for greater net qty. | 10000 |
| MaxQueryLookback | Scan no further to find targets. | 24 hrs |
| MinTargetQuality | Target must have done at least this % of the display quantity. | 100% |
| MaxDaysStored | Including today [days]. | 2 |

(2) "N" query type: This is the default query, as described above.

(3) "L" query type: Find the most recent <n> counterparties in this same symbol and contra side, looking at past trades between BlockLink and the execution point issuing this advert request.

(4) "B" query type: Run the default query, and then submit targets to BlockLinQ Hub. BlockLinQ Hub will respond with the number of targets that should be sent IOIs and possibly a time delay for each IOI if cycling was used. If the advert was "internalized," send out the IOIs and send BlockLinQ Hub a message specifying the number of IOIs sent. If the advert request was from a foreign initiator, send a message to BlockLinQ Hub with the timestamp and size of the top targets and expect a response specifying how many of these targets can be notified.

(5) "NFSC": Does a particular target (such as "NFSC") meet the criteria of the default query?

BL Trade repository: Stores one record for each BL-mediated trade, with the buyer ID, the seller ID and an order number. The API preferably supports queries to extract all trades related to a particular order number, all order numbers relating to a particular client firm on a given security, or across all securities.

Preferred stored procedures implement the following query types to find likely contras.

(1) "R" query type: This query; like the "B" option, looks for the firm that has most recently accumulated <size>, then coordinates with BlockLinQ Hub to find the best targets globally—but in the case of the "R" option, the query looks only at BlockLink fills.

(2) "#" query type: Find the most recent counterparty in this symbol and side, in a trade between BlockLink and this execution point, where the last characters of the execution ID match the characters specified in the # option. If there are no characters, it's synonymous with the routing instruction L1. For Liquidity Tracker executions, executions are preferably identified by the order reference number of the MM leg of the trade. If BlockLink was a recipient of the prior LQT order it is the order reference number of that order. If it was the Order Entry party, it will find the order reference number in the text message field in the counter message following the execution. If the # option refers to an order that was entered by the host broker via FIX without a firm ID, there is no way to identify the target to send an IOI back. Unless there were other valid targets, the advert request will be declined.

(3) "*69" query type: A non-specific version of the "#" option. *693, for example, instructs the system to look for the 3 most recent trades in the same security, and identify the firms that traded on the opposite side.

Supported query types by execution point: A configurable table preferably lists which query types are supported per execution point. Execution points are Liquidity Tracker, individual Matching Engines, or third parties such as a host broker coming in through the API.

The table below gives a preferred exemplary configuration:

| | "N" | "L" | "#" | "B" | "R" | "NFSC" |
|---|---|---|---|---|---|---|
| LQT | Yes | Yes | Yes | Yes | Yes | Yes |
| Matching Engine | No | No | Yes | Yes | Yes | Yes |
| Third party | Yes | Yes | Yes | No | No | No |

Multiple query types: BL preferably supports multiple queries within a single advert request. Each query will be processed independently: if the same target firm is the counterparty in a "#" option and is also one of the two most recent contras in the "B" option, BL will submit the two "B" option targets to BlockLinQ Hub. If both are accepted for sending IOIs, BL will not send the "#" target a second IOI for the same order.

BL sends out at most one IOI to a target firm for a given advertised order. If the same firm is a target for more than one reason, then it will only get the IOI for one reason. If more than one reason applies to the same 101 target, a priority-ranking table preferably is used to determine which targeting reason wins. A preferred ranking table is shown below:

| | Rank |
|---|---|
| # | 1 |
| N | 2 |
| L | 3 |
| B | 4 |
| R | 5 |

Non-responding Firms:

(1) Penalty box. The queries described above were designed to maximize the forecasting accuracy, to determine as accurately as possible which firm is most likely to buy (sell) the stock in the near future. Research indicates that firms that have recently bought (sold) 10,000 shares or more often continue to buy (sell) in the near future. However, there are cases when this is not true: a trader may have finished working the order, or the price may have moved to where the trader has decided to hold off for a while.

A "penalty box" mechanism sharpens the targeting algorithm by suppressing trade data that erroneously pointed to a buyer (seller) that is not interested in continuing in this symbol and side. If a firm was placed in the penalty box at a certain time, all its fill data in the same symbol and side prior to this time will be suppressed. The following rules preferably determine when a firm enters or exits the Penalty Box:

(a) Enter when the firm has received a notification indicating the order was at least as aggressive as the midpoint, was for at least PBMinBlockSize shares with a Min Qty no greater than PBMinBlockSize, the IOI stayed open for at least PBMinTIF and the trader did not fill either the displayed quantity or PBMinPartialFillSize.

(b) Leave when a trader at the same firm has entered a Previously Presented order with a displayed quantity of at least PBMinBlockSize that either filled PBMinBlockSize or stayed open for PBMinTIF, or if the firm receives an order and executes at least PBMinBlockSize (same security and side).

(c) The penalty box does not affect orders forwarded to a broker when the ABBL is an alias.

|  | Description | Default Value | Type |
|---|---|---|---|
| PBMinBlockSize | Order should display at least this size | 1000 | Int |
| PBMinTIF | Grace period for the recipient (seconds) | 60 | Int |
| PBMinPartialFillSize | Fill at least this much to stay out of the box, or the whole order. | 5000 | Int |

A firm may continue to receive orders while in the penalty box. It simply loses the targeting benefit of its earlier trade data, for the purpose of the "N," "L," "B," or "T" options.

(2) Suspensions: While suspended a client firm will not receive IOIs (for any query type). A suspended firm can be reactivated intraday by the help desk. Some firms may not be set up properly to view IOIs, or may have signed up only to game the system. An automatic suspension mechanism targets both problems. BL preferably will automatically suspend a firm if it hasn't executed any of its first 5 IOIs, or if it any point it fails to execute 20 consecutive IOIs and did not execute any IOIs in the most recent trading day. A tool preferably runs at the close of each trading day to automatically trigger the suspension, causing an email to the Help Desk at the host ECN, with sufficient information for the Help Desk to call the client and fix the problem. A message (DelinquentFirmMsg) will also be sent to the BlockLinQ Hub with a one-time password for reactivating the firm. Helpdesk personnel can be dispatched to the ECN to reactivate the firm once the problem has been resolved, or talk through the procedure. The tool will monitor the number of times a firm has been suspended. For repeat suspensions, reactivation will only become effective after a 24-hour delay. The ninth suspension is permanent.

Routing Coordinator

The routing coordinator receives IOIs with routing instructions, applies the instructions if necessary in conjunction with the BlockLinQ hub, then delivers IOIs to selected clients through the sponsoring broker.

Preferred Network Topology: The extended Liquidity Tracker/BlockLink service is preferably built as a multi-centered star network, where each matching engine, Liquidity Tracker, and the BlockLinQ hub are each connected to all BlockLink systems, as shown in FIG. 1B. Liquidity Tracker and the matching engine issue IOIs with routing instructions to BlockLink systems, which then coordinate as necessary with the BlockLinQ Hub to determine the final targets for routing the IOIs.

IOI routing: (1) Parsing and Validation: Liquidity Tracker preferably passes routing instructions to Target Finder in a compressed format. See Table C above. BL rejects IOIs where the display quantity is less than MinIOIQty. If there are no targets, the IOI is rejected. BlockLink declines a SelectNet order to reject a LQT IOI.

(2) "N," "B," "L," "R," "#," "*69": These routing features instruct BlockLink to execute the corresponding query type as described in sec. 9 and send IOIs to the resulting targets. In processing the "B" and "R" options, BL may send IOIs immediately to contras that meet the full query quantity. BL sends BlockLinQ Hub a message with its targets, indicating how many have already been notified. BlockLinQ Hub will reduce the number of targets that it should authorize from other BL systems. BL should pad the query result lists; if an IOI dispatch fails, BL will send a message to its next best target.

(3) Acknowledge: Follows a Previously Presented order routed to Liquidity Tracker. This message is a SelectNet order with text message field with the format "A-XXXXXYZZ" where "A-" indicates that the order is an acknowledgment of a BL order, "XXXXX" is the order reference number of the BL order that is being acknowledged, and "Y" is a price aggression flag which is passive ("P"), at least as good as the inside market ("B"), or at least as good as the midpoint ("M"). "ZZ" is a BlockLinQ Hub event ID used to coordinate messages from different BlockLink installations to the BlockLinQ Hub.

(4) Alias: This is a SelectNet order from Liquidity Tracker with the text message format ".ABCD XYZ" where the characters ".ABCD" indicate that the IOI should be routed to the sell-side firm with MPID="ABCD", and the characters "XYZ" are text characters that indicate the routing instructions that were used by the Order Entry party. Liquidity Tracker participants can see the targeting criteria used, primarily to let them know when they were targeted explicitly, since in that case they will not have the benefit of anonymity. If the order was explicitly targeted to ABCD, the text message will be ".ABCD ABCD".

Configurations supported:

(a) Send single FIX IOI through the host broker with forwarding instructions to a primary destination.

(b) Execute the "ABCD" query to see if the target has done the query quantity; if so, send FIX IOI. Else, reject the IOI.

(c) Execute the "ABCD" query to see if they ve done the query quantity; if so, then send the IOI to the primary destination. Else, send it to a secondary FIX destination.

|  | Comments | Values | Type |
|---|---|---|---|
| MPID | Nasdaq MPID for the recipient firm. | Example: "NFSC" | Char[4] |
| Alias Type | See (a)-(c) above. | A, B, C | Char |
| Client ID | As recognized by the host broker for forwarding. |  | String |
| Secondary client-ID | Only for AliasType = "C" |  | String |

(5) Refresh: This SelectNet order follows a complete fill of an order where the OE had reserve size available. The text message format is "R-XXXXX" where "XXXXX" is the order reference number of the original LQT order (IOI). BlockLink will have canceled all IOIs following the complete fill that precedes this order; when it receives the refresh IOI message it will send IOIs back to the same targets. The attributes (such as quantity or price) will be determined from the Previously Presented SelectNet order.

IOI distribution: (1) IOI to host broker: BlockLink delivers IOIs through the host broker, with forwarding instructions to the intended client. The IOI message will display the reason why a target is being notified, and the price aggression flag (MID or limit). Also shown in the 101 is whether there is reserve quantity and whether there is price discretion.

(2) Secondary IOI distributor: Target Finder preferably supports the addition of a second FIX client to receive a copy of each outbound 101, with the same forwarding instructions. This redistribution hub will be responsible for coordinating with the BL hosting broker to translate the client-ID forwarding field into an address it can recognize.

(3) Cycling: A cycling option staggers the delivery of IOIs with a specified delay between one IOI and the next. Cycling preferably applies to BlockLinQ Hub services only: if an institution is a target through the # option or the Liquidity Tracker "N" option, that IOI is sent right away. (Liquidity Tracker controls cycling for the "N" and "#" options).

(4) IOI alert message: Optionally, traders may configure an alternate channel (email or pager) to receive a liquidity alert message stripped of side and quantity. This message alerts them to the availability of an IOI, in the event that they do not have sufficient space on the screen to display the IOIs. Example: "Activity in DELL."

BlockLink Premier: BlockLink Premier (BLP) is a configuration of BlockLink that may be hosted at a buy-side institution or other data provider that is not an IOI sponsoring broker. BL to BLP communications preferably are secured point-to-point between BL and BLP: routing intermediaries cannot see the business content of the message flow. BlockLink Premier preferably connects to a configured list of supported "primary" BlockLink systems. A BlockLink Premier system is in effect an extension of the database for a primary BlockLink.

When processing an internal search for the best contra, BlockLink preferably sends a query request message to the subscribing BlockLink Premier systems; each BLP will respond with a message containing the query results. The query results preferably contain only the information required to rank this target relative to other targets that may have come out of a local database search, or were returned by other BLP installations. BlockLink preferably performs the ranking, considering all targets (local and BLP responses) as though they were all coming out of the local database.

In processing contra searches that require BlockLinQ hub mediation (in one embodiment, the "B" "R" options), each primary BlockLink will send the IOI with routing instructions to all the BLP installations that have connected to it. So a Liquidity Tracker IOI request may be forwarded to BLP through multiple BL installations. The IOI to BLP identifies that it is a Hub-mediated event; since BLP knows whom it connects to, it immediately knows that it will receive similar messages from the other primary BL installations and avoids duplicate processing. BLP preferably responds to Hub-mediated events by sending a response message with the query results and a unique query-ID (GUID) to each primary BL it connects to. Primary BL systems compile the remote query results with their local query results and send the combined list to BL Hub. BL Hub will not know firm IDs but will recognize that the same firm is entered multiply through the unique query-ID. So when ranking the top 3 targets, it will count the multiple copies of the same firm as one target only, and authorize this target back to all primary BlockLink systems that reported it. The query-ID is generated once ("fire and forget"), to maintain the requirement that BlockLinQ Hub cannot infer the true firm-ID through correlations. BLP clients will thus receive the IOI through all GUIs supported by primary BL hosts it connects to. In addition, BLP preferably supports a FIX server or other push channel directly to the client; the message pushed to the buy-side client will contain the IOI-ID that should be inserted in the response order to one of the primary BL brokers.

Response order: A response order is a FIX order with an IOI-ID that matches to a prior IOI delivered by this BlockLink.

| | Description | BLP Matching Engine | LQT |
|---|---|---|---|
| Security Type | Nasdaq, NYSE | Yes | Nasdaq only |
| Symbol | | Yes | Yes |
| Limit Price | | Yes | Yes |
| Midpoint Peg | Will execute at NMBBO midpoint. | Yes | Yes (LQTM vs LQTR) |
| Time In Force | Minutes, or "day." | Day only (*) | Yes, Min. = 3 minutes |
| Min Quantity | All quantities will be rounded to whole lots; AON odd lots are rejected. | Yes | Yes |
| Quantity Display Quanity | | Yes | Yes |
| | | Yes | Yes |
| Price Discretion | Not applicable to midpoint orders $02; price will be displayed 2 cents more passive. | Yes | Yes |
| "C" | Cycling. | Yes, only for BL Hub | Yes; except "B/T" option |

(*) BlockLink preferably supports any TIF on Previously Presented orders via FIX; it cancels a Matching Engine order if TIF runs out prior to timeout at the execution point. Vice versa, if the execution point times out before the FIX Order TIF did, BlockLink resubmits the order with a fresh time in force.

(1) SelectNet Counter: To forward a response order to Liquidity Tracker, BL will use a transaction service 2405 message ("SelectNet Counter/Execute Order/Counter"), placing the query option that led to the execution in the text message field.

(2) FIX Order: Response orders that are TO BE SENT to an external matching engine hosted by a third party Target finder host will be delivered via FIX.

Previously Presented Order: A Previously Presented order is a FIX order that cannot be matched to a prior IOI through an IOI-ID. Routing instructions may optionally be passed with the order in the text message field. BlockLink will parse and validate the order then route it to an execution point as described below. If the order carries a display quantity field or a price discretion field, then this will override the default display parameters. If it carries a text message that parses as a valid LQT text message, then this will override default routing and display instructions.

(1) Order Table: The system will database all relevant order information. The following preferred table shows required fields.

| Name | Type | Description |
|---|---|---|
| Orderid | varchar(20) | The ID of the order. |
| Branchseqnum | varchar(20) | The brach sequence number associated with order, if routed to SelectNet. |
| Brokerid | varchar(20) | Identifier of sponsoring broker. |
| Createtime | timestamp | The date-time at which the order was recorded. |
| Handling | | The handling rule of order. |
| Maxqty | int4 | The total order quantity. |
| Minqty | int4 | The minimum executable quantity of order. |
| Modifytime | timestamp | The date-time at which the order status was last modified. |
| Msgtext | varchar(256) | The routine/display instructions encoded in the text message field. |
| Oefirm | varchar(20) | The ID of firm entering order. |
| Ordertype | int4 | Limit; Pegged to Mid; Market |
| Routedest | varchar(20) | LQT; matching engine 1, etc. |
| Price | Float8 | The limit price of the order. |
| Reporting | int4 | The reporting status of the order, Principle, Agency. |
| IOI-ID | varchar(20) | Id to which the order is a response, if response order. |
| Resqty | int4 | The reserve qty specified in order. |
| Shortexemptflag | Bool | Indicates short exemption. |
| Shortflag | Bool | Indicates short sale. |
| Side | int4 | The side of the order. |
| Symbol | varchar(10) | The symbol associated with order. |
| Tiflen | int4 | The length of the tif, if specified. |
| Tiftype | int4 | The TIF type of order. |

(2) Parsing and validation:
(a) Text message parsing: BlockLink preferably supports the Liquidity Tracker protocol for encoding routing and display options in the text message field. Text message options such as display quantity and price discretion override the corresponding values in the FIX message.
(b) Order attributes: Orders not identified as response orders must have TIF=at least 10 seconds. FOK ("fill-or-kill") or IOC Previously Presented orders will be rejected. The minimum quantity must be less than the displayed quantity. For a Previously Presented order, TIF preferably must be at least 10 seconds.
(c) Message text validation: The displayed quantity may not be greater than the order quantity. Price discretion must be a positive number between 1 and 99 cents.
(3) Routing:
(a) Routing criteria: Routing is based on the following three criteria.
  (i) Internal/external ME: The matching engine may be available locally, or at a third party BlockLink installation.
  (ii) Nasdaq/NYSE: Routing will depend on the security type. The system will distinguish three security types in a preferred embodiment: National Market, Small Cap stocks, and NYSE listed stocks.
  (iii) Sell-side/buy-side targets: The query instructions may include sell-side targets, such as with the "N" option for Liquidity Tracker, or buy-side targets, such as for the "B" and "R" options, or both. *69 targets are "buy-side" if the prior trade executed on an ME system, or "sell-side" if it was a LQT trade.
(b) Routing table: There are three types of destinations in the table below:
  (i) LQT: route order to Liquidity Tracker. Sub-destinations LQTR and LQTM distinguish midpoint peg and limit order types.
  (ii) ME*: Route order to a preferred (specified) Matching Engine system, such as ME1, based on the security type.
  (iii) LQT and ME: split the order into two parts: route the lesser of the display quantity or the available reserve quantity (reserve minus display) to destination A (e.g., LQT), and the rest to destination B (e.g., ME). If the display option was not used, route half the order to LQT. If the reduced quantity of the LQT order is less than the display quantity, then reduce the display quantity to match the LQT order quantity.

| Security Type | Targets | Matching Engine | Destination |
|---|---|---|---|
| Nasdaq | Sell-side | Local | LQT |
| Nasdaq | Sell-side | Remote | LQT |
| Nasdaq | Buy-side | Local | LQT |
| Nasdaq | Buy-side | Remote | LQT |
| Nasdaq | Both | Local | LQT |
| Nasdaq | Both | Remote | LQT |
| NYSE | Sell-side | Local | ME* |
| NYSE | Sell-side | Remote | ME* |
| NYSE | Buy-side | Local | ME* |
| NYSE | Buy-side | Remote | ME* |
| NYSE | Both | Local | ME* |
| NYSE | Both | Remote | ME* |

(c) IOI routing instructions: If BlockLink can satisfy all the IOI routing requests based on its local database, it will route the order to Liquidity Tracker or the matching engine without routing requests, simply for processing the execution. It will receive an acknowledgment back with an IOI-ID to be used in sending response orders back for execution. For Liquidity Tracker, an order with no IOI routing request is created by placing a "+" character in the 10th position of the text message field. Liquidity Tracker will send a SelectNet order back as acknowledgment.

If some but not all of the routing instructions are satisfied locally, BlockLink will send the order to the execution point with all routing options. Liquidity Tracker displays the OE's routing options to the Market Maker, indicating when the order is competitive.

(4) IOI Request Broadcast: Upon receipt of a Previously Presented order, the matching engine will send an IOI with routing instructions to all available BlockLink systems.

Cancel Order: Forward a FIX Cancel Order message to the matching engine or Liquidity Tracker.

Order Updates: BlockLink will forward order update messages to the sponsoring broker with the corresponding client ID and order ID. The sponsoring broker is responsible for communicating the information back to the end user and back office systems, as well as the standard Order Audit Trail System (OATS) and Automated Confirmation and Transaction (ACT) reporting requirements.

(1) Cancel Response: A successful cancel with be acknowledged in the response message to a cancel.
(2) Fill: (a) LQT Counter UM: LQT executions are SelectNet Message Service 400 UMs (counters). BL preferably parses the text message field to capture the trade billing code assigned by Liquidity Tracker and the order reference number of the MM leg of the trade, for use in subsequent routing requests based on the "#" option. If the original order was split into a part routed to LQT and a part routed to the ME, BL attempts to cancel the ME part of the order and route a *69 order back to the LQT counterparty.

(b) ME FIX Execution: ME executions preferably are delivered over FIX. The execution ID assigned by the matching engine is used for subsequent routing requests based on the "#" option. If the response order has a greater size and the order was split between LQT and the ME, BL executes the matching quantity immediately and attempts to cancel the LQT order to fill the remaining size. If the order was split, and the response fills the ME order but does not fill the LQT routed size, BL attempts to cancel the LQT order and send a *69 IOI to the target that just filled the first IOI.

(3) Decline: If Liquidity Tracker declines the order, BL sends a FIX execution with expired status to the sponsoring broker.

(4) Time out: If the original order's TIF expires, BL forwards a FIX execution to the broker with expired status. If there is remaining TIF, BL resubmits the order to the execution point to walk the penalty box.

Timed events: If the order was routed to the matching engine or LQT with a longer TIF than the original order, BL will schedule a cancel. SelectNet supports TIF of <n> minutes, where <n> is at least equal to 3.

Matching Engine

A preferred matching engine facility receives orders and broadcasts IOIs to all BlockLink systems with routing instructions to forward to likely contra parties. It generates a two-character hexadecimal BlockLinQ Hub event ID that is used to coordinate identification of the best contras across multiple BL sponsoring brokers, and an IOI-ID on each delivered 101. It receives response orders with a matching IOI-ID and executes these in a first come first served basis.

Validating Previously Presented Orders:

(1) Price: The ME preferably compares the limit price on orders to the National BBO; it rejects orders that are not at least as aggressive as the BBO or the midpoint (configurable).

(2) Whole lots only: BL preferably is a whole lots only system, with a "lot" defined as 100 shares for all symbols. This is enforced through the following logic:

(i) If an order carries an odd lot display attribute (for example, "D1452") in the text message field, the display quantity is rounded down to the next lower whole lot size. If this reduced quantity is less then the Min Quantity on the order, ME rejects the order.

(ii) If the order itself is an odd lot, the Matching Engine advertises the order with the next lower whole lot quantity, or rejects it if this lower quantity is less than the Min Qty.

(iii) If the order carries an odd lot Min Qty, ME rounds the Min Qty up to the nearest whole lot. If this increased Min Qty is greater than the order quantity (as for example with an odd lot AON order), then ME rejects the order.

(iv) If a response order is for an odd lot, ME rounds down to the next whole lot, or rejects the order if this turns out to be less than the Min Qty on either the initiation order or the response order.

Processing orders: The matching engine receives orders from BlockLink with 101 routing instructions. It generates a BlockLinQ Hub event ID and sends IOIs out to all available BlockLink systems. This processing is similar to that of the LQT "B/T" options. If the remote advert request is a *69 request. The ME broadcasts the *69 contra search based on the execution ID. The Target System that had the OE to that trade will send the IOI. The matching engine interprets the "L" option by finding the execution ID on the most recent trade executed by this matching engine in that security and broadcasting an advert request using the same mechanics as for the "#" option, so the BL that knows the counter-party in that trade will forward an IOI. IOIs from the Matching Engine preferably include a price aggression flag to specify whether the order, at the time it was received, was priced at least as good as the NMBBO, or at least as good as the Midpoint.

Processing response orders: The ME receives response orders as FIX orders with an IOI-ID that matches to a prior IOI. It decides executions on a first-come first-served basis and updates its own record of the trade, then reports the execution back via FIX. Responses to orders pegged to the midpoint will be executed at the National Market midpoint at the time the response order was received, if this price lies between the limits set by the originating and response orders. Executions of limit orders are priced as determined by the response order, as long as this price is within the original order's limit.

Closing orders: If an order times out, is canceled, or is completely filled, the matching engine will close the order as follows: (1) Place the order in a canceled/filled state. Any further attempts to execute this order will be rejected. (2) Cancel any local or external adverts. The cancel advert message to a BL system will contain a list of response order numbers from that BL and a status flag on each, which can be (a) too passive; (b) lost due to a race condition; and (c) executed.

Clearing supercap: BlockLink installations that contain a matching engine will listen to risk management messages over the SDP indicating when firms exceed their clearing supercap. If either the BlockLinQ ID or the associated MPID exceeds the supercap, the system will remove itself from the market by removing any outstanding IOIs and attempting to cancel any orders it holds in its book. Executions in progress get completely normally. If it finds any other BlockLinQ ID or their associated host MPID to be supercap-exceeded, it will cancel advert requests and not send additional advert requests to the supercap exceeding firm.

The matching engine preferably requires a pricing facility for executing and validating midpoint orders. It preferably will handle a level 1 feed and process requests for a midpoint price. It will place the timestamp of the last heartbeat and the most recent quote update on the response. If the feed was lost for more than 5 seconds, the matching engine preferably will not process midpoint executions.

BlockLinQ Hub

BlockLinQ Hub preferably is a subscription-based service that compares data submitted from its subscribing members and responds with a message based on this data. It is designed to support multiple services with different subscriber lists for each service. In a preferred embodiment, there is a single service, to which all BlockLink installations preferably subscribe.

BlockLinQ Hub events preferably are initiated when it receives a list of targets from a BL system with a Previously Presented unique event ID for that symbol. The system then receives similar lists from other BL systems; some of these lists may be empty, but each BL system will report. Block- LinQ Hub will wait up to three seconds (configurable) or until all BL messages are received, rank targets from the BL systems that have reported, and respond to each with the targets that should get IOIs and the timing of the delivery of the IOIs (for cycling purposes).

BlockLinQ Hub preferably ranks targets according to when the targets meet the full query quantity, then ranks targets that do not meet the full quantity by size. Targets that meet the full query quantity and are submitted by the order entry BL system have top priority.

BlockLinQ Hub preferably logs each event, including the target lists received, timestamps, and the corresponding ranking results for subsequent analysis. This log doesn't need to support help desk intra-day queries. If a BlockLink target list arrives late after a BlockLinQ Hub event is closed, it will have no effect except for being logged with the timestamp and the time the BlockLinQ hub event was closed.

The following outlines the messaging between the BlockLinQ hub and what data is transferred in each message, satisfying the following business processes.

1. Ranking targets to receive IOIs.
2. Supporting operational support from the BlockLinQ Hub to answer operational questions on the flow of events at any BlockLink installation.
3. A real time aggregate BlockLinQ Hub tape feed will support an activity meter for the BlockLink network.
4. An end-of-day batch file will give a detailed activity report supporting off-line quality assurance and operational support, research, and billing.

(1) IOIPermissionRequest

| | Description. | Values |
|---|---|---|
| Query Qty | | Int |
| BlockLinQ Hub ID | | Char[2] |
| Targets | List containing timestamp and size for each target. | {Time, Int} |

-continued

| | Description. | Values |
|---|---|---|
| IamOE | Flag indicating internalization priority. | Boolean |
| Cycle | Flag indicating cycling. | Boolean |

(2) IOIPermissionResponse

| | Description | Values. |
|---|---|---|
| BlockLinQ Hub ID | | Char[2] |
| BlockLinQ Hub UID | Extended ID | String |
| Targets Allowed | Priority rank of each selected target. Ex: {1, 3} notify top guy now; wait two cycle periods to notify second one. | {Int} |

(3) BlockLinQ Hub "tape" feed. Purpose: real time dissemination of trades executed on the BlockLink network. Message: delivered following each execution (by BL on receipt of a LQT counter message, or by the Matching Engine on each execution); gives the price, size, and symbol for each fill.

| | Description | Values. |
|---|---|---|
| Symbol | OTC/NYSE Security | Char[5] |
| Price | Extended ID | Float |
| Quantity | | Int |
| Timestamp | Rounded to seconds, this is the time of receipt of the LQT Counter UM or (for NYSE) the ME execution time. | HrsMinSec |

(4) Glorified Heartbeat. Purpose: remote monitoring system status; remote assistance in problem tracking; and capacity planning. Message: delivered every [n] seconds (default is 180); contains list of key I/O messages; and contains green light flag if all components are up.

| | Description | Values |
|---|---|---|
| MessageType | FIXPreviously PresentedOrder, FiXOrderOut, LQTOrderOut, LQTAdvertRqs, IOIOOut, IOIResponseOrder, AliasOrderOut; FDCExecutionOut; LQTCounterMsg; LQTCounterUM; LQTDeclirie; FIXCancelRqs; LQTCancelRqs; LQTCancelResponse. | Char |
| Timestamp | When message delivered | |
| EventId | Assigned when event is initiated. Will be a-FTXPreviously PresentedOrderOD, or a LQTAdvertRqsID (order reference number). | SNET ORN or String |
| LQTOrderID | For unsolicited (*). LQTAdvertRqs or LQTOrderOut. | SNET ORN |
| LQTAckID | For LQTAdvertRqs that acknowledge a LQTOrderout. | SNET ORN |
| LQT#ID | For LQTCounters where this BL was the OE, the order reference number of the MM leg of the trade. | SNET ORN |
| BlockLinQ Hub UID | Returned by BlockLinQ Hub. | String |
| RoutingOptions | Only for FIXPreviously PresentedOrder and AdvertRqs messages. | String |

(*) Unsolicited LQTAdvertRqs exclude the LQTAcks and LQTRefreshMsg.

(5) Glorified Ping: This message from the BlockLinQ Hub to a particular BlockLink installation requests a Glorified-Heartbeat message. The heartbeat response to this ping will contain the activity since the previous regular heartbeat report. The subsequent hearbeat report will come in normally without regard for this additional message—there is no coupling between the heartbeats and the ping.

(6) EndofdayActivityReport. Purpose: research on query effectiveness, fill rates, etc.; billing audit data. Message: complete audit tables of system activity including order details, routing and display options used, grouped by EventId. BlockLinQ Hub will merge files from different BlockLink installations to group all system activity by GlobalEventId. That will be the same as the BlockLinQ Hub UID for BlockLinQ Hub events, or the LQTOrderID for events that did not involve BlockLinQ Hub. ClientFirmIDs preferably are omitted. Each event is independent from all others, so there is no way to correlate multiple events as pertaining to the same client firm. File preferably is delivered at the end of the trading day.

(7) Suspension (DeliquentFirmMsg): this message notifies the BlockLinQ Hub that a client firm has been suspended from receiving further IOIs for systemically failing to execute orders delivered to it. The DelinquenFirmMsg carries a FirmID recognizable to help desk personnel at the sponsoring broker but not otherwise transparent, to avoid compromising the confidentiality of the client. It also carries a detailed explanation of the cause for the suspension and number of previous suspensions, and a one-time password required to re-enable the client firm.

BlockLinQ Hub operators preferably are responsible for maintaining the integrity of the BlockLink network to optimize quality of service to the Order Entry party. Guidelines and detailed procedures to re-enable suspended firms preferably are documented.

(8) Security Requirements. All communications to BlockLinQ Hub preferably are secured. Intra-day messages will not reveal trade details other than general tape information. None of the messages to the BlockLinQ hub will reveal the identity of the clients. There will be two entitlement levels to access BlockLinQ hub data: help desk personnel, with access to operational information only (points 1-3) above, and supervisors.

Operational; Security; Logging; Capacity and Sizing; Latency

BlockLinQ Hub operations, billing, etc.: A BlockLinQ Hub operations billing facility preferably receives end of day billing summaries from all participating BlockLink systems. The billing facility preferably can reconstruct ME trade activity by matching OE to MM legs when necessary.

BlockLink systems preferably send daily activity reports to the BlockLinQ Hub computer for billing and auditing purposes. These reports contain abstract firm IDs but not firm names for attributes. They contain sufficient data to determine billing and response rates of each participating firm. Firms that fail to respond to their first 5 IOIs or fail to respond to 20 consecutive IOIs preferably are suspended from the system until they call back for reactivation.

| | Comment | Expected Value | Type |
|---|---|---|---|
| OE Broker | Party entering the order. | ABBL1 | String |
| MM Broker | Party entering the response order. | ABBL2 | String |
| Executing Firm | Party reporting the trade. | LQT, ME* | String |

-continued

| | Comment | Expected Value | Type |
|---|---|---|---|
| Query option | Responsible for the trade. Use the ranking for all but the "NFSC"query. If it's an alias-trade, this flag = MPID of-the true target. | "N", "L", "#", "B", "T", "NFSC" | String |

BL Recovery: Operating, licensing, and maintenance costs should be minimized. BlockLink's main function of advertising orders is not mission-critical and therefore some loss of data is acceptable in processing advert requests. Loss of data regarding open liabilities (order and executions) is not acceptable.

The evaluation of dissemination lists based on data is a statistical process that is inherently imprecise. It is impossible to predict the future actions of market participants with certainty. Therefore, query execution latency and system up time preferably take precedence over fault tolerance of the data feed handler. BlockLink will not request rebroadcasts of dropped messages and will not implement a comparison mechanism to update records of past trades when the trade status has changed. It will also be available to respond to query requests even if the data feed has been silent indicating possible loss of connectivity. If there is no data, the query results just simply become sparse, with fewer firms meeting the query criteria.

(1) BlockLink is a high availability service.

(2) On system recovery the query engine read with backlogged trade data as fast as it can. The system will come back on line when it has completely caught up.

(3) No BlockLink-mediated trade data should be lost: all client messages involving trading activity (orders, order updates, etc.) should be recoverable. The FIX engine should also be able to resynchronize so it can't lose any data.

(4) When BlockLink fails, an operator will cancel all its liabilities within SelectNet. In the event of a partial failure the system will automatically cancel any open orders in the securities handled by the failed subsystem.

(5) While BL is down, operators preferably attempt to launch a backup application that declines all LQT/ME orders. SelectNet does not reject orders to MPIDs that are not logged-on so there would be no way for LQT to know an order is not being advertised.

(6) BL preferably will recover within 30 minutes.

(7) Redundant hardware will be stored on site.

(8) The Matching Engine is the book of record for trades it executes. If the Matching Engine had locked in a trade but did not complete the reporting, it will finalize the transaction on recovery. BL response orders to ME over SelectNet must have TIF=Day. If the system cannot be brought back up the execution will be completed or canceled with ACT manually.

(9) SelectNet is the book of record for trades executed by LQT.

(10) When BL recovers it will query all relevant Matching Engines and scan SelectNet to learn the status of any pending orders. If a trade had been locked-in but did not get processed fully prior to BL failure, the system will complete processing on recovery. This includes execution notification and BL query facility update.

(11) The Matching Engine cancels orders when it detects loss of connectivity with a BL client.

(12) BL will not maintain a heartbeat with the client GUI. If a trader shuts down his GUI his orders won't be canceled.

(13) Heartbeats are not required on the BL-host broker connection. The system rejects orders that can't be validated and queues all other broker messages (order updates).

(14) When BL loses the ability to service a client firm's electronic requests to cancel his orders, it will automatically cancel all the firm's orders. A 2-minute delay in detecting loss of connection is acceptable.

(15) Redundant SDPs. It is expected that BL will have access to two SDPs through the hosting broker. Manual intervention is acceptable to point the system to a secondary SDP following a failure. The recovery process, as mentioned above, will scan SelectNet to resolve the status of any pending transactions.

(16) Security model: web access to user configurations, where deployed, will be based on a public key encryption and password authentication model.

(17) Operator consoles preferably indicate whether the system is operating normally and report loading and average latency on order processing.

Regular Operations:

(1) In a preferred embodiment there are documented procedures for taking the system down for maintenance and restarting it, minimally on a weekly basis.

(2) BL preferably will support SNMP to send traps and respond to general status requests (green light/red light) from a remote operations console. The host may set up auto-forwarding traps to system personnel for automatic follow-up.

(3) Glorified heartbeat: BL preferably sends status reports to BlockLinQ Hub at regular intervals comprising a generic green light/red light status bit and more detailed operations information including load and capacity utilization, number of I/O messages of each type, etc.

(4) Glorified Heartbeat request: BlockLinQ Hub message to BL requesting a glorified heartbeat.

(5) No View Access. Outbound IOIs are confidential: the host brokerage will not have view access to outbound IOIs. This will be subject to audit.

Logging: All IOI message traffic preferably is logged. The help desk is able to trace sequences of events concerning an order, including number of IOIs sent to local contras, response orders received, and SelectNet UMs.

Capacity and sizing: BlockLink preferably processes 5 orders or advert requests per second sustained for 15 minutes without backing up. This performance benchmark is preferably measured with an IOI response rate of 40%, all unfilled IOIs being removed, a 40% fill rate on Previously Presented orders to LQT/ME, and all unfilled orders being canceled. The fills data feed handler will support up to 2000 records per second.

Latency: The system preferably produces distribution lists in no more than 5 seconds under load conditions, including the BlockLinQ Hub round trip. The total latency on sending IOIs on Previously Presented orders preferably does not exceed 10 seconds. If backed up under heavy load and unable to satisfy the above latency requirement, BL will decline Previously Presented LQT/ME orders until it has recovered. Latency on passing response orders or cancels through to SNET/ME preferably does not exceed 0.5 seconds, and likewise for reporting SNET or ME executions or cancels. The average latency under a one order per second load should be under 0.25 seconds for these priority messages. The maximum permitted latency on inserting Previously Presented trade information into the fills repository preferably will not exceed 10 seconds from the queue arrival timestamp, for block size trades. For smaller trades a latency of 2 minutes is acceptable. In handling the level I quote feed and producing time-stamped midpoint prices, latency preferably will not exceed 2 seconds.

Although the present invention has been described in connection with the preferred embodiments, it is not intended to be limited to the specific form set forth therein. On the contrary, it is intended to cover such modifications, alternatives, and equivalents as can be reasonably included within the spirit and scope of the invention as defined by the following claims.

Appendix A. BlockLink FIX Interface Specifications

BlockLink enables brokers to sponsor IOIs about Liquidity Tracker orders and route these sponsored IOIs to clients that have been actively trading on the contra side in the security. The routing is based on real-time trade data provided by the host broker about their client's recent trading activity with safe guards to protect the identity of the firm. The BlockLink system can be hosted at the broker's site, to avoid externalizing sensitive data. BlockLink (BLK) routes "IOIs" only to those participating clients that show an active interest in that security, thus reducing market impact.

The BlockLink architecture spans across brokerages to reach buy side participating clients through multiple installations. Each participating broker (ABCD) will be assigned a Previously Presented firm ID within SelectNet (ABBL) to receive BlockLink IOI forwarding requests. The text message in the IOI contains routing criteria giving parameters for querying the local trade repository and selecting clients to receive the IOI.

BlockLink IOIs are actionable. Clients are expected to enter response orders, and the host will forward these orders to BlockLink via FIX. A response order must carry an IOI ID for mapping to the advertised order. BlockLink then attempts to process the execution with Liquidity Tracker. The order-handling model is based on the current workflow for routing orders to "ping" liquidity on another ECN. Brokers hosting BLK sponsor the orders from their clients and forward them to BLK. Orders can either be Previously Presented orders or responses to IOIs. An order to BLK is interpreted as a response to an IOI if it contains a Firm ID and IOI-ID that maps to an advertised order; the response orders will be routed to execute the advertised order. The IOI was sent out with a Firm-ID that should be targeted. The response order is verified to have come from a recipient of the IOI. All other orders are considered to be Previously Presented orders and are routed to Liquidity Tracker with routing instructions encoded in the text message field, or using default routing instructions if none were provided with the order. FIG. 6 shows the message flow for the case where an order entered into the Liquidity Tracker matching engine is advertised to an Institutional client through the BlockLink routing engine; the institutional client enters a response order that is routed to Liquidity Tracker for execution. In step 600 the broker ABCD is sending FIX "Executions" throughout the day (Fills only) to its installation of BLK for its clients. The fill contain a firm id token in the EnteringFirm party field to uniquely identify the ABCD client throughout the trading day. Please note: Custom instances of BlockLink installations may include other mechanisms for getting fill data over TIB subscriptions or polling ABCD data repository. BLK stores the trade data locally for its routing queries. In step 610, Trader 'A' places an order to Liquidity Tracker requesting that IOIs be sent out to Institutions that are actively trading on the contra side. Liquidity Tracker routes a SelectNet. IOI (11) to ABBL. In step 620, BLK receives a the IOI request through the ABBL interface to LQT (as a preferenced SelectNet order); it identifies a firm-id with recent trading activity on the contra side to the order and sends a FIX IOI to ABCD with forwarding instructions to the client (trader 'B'). The selection of the target is based on routing directives from Liquidity Tracker:

> To an Institution that has most recently accumulated shares on the contra side to the LQT order.
>
> To a specific target based on either local EnteringFirm or MPID (for example: "NFSC"). BlockLink is pre-configured by the hosting brokerage (ABCD) with the map of MPID to local EnteringFirms.
>
> To a number of BlockLink contras ("R" option). Most recent trades on the contra side in that security in local and other BlockLink nodes.
>
> To the contra of a specific prior trade in that security (#<order number> option).
>
> To the contra of the most recent trade within that security ("*69" option).

In step 630, ABCD receives the IOI for 'B' over the FIX connection (same connection for sponsoring orders) and forwards the IOI over its internal network to 'B' (based on the Entering Firm='B'). If it can't forward the order because the destination (EnteringFirm) is unavailable, it sends back Business Message Reject for the particular IOIID being rejected.

In step 640 the client 'B' receives the actionable IOI. ABCD's client (Trader 'B') submits an order 650 with the IOI-ID for matching to the advertised order through BLK. This is done within the normal client-ABCD interfaces (FIX, workstation, etc.). In step 660 ABCD receives the order with BLK attributes. It proxies a sponsored order on BLK as a FIX order with an IOC attribute. The proxy sponsored order is a virtual Broker BlockLink order that maps to the actual original Trader-Broker order. An execution of the Proxy is an execution on the original order within the broker. This procedure includes:

> ABCD validates the order including the client's order entry credit, permissions, etc.
>
> ABCD holds a private copy of the order and doesn't display it externally or auto-execute it against other orders. ABCD submits a Previously Presented FIX "Single Order" to ABBL (as it would an external ECN) with a token in the EnteringFirm party field to uniquely identify the client, and the IOI-ID field. The EnteringFirm token must be 1:1 mapping and consistent for all references to that client firm throughout the trading day. BlockLink provides standard FIX V4.2 order management capabilities (minus the cancel-replace).
>
> ABCD maintains a map between its internal order and the proxy (sponsored) order delivered through BLK.

In step 670, BlockLink processes the responding order with Liquidity Tracker. Liquidity Tracker will > Validate the order attributes. This validation also includes validating the IOIID-EnteringFirm pair is one that was targeted by the IOI. This permissions check is a business requirement to insure that the responding party is not probing BlockLink for liquidity. Orders that fail validation are promptly rejected.
>
> Match 'B' responding order to the advertised SelectNet order and route an execution request to Liquidity Tracker as SelectNet transaction service counter. If the execution isn't possible, BlockLink sends a reject back.

In step 680, Liquidity Tracker sends back execution messages, for successfully executed BlockLink execution request. BlockLink forwards it to the broker (ABCD) 690 for routing to the firm in step 700. This fill is reported back to BlockLink data cache as another instance of step 600 as part of the data feed that also includes other fills entered by ABCD. BlockLink uses a subset of FIX V4.2 for proxy order management. When broker ABCD receives updates (rejects, fills, order state, etc) from BLK 690 for its proxy/sponsored order, it acts on the original (trader_ABCD) mapped order. This includes clearing & reporting trades, and notifying the client trader 'B' 800.

BlockLink inbound messages

> Fills. ABCD will send a FIX execution for every fill where ABCD is the sponsoring broker. This includes buy-side fill on the ECN, ABCD-sponsored orders forwarded to execute at a third party destination, and ABBL-mediated executions. ABCD is responsible for identifying the client's firm id that was responsible for the fill—BLK knows the firm only by the Firm-ID that ABCD assigns to it, and refer to it when listing targets that should receive IOIs.
>
> IOI Reject. ABCD will immediately notify BLK when an IOI could not be sent with a FIX Business Message Reject. The reject must contain IOIID being rejected.
>
> Order Status Request. ABCD can request the status of any order that it sent to BLK by sending a FIX Order Status Request the ClOrdID or OrderID of the order. BLK will respond with a FIX Execution containing the current state of the order.
>
> Cancel Request. BLK will process all Cancel Request except for immediate or cancel orders (IOC). IOC orders by definition expire if not immediately executable.

BlockLink outbound messages

> IOI. BLK sends ABCD directed 101 targeted at specific Firm Id (EnteringFirm). ABCD must preserve the IOIID within the IOI delivery to the client. This allows the clients on multiple networks reachable by LQT through different BLK nodes to detect redundant IOIs. ABCD is responsible for interpreting the target ID and delivering of the IOI to the customer's desktop.
>
> Order acknowledge. BLK acknowledges receipt of orders with an Execution message with Previously Presented or Rejected order status.
>
> Early Expiration of Orders. BLK will expire an order when the order to Liquidity Tracker is declined. It will send out a FIX Execution message with an expired order status.
>
> Partial fill and filled. BLK notifies ABCD that its clients order has been filled or partially filled with FIX Execution message.
>
> Order status response. ABCD can request order status and BLK will respond with an Execution Msg. containing the current state of the order.
>
> Cancel response. BLK responds to a cancel request with either an Execution Msg containing a canceled status or a Cancel Reject Msg. IOC orders cannot be canceled.

FIX Messaging Use Cases

This section provides use cases for BLK-ABCD message flow.

The following Message types are supported:

0=Heartbeat
1=Test Request
2=Resend Request
3=Reject
4=Sequence Reset
5=Logout
6=Indication of Interest
8=Execution Report
9=Order Cancel Reject
A=Logon
D=Order-Single F=Order Cancel Request
H=Order Status Request
j=Business Message Reject
IOI with Order Execution BlockLink will send one or more IOIs to (ABCD) broker's client firms. The clients can respond with orders that may get filled/partially filled. Each client may get a custom IOI targeting reason text. Each IOI contains the firm id for the target firm (EnteringFirm). Note: IOIs are not updated on partial fills. The IOI is canceled when the underlying order is filled, expired, or canceled. All orders that can't trade against the IOI expire immediately.

In the scenario described in Table D, a BLK order for 1000 shares is being advertised to clients a, b, c. Each receives the IOI for 10000 shares. Each submits an order to buy 5000. Only two of these orders are filled, the other expires.

TABLE D

| ABCD | | ABBL |
|---|---|---|
| | ← | IOI (EnterinsFirms= a, IOIId=1 @a, IOITransTvp=<Previously Presented>, Quants=10000) |
| | ← | IOI (EnteringFirms= a,. IOIId=1 @b, IOITransTvp=<Previously Presented>, Quant-10000) |
| | ← | IOI (EnteringFirm= c, IOIId=1 @c, IOITransTvp=<Previously Presented>, Quant=10000) |
| | → | Previously Presented Order-Single(EnteringFirm=a, C1OrdId=11, Quant=5000, IOIid=1@a) |
| | ← | Execution Report (ExecType=<Previously Presented>, C1OrdId=11, OrderId=102, OrdStatus=<Previously Presented>, ExecId=), EnteringFirm=a) |
| | ← | Execution Report (ExecType = <fill?, OrderId=102, OrdStatus= <filled>, ExecID=0a6, EnteringFirm=a, LastShares=5000) |
| | → | Previously Presented Order-Single(EnteringFirm=b, C1OrdID-12, Quant=5000 IOIid=1@b) |
| | ← | Execution Report (ExecType=<Previously Presented>, C1OrdId-12, OrderId-103, OrdStatus-=<Previously Presented>, ExecId=0, EnteringFirm-b) |
| | → | Previously Presented Order-Single(EnteringFirm=c, C1OrdId=13, Quant=5000, IOIid-1@c) |
| | ← | Execution Report (ExecType=<Previously Presented>, C1OrdId=13, OrderId=104, OrdStatus=<Previously Presented>, ExecId=0, EnteringFirm=c) |
| | ← | Execution Report (ExecType = <fill>, OrderId=103, OrdStatus=<filled>, ExecId=0a6, EnteringFirm=b, LastShares=10000) |
| | ← | IOI (EnteringFirm= a, IOIId=1@a, IOITransTyp=<cancel>, Quant=10000) |
| | ← | IOI (EnteringFirm= b, IOIId-1@b, IOITransTyp=<cancel>, Quant=10000) |
| | ← | IOI (EnteringFirm= c, IOIId=1@c, IOITransType=<cancel>, Quant=10000) |
| | ← | Execution Report (ExecType=<Previously Presented>, OrderId=103, OrdStatus= <expired>, ExecId=0, EnteringFirm=c, LeavesQty=5000) |

Order Execution

These are the basic flows for filled orders. The filled order status is a termination state for the order and no other unsolicited execution message will follow.

The EnteringFirm is required on all Previously Presented orders; It is the EnteringFirm of the ABCD client firm. BLK may optionally include this ID within its messages to ABCD.

An order filled with partial fills is described in the scenario shown in Table E.

TABLE E

| ABCD | | ABBL |
|---|---|---|
| | → | Previously Presented Order-Single(EnteringFirm=a, CIOrdID=11) |
| | ← | Execution Report (ExecType=<Previously Presented>, CIOrdId=11, OrderId=102, OrdStatus=<Previously Presented>, ExecId=), EnteringFirm=a) |

TABLE E-continued

| ABCD | ABBL |
|---|---|
| ← Execution Report (ExecType = <partial fill>, OrderId=102, OrdStatus=<partially filled>, ExecID=0a2, EnteringFirms=a) | |
| ← Execution Report (ExecType = <partial fill>, OrderId=102, OrdStatus=<filled>, ExecId=0a6, EnteringFirm=a) | |

Rejected IOI

BLK will try to send an IOI to a limited number of parties based on routing directives from Liquidity Tracker including a query type, query parameters and the number of targets to be notified. BLK ranks targets that satisfy the criteria; if a party isn't reachable by the IOI, BLK will try another firm.

Table F shows an example where ABCD doesn't have any firms that are reachable and likely to take the contra side to this order, based on the Liquidity Tracker directives. Therefore if it receives an IOI that can't be routed it must reject the IOI so that BLK can try an alternative firm.

TABLE F

| ABCD | ABBL |
|---|---|
| ← IOI (EnteringFirm=a, IOIID=1@a, IOITransType=<Previously Presented>, Quant=10000, SeqNum=1024) | |
| → Business Message Reject (RefSeqNum=1024, BusinessRejectReason=<App not available>, BusinessRejectRefID-1@a, RefMsgType = <IOI>) | |
| ← IOI (EnteringFirm= b, IOIId=2@b, IOITransTyp=<Previously Presented><Quant=10000) | |

Host Broker Requirements

This section defines the functions broker (ABCD) will perform.

ABCD will connect to BLK as a FIX client

Push FIX executions with the fill information for its clients.
 The fill information will include the firm id of the client within the EnteringFirm field.
 It will only push fills where the client is eligible to receive an IOI for that security and side. There must be at least one trader able to watch the security & side.
 It will send the fills immediately after the trade.
 The fills will contain the symbol for the primary market where the issuer is listed. ABCD will send BLK all fills assigned to buy-side clients. Note: BLK supports a filter to drop fills pertaining to firms that elect not to receive its IOIs. A fill is considered to be "sell-side" if the corresponding leg of the trade assigns the shares to a market participant other than ABCD. For example, an Institution sells through ABCD with MSCO as the buyer (this is common occurs when the broker (ABCD) is an ECN). The broker would report for clearing as a sell, ABCD versus MSCO; there are two fills: one is assigned to the Institution (buy-side firm), the other is assigned to MSCO. The buy-side fill is pushed to BlockLink, but the sell-side fill (sell to MSCO) is not.

ABCD will receive IOIs from BLK and route them to its clients.
 The IOI EnteringFirm party field will contain the firm id for the target.
 If ABCD is unable to deliver the IOI to a trader (not watching or no connectivity, ABCD will immediately reject the IOI message.
 ABCD will process BLK requests to remove IOIs when the underlying order is gone.

ABCD will send orders on behalf of its clients to BLK.
 The client's firm id is within the EnteringFirm party field of the message.
 Response orders to the advertisement will be routed back to BLK.
 ABCD will forward cancel requests to BLK with the order ID.
 ABCD will process the BLK execution messages on behalf of its clients.

FIX Notes

This document is based upon the FIX 4.2 Specification. This includes a subset of order management (minus cancel replace message plus others), session management and message acknowledgment using heartbeats and test messages.

The client-server relationship defined within the FIX specification would best be matched if BLK were the server and ABCD were the client. As an optimization to reduce the number of connections, the feed of fills can also be pushed over the same connection. Alternatively, BLK also supports receiving fills data through a FIX client, a TIB subscriber, or by polling the fill database table.

FIX header CompID and SubID have the agreed-upon values for ABCD and BLK. ABCD Clients are addressed by their Firm Id in the EnteringFirm party field of the application messages. The enhanced features of FIX over public networks outlines usage of these fields. The header routing fields can be used as an alternative for the EnteringFirm.

The actual FIX messages are defined within the subsequent sections. In Table G we give the supported FIX header and trailer for those messages.

TABLE G

| | | Standard Message Header | |
|---|---|---|---|
| Tag | Field Name | Req'.d.: | Comments |
| 8 | BeginString | Y | FIX. 4.2 (Always unencrypted, must be first field in message |
| 9 | BodyLengt | Y | (Always unecrypted, must be second field in message) |
| 35 | MsgType | Y | (Always unencrypted, must be third field in message) |
| 49 | SenderCompID | Y | Assigned value used to identify firm sending message. (ABCD's or BLK's CompId) |
| 50 | SenderSubID | N | Assigned value used to identify message originator (desk, trader, etc.) (ABCD's or BLK's SubId) |

TABLE G-continued

Standard Message Header

| Tag | Field Name | Req'.d.: | Comments |
|---|---|---|---|
| 56 | TargetCompID | Y | Assigned value used to identify receiving firm. (ABCD's or BLK's CompId) |
| 57 | TargetSubID | N | (ABCD's or BLK's SubId) "ADMIN" reserved for administrative messages not intended for a specific user. (Can be embedded within encrypted data section.) |
| 115 | OnBehalfOfCompID | N | Trading partner company ID used when sending messages via a third party. BlockLink uses this field as required for public FIX network messaging. |
| 128 | DeliverToCompID | N | Trading partner company ID used when sending messages via a third party. Optionally, BlockLink uses this field in place of the EnteringFirm for targeting IOIs thorugh a sponsoring broker. BlockLink uses this field as required for public FIX network messaging. |
| 34 | MsgSeqNum | Y | (Can be embedded within encrypted data section.) |
| 43 | PossDupFlag | N | Always required for retransmitted messages, whether prompted by the sending system or as the result of a resend request. (Can be embedded within encrypted data section.) |
| 97 | PossResend | N | Required when message may be duplicate of another message sent under a different sequent number. (Can be embedded within encrypted data section.) |
| 52 | SendingTime | Y | (Can be embedded within encrypted data section.) |
| 122 | Orig SendingTime | N | Required for message resent as a result of a ResendRequest. If data is not available set to same value as SendingTime. (Can be embedded within encrypted data section.) |
| 369 | LastMsgSeqNum Processed | N | The last MsgSeqNum value received and processed. Can be specified on every message sent. Useful for detecting a backlog with a counterparty. |

Standard Message Header

| Tag | Field Name | Req'.d.: | Comments |
|---|---|---|---|
| 10 | CheckSum | Y | (Always unencrypted, always last field in message) |

BlockLink will accept messages having the market Symbol of the security; it rejects orders it fails to map to valid securities.

The default BlockLink implementation utilizes the Client ID or RoutingID FIX field to designate the message source and route BLK responses trough the sponsoring broker. If necessary, custom BlockLink instances may utilize other fields. Prime candidates are the CompId and SubId fields of the FIX message's header.

The FirmID value received may be cryptic to preserve the anonymity of the broker's clients. BlockLink requires the broker to use a single unique id for the client that is consistant for the trading day.

The MaxFloor and MaxShow are accepted on Previously Presented unsolicited orders. As it is written in the FIX 4.2 Specification, MaxFloor is the size to be displayed globally. MaxShow is the size to display locally. If only one level of display size attribute is required they recommend MaxFloor. (MaxFloor<=MaxShow<=Order Quantity). Initial BlockLink implementation only supports locally advertised orders (MaxShow). BlockLink reserves MaxFloor for the possibility of future global advertisements. It supports unsolicited orders with none, one or both of these fields and applies the following rules:

If MaxShow=0 the order is rejected. If MaxShow is absent,
If MaxFloor=0 the order is rejected If MaxFloor>0, MaxFloor is the display size If MaxFloor is also missing, the Order Quantity is the display size If MaxShow>0, it is the display size. If MaxFloor is also present, the order is rejected if MaxFloor> MaxShow.

Rejected Messages

BlockLink follows the FIX 4.2 Specification for use cases for rejected messages. This includes Business Message Reject for the application message rejects not covered by other message reject mechanisms.

The Cancel and Order Status requests may contain optional order details (example ClientID). BlockLink response messages will attempt to first derive the value, or else echo back the same values within the request.

ABCD Contributed Fill Info

ABCD as a "FIX Client" of BlockLink, pushes all FIX execution reports where ABCD sponsors the client's execution. This includes executions of buy-side clients, execution of sponsored orders routed to a third party execution destination and ABBL-mediated trades. ABCD will send a FIX execution report for each leg of a trade where it is the sponsoring broker.

BLK supports enabling a subset of firms for receiving IOIs, or "ALL" firms for which it receives fills data. It automatically creates Previously Presented clients in its database upon receipt of any fill or order pertaining to a Previously Presented client-ID; when configured to route to ALL clients, Previously Presented firms are automatically enabled for receiving IOIs. In the manual configuration, a help desk operator will be prompted to activate Previously Presented clients.

The FIX Execution message details required by BLK are given in Table H.

TABLE H

Execution Report

| Tag | Field Name | Req'd.: | Comments |
|---|---|---|---|
|  | Standard Header | Y | MsgType = 8 |
| 37 | OrderID | Y | Ignored by BLK. |
| 17 | ExecID | Y | Must be unique for each Execution Report message |
| 20 | ExecTransType | Y | 0 = Previously Presented, 1 = correct, 2 = cancel |
| 19 | ExecRefID | N | Required for Cancel and Correct ExecTransType messages. |
| 150 | ExecType | Y | Describes the type of execution report. Only 2 = Fill and 1 = Partial Filled are processed by ABBL, others are ignorer by BLK. |
| 39 | OrdStatus | Y | Ignored by BLK |
| 109 | ClientID | Y | The firm id for this fill. |
| 55 | Symbol | Y | Market symbol for the security |
| 54 | Side | Y |  |
| 38 | OrderQty | Y | Ignored by BLK |
| 32 | LastShares | N | Quantity of shares bought/sold on this (last) fill. Required by BLK for ExecType fill, or partial fill. |
| 31 | LastPx | N | Price of this (last) fill. Required by BLK for ExecType fill, or partial fill. |
| 151 | LeavesQty | Y | Ignored by BLK |
| 14 | CumQty | Y | Ignored by BLK |
| 6 | AvgPx | Y | Ignored by BLK |
| 60 | TransactTime | N | Time the transaction represented by this ExecutionReport occurred. Required for ExecTransType = Previously Presented or Updated. |
|  | Standard Trailer | Y |  |

Multiple ABCD Client Executions

Several client firms can receive the same logical IOI. Each client can respond with one or more orders that may get executed. The execution processing will be streamed on a first come basis.

FIX IOI

BLK sends ABCD a (Previously Presented, or cancel) FIX IOI message to be routed to the ClientID specified in the RoutjngID field. If no trader is eligible to receive a Previously Presented IOI, ABCD must reject the IOI message.

On a partial fill, BLK will not reduce the quantity of the associated IOIs (no IOI replace). It will cancel the IOI when the order is no longer tradable (expired, filled, cancelled).

BLK will place information relevant for the client in the text message field of its IOIs. This text field must be passed to the client with the forwarded IOI, so client GUIs can display it for the trader.

The FIX IOI message specifications are given in Table I.

TABLE I

Indication of Interest

| Tag | Field Name | Comments |
|---|---|---|
|  | Standard Header | MsgType = 6 |
| 23 | IOIid |  |
| 28 | IOITransType | Previously Presented or Cancel are supported. |
| 26 | IOIRefID | Required for Cancel IOITransType messages |
| 215 | NoRoutingIDs | Number of RoutingIDs |
| 216 | RoutingType | Indicates the type of RoutingID specified. Valid value: 1 = Target Firm |
| 217 | RoutingID | Client Firm of the broker to receive the IOI. |
| 55 | Symbol |  |
| 54 | Side | Side of Indication Valid values: 1 = Buy; 2 = Sell; 7 = Undisclosed (for IOIs) |
| 27 | IOIShares |  |
| 44 | Price |  |
| 62 | ValidUntilTime |  |
| 25 | IOIQltyInd | Always H = High |
| 199 | NoIOIQualifiers | Required if any IOIQualifiers are specified. Indicates the number of repeating IOIQualifiers. |
| 104 | IOIQualifier | Valid values: A = All or none = SelectNet AON; L = Limit = LQTR order; M = More behind = LOT "D" option; Y = At the Midpoint = LOTM order; R = Ready to trade |
| 58 | Text | The BLK targeting and display criteria as defined in section Error! Reference source not found |
| 60 | TransactTime |  |
|  | Standard Trailer |  |

FIX IOI Reject

If ABCD cannot route an advertisement (IOI) to its destination it must reject the IOI message immediately. The BusinessRejectReason="Application not available at this time" will be used. ABBL rejects unsupported message types. The specifications for the business reject message are given in Table J.

TABLE J

| | | Business Message Reject | |
|---|---|---|---|
| Tag | Field Name | Req'.d.: | Comments |
| | Standard Header | Y | MsgType = j (lowercase) |
| 372 | RefMsgType | Y | The MsgType of the FIX message being referenced. (IOI = 6) |
| 379 | BusinessRejectRefID | Y | The IOIID of the message being rejected. |
| 380 | BusinessRejectReason | Y | Code to identify reason for a Business Message Reject message. (Application not available at this time) |
| 58 | Text | N | Where possible, message to explain reason for rejection. |
| | Standard Trailer | Y | |

FIX Previously Presented Single Order, Unsolicited

Unsolicited orders are those not entered in response to an IOI. ABCD will forward orders on behalf of its clients to BLK when they carry BLK/LQT advertising attributes. The Client ID field is required to be the originator SenderCompId (ABCD firm-ID). The trader may also supply Text and other order attributes that optionally instruct BLK on the display and routing attributes. BLK does not support TIF greater than one day: it will expire all remaining orders at the end of the trading day.

ABCD will manage the order on the BLK system using the ClOrdId or the OrderId returned within the execution message response.

In response to a Previously Presented order, BLK will: acknowledge the order with an execution report with a Previously Presented order status; or reject the message. In its initial release BLK will only support not held orders that are either limit orders or can be executed at the midpoint price, possibly with price improvement: for example, a market order without a limit price is accepted but will only execute at the midpoint. BLK will reject orders with unsupported attributes; it will indicate the invalid field value pair in the rejection message.

Table K gives the specifications for the unsolicited order message.

TABLE K

| | | Previously Presented Order - Single | |
|---|---|---|---|
| Tag | Field Name | Req'.d.: | Comments |
| | Standard Header | Y | MsgType = D |
| 11 | ClOrdID | Y | Unique identifier of the order as assigned by ABCD. |
| 109 | ClientID | Y | The SourceCompId of the buy-side trader entering the order. |
| 21 | HandlInst | Y | Instructions for order handling on Broker trading floor<br>Supported values:<br>1 = Automated execution order, private, no Broker intervention<br>2 = Automated execution order, public, Broker |
| 18 | ExecInst | N | Can contain multiple instructions, space delimited.<br>Valid values:<br>1 = Not held (default)<br>2 = Work<br>4 = Over the day<br>G = All or none —AON<br>M = Mid-price peg (midprice of inside quote)<br>N = Non-negotiable<br>P = Market Peg |

TABLE K-continued

Previously Presented Order - Single

| Tag | Field Name | Req'.d.: | Comments |
|---|---|---|---|
| 110 | MinQty | N | |
| 55 | Symbol | Y | Market symbol for the security |
| 54 | Side | Y | |
| 114 | LocateReqd | N | Required for short sell orders |
| 60 | TransactTime | Y | Time this order request was initiated/released by the trader or trading system. |
| 38 | OrderQty | Y | |
| 40 | OrdType | Y | Order type.<br>Support values:<br>1 = Market<br>2 = Limit<br>7 = Limit or better<br>P = Pegged |
| 44 | Price | N | Required for limit OrdTypes. Can be used to specify a limit price for a pegged order, previously indicated, etc. |
| 59 | TimeInForce | N | [1]Absence of this field indicates Day order<br>Supported values:<br>0 = Day<br>1 = Good Till Cancel (GTC)<br>6 = Good Till Date |
| 126 | ExpireTime | N | Conditionally required if TimeInForce = GTD |
| 47 | Rule80A (aka OrderCapacity) | N | Supported values:<br>A = Agency single order<br>P = Principal |
| 58 | Text | N | The BlockLink Routing and Display criteria as defined in section 16 below. If not specified BLK defaults are used. |
| 111 | MaxFloor | N | |
| 210 | Max Show | N | |
| 211 | PegDifference | N | [2]Amount (signed) added to the price of the peg. |
| 388 | DiscretionInst | N | Code to identify the price a DiscretionOffset is related to and should be mathematically added to. Required if DiscretionOffset is specified.<br>0 = Related to displayed price<br>1 = Related to market price<br>2 = Related to primary price<br>3 = Related to local primary price<br>4 = Related to midpoint price<br>5 = Related to last trade price |
| 389 | DiscretionOffset | N | Amount (signed) added to the "related to" price specified via DiscretionInst. |
| | Standard Trailer | Y | |

[1]All orders expire end of day.
[2]Provided for future use.

Solicited Orders

Orders in response to an IOI contain an IOI-ID. Regardless of the Time-in-Force specified within the message, all valid orders are treated as immediate or cancel (IOC).

When not specified, the execution instructions are derived from the associated IOI.

Where an order contains an IOI-ID, the Order type will be interpreted:
  Market orders are priced at the IOI price. If the IOI is pegged then it too is pegged.
  Limit orders use the price as a cap and may receive price improvement.
  Pegged orders are only valid if they match the IOI peg qualifiers. If so (midpoint peg response to a LQTM IOI) the order is priced at the IOI price.

Note: LQTM IOIs carry a suggested price cap for the associated counter. This suggested price cap will be used as IOI price when routing a response order that does not carry a limit (Market or Pegged).

The FIX specification for the solicited (response) order message is given in Table L. Fields marked with asterisks (*) can be sent as required.

TABLE H

Execution Report

| Tag | Field Name | Req'.d.: | Comments |
|---|---|---|---|
| | Standard Header | Y | MsgType = D |
| 11 | ClOordID | Y | Unique identifier of the order as assigned by ABCD. |
| 109 | ClientID | Y | Sending client firm id |

TABLE H-continued

Execution Report

| Tag | Field Name | Req'.d.: | Comments |
|---|---|---|---|
| 21 | HandlInst | Y | Instructions for order handling on Broker trading floor<br>Supported values;<br>1 = Automated execution order, private, no Broker intervention<br>2 = – Automatead execution order, public, Broker intervention OK |
| 18 | ExecInst | N | Instruction for order handling on exchange trading floor. If more than one instruction is applicable to an order, this field can contain multiple instructions separated by space.<br>Valid values:<br>1 = Not held (default)<br>M = Mid-price peg (midprice of inside quote) (invalid) where the IOI isn't also pegged. Not required/implied on midpoint IOI responses)<br>G = All or none - AON |
| 110 | MinQty | N | |
| 55 | Symbol | Y | |
| 54 | Side | Y | Side Order<br>Supported values:<br>1 = Buy<br>2 = Sell<br>5 = Sell short<br>6 = Sell short exempt |
| 60 | TransactTime | Y | Time this order request was initiated/released by the trader or trading system |
| 38 | OrderQty | Y | |
| 40 | OrdType | Y | Order type<br>Valid values:<br>E = Previously indicated (implicit if the IOIId field is included) |
| 44 | Price | N | Required for limit OrdTypes |
| 23 | IOIid | N | Required for all responses to BLK advertisements, and for Previously Indicated Orders (OrdType = E). Regardless of the order type, if this field is specified the order type, it is implied to be a response to an IOI. |
| 59 | TimeInForce | N | Specifies how long the order remains in effect. Absence of this field is interpreted as DAY. BLK treats all accepted orders as IOC and will expire an order's unfilled quantity. BLK will reject non-midpoint pegged orders that are GTX, and GTD orders.<br>Valid values:<br>0 = Day<br>1 = Good Till Cancel (GTC)<br>3 = Immediate or Cancel (IOC)<br>6 = Good Till Date<br>4 = Fill or Kill (FOK) |
| 126 | ExpireTime | N | Conditoinally required if TimeInForce = GTD and ExpireDate is not specified. |

FIX Execution—Previously Presented Orders

On receipt (safe store) of ABCD client orders, BLK acknowledges with a FIX Execution Report with an ExecTransType of Previously Presented. The specification for execution report messages is given in Table M.

TABLE M

Execution - Rejected Order Report

| Tag | Field Name | Comments |
|---|---|---|
| | Standard Header | MsgType = 8 |
| 37 | OrderID | OrderID is required to be unique for each chain of orders. BLK maintains a map between its OrderID and the ClOrdID generated by ABCD. |
| 11 | ClOrdID | |
| 17 | ExecID | Must be unique for each Execution Report message |

TABLE M-continued

Execution - Rejected Order Report

| Tag | Field Name | Comments |
|---|---|---|
| 20 | ExecTransType | Identifies transaction type<br>Valid values:<br>0 = Previously Presented |
| 150 | ExecType | Describes the specific ExecutionRpt (i.e. Partially Filled)<br>Valid values:<br>0 = Previously Presented |
| 39 | OrdStatus | Identifies current status of order.<br>Valid values:<br>0 = Previously Presented |
| 55 | Symbol | |
| 54 | Side | |
| 38 | OrderQty | |
| 40 | OrdType | |
| 44 | Price | Required if specified on the order |
| 109 | ClientID | Client Firm of the broker to receive the message |
| 59 | TimeInForce | Absence of this field indicates Day order |
| 18 | ExecInst | Can contain multiple instructions, space delimited. |
| 32 | LastShares | Value will be "0" |
| 31 | LastPx | Value will be "0" |
| 14 | CumQty | Currently executed shares for chain of orders. |
| 6 | AvgPx | |
| 151 | LeavesQty | Amount of shares open for further execution. LeavesQty = OrderQty − CumQty. |
| 60 | TransactTime | Time the transaction represented by this ExecutionReport occurred |
| 21 | HandlInst | |
| 126 | ExpireTime | If specified on the order |
| 47 | Rule80A (aka Order Capacity) | If specified on the order |
| 111 | MaxFloor | If specified on the order |
| 210 | MaxShow | If specified on the order |
| 211 | PegDifference | If specified on the order |
| 388 | DiscretionInst | If specified on the order |
| 389 | DiscretionOffset | If specified on the order |
| 110 | MinQty | If specified on the order |
| | Standard Trailer | |

FIX Execution—Rejected Order

ABBL rejects orders with the Execution messages (order status=rejected). An order is rejected if: order attributes aren't supported; the market is closed; or on system faults. The specification for this message is given in Table N.

TABLE N

Indication of Interest

| Tag | Field Name | Comments |
|---|---|---|
| | Standard Header | MsgType = 8 |
| 37 | OrderID | OrderID is required to be unique for each chain of orders. |
| 11 | ClOrdID | |
| 17 | ExecID | Must be unique for each Execution Report message |
| 20 | ExecTransType | Identifies transaction type<br>Valid values:<br>0 = Previously Presented |
| 150 | ExecType | Describes the specific ExecutionRpt, OrdStatus will always identify the current order status.<br>Valid values:<br>8 = Rejected |
| 39 | OrdStatus | Identifies current status of order.<br>Valid values:<br>8 = Rejected |
| 55 | Symbol | |
| 54 | Side | |
| 38 | OrderQty | |
| 32 | LastShares | Value will be "0" |
| 31 | LastPx | Value will be "0" |
| 152 | LeavesQty | =OrderQty |

TABLE N-continued

Indication of Interest

| Tag | Field Name | Comments |
|---|---|---|
| 14 | CumQty | Currently executed shares for chain or orders. |
| 6 | AvgPx | |
| 109 | ClientID | Client Firm of the broker to receive the message |
| 21 | HandlInst | |
| 126 | ExpireTime | If specified on the order |
| 47 | Rule80A (aka OrderCapacity) | If specified on the order |
| 111 | MaxFloor | If specified on the order |
| 210 | MaxShow | If specified on the order |
| 211 | PegDifference | If specified on the order |
| 388 | DiscretionInst | If specified on the order |
| 389 | DiscretionOffset | If specified on the order |
| 110 | MinQty | |
| 60 | TransactTime | Time the transaction represented by this ExecutionReport occurred |
| | Standard Trailer | |

FIX Execution—Fill

BLK sends ABCD a FIX execution with either an order status of filled or partially filled. Below is a matrix of the order field values for execution type and order status. The specification for the execution message following a fill is given in Table O.

TABLE O

Exectuion - Expired or Cancelled Order Report

| Tag | Field Name | Comments |
|---|---|---|
| | Standard Header | MsgType = 8 |
| 37 | OrderID | OrderID is required to be unique for each chain of orders. |
| 11 | ClOrdID | |
| 17 | ExecID | Must be unique for each Execution Report message |
| 20 | ExecTransType | Identifies transaction type<br>Valid values:<br>0 = Previously Presented |
| 150 | ExecType | Describes the specific ExecutionRpt (i.e, Pending Cancel) while OrdStatus will always identify the current order status (i.e. Partially Filled)<br>Valid values:<br>1 = Partially filled<br>2 = Filled |
| 39 | OrdStatus | Identifies current status of order.<br>Valid values:<br>1 = Partially filled<br>2 = Filled |
| 55 | Symbol | |
| 54 | Side | |
| 38 | OrderQty | |
| 44 | Price | Required if specified on the order |
| 32 | LastShares | Quantity of shares bought/sold on this (last) fill. |
| 31 | LastPx | Price of this (last) fill. |
| 151 | LeavesQty | Amount of shares open for further execution. LeavesQty = OrderQty − CumQty |
| 14 | CumQty | Currently executed shares for chain of orders. |
| 6 | AvgPx | |
| 109 | ClientID | Client Firm of the broker to receive the message |
| 60 | TransactTime | Time the transaction represented by this ExecutionReport occurred |
| | Standard Trailer | |

FIX Execution—Expired or Cancelled Order

In Table P the specification is given for the Execution report sent by BLK for expired or canceled orders.

TABLE P

Execution Report

| Tag | Field Name | Comments |
|---|---|---|
| | Standard Header | MsgType = 8 |
| 37 | OrderID | OrderID is required to be unique for each chain of orders. |
| 11 | ClOrdID | |
| 41 | OrigClOrdID | Used on the cancel |
| 17 | ExecID | Must be unique for each Execution Report message |
| 20 | ExecTransType | Identifies transaction type<br>Valid values:<br>0 = Previously Presented |
| 150 | ExecType | Describes the specific ExecutionRpt (i.e. Pending Cancel) while OrdStatus will always identify the current order status (i.e. Partially Filled)<br>Valid values:<br>4 = Canceled<br>C = Expired |
| 39 | OrdStatus | Identifies current status of order.<br>Valid values:<br>4 = Canceled<br>C = Expired |
| 55 | Symbol | |
| 54 | Side | |
| 38 | OrderQty | |
| 32 | LastShares | Value will be "0" |
| 31 | LastPx | Value will be "0" |
| 151 | LeavesQty | 0 |
| 14 | CumQty | Currently executed shares for chain of orders. |
| 6 | AvgPx | |
| 109 | ClientID | Client Firm of the broker to receive the message |
| 21 | HandlInst | |
| 126 | ExpireTime | If specified on the order |
| 47 | Rule80A<br>(aka OrderCapacity) | If specified on the order |
| 111 | MaxFloor | If specified on the order |
| 210 | MaxShow | If specified on the order |
| 211 | PegDifference | If specified on the order |
| 388 | DiscretionInst | If specified on the order |
| 389 | DiscretionOffset | If specified on the order |
| 110 | MinQty | |
| 60 | TransactTime | Time the transaction represented by this ExecutionReport occurred |
| | Standard Trailer | |

BLK supports Order Status Request from ABCD. The fields of the request are given in Table Q. The response is a standard FIX execution message.

TABLE Q

Order Status Report

| Tag | Field Name | Req'd | Comments |
|---|---|---|---|
| | Standard Header | Y | MsgType = H |
| 37 | OrderID | N | |
| 11 | ClOrdID | Y | The ABCD specified Id on order entry. |
| 54 | Symbol | Y | Ignored by BLK |
| 55 | Side | Y | Ignored by BLK |
| | Standard Trailer | Y | |

Order Status Response - Execution Report

| Tag | Field Name | Comments |
|---|---|---|
| | Standard Header | MsgType = 8 |
| 37 | OrderID | OrderID is required to be unique for each chain of orders. |
| 11 | ClOrdID | |
| 109 | ClientID | As entered in the Previously Presented Order or derived from the original order. |
| 17 | ExecID | Must be unique for each Execution Report message |
| 20 | ExecTransType | Identifies transaction type Valid values: 3 = Status |

TABLE Q-continued

| | | |
|---|---|---|
| 150 | ExecType | Describes the specific ExecutionRpt while OrdStatus will always identify the current order status Valid values: 0 = Previously Presented 1 = Partially filled 2 = Filled 4 = Canceled 6 = Pending Cancel (e.g. result of Order Cancel Request) 7 = Stopped 8 = Rejected 9 = Suspended C = Expired |
| 39 | OrdStatus | Identifies current status of order. Supported values: 0 = Previously Presented 1 = Partially filled 2 = Filled 4 = Canceled 6 = Pending Cancel (e.g. result of Order Cancel Request) 7 = Stopped 8 = Rejected 9 = Suspended C = Expired |
| 55 | Symbol | |
| 54 | Side | |
| 38 | OrderQty | |
| 40 | OrdType | |
| 44 | Price | Required if specified on the order |
| 18 | ExecInst | If specified on the order |
| 59 | TimeInForce | Absence of this field indicates Day order |
| 126 | ExpireTime | If specified on the order |
| 47 | Rule80A | If specified on the order (aka OrderCapacity) |
| 14 | CumQty | Currently executed shares for chain of orders. |
| 111 | MaxFloor | If specified on the order |
| 210 | MaxShow | If specified on the order |
| 211 | PegDifference If specified on the order | |
| 151 | LeavesQty | Amount of shares open for further execution. |
| 6 | AvgPx | |
| 60 | TransactTime | Time the transaction represented by this ExecutionReport occurred |
| 21 | HandlInst | If specified on the order 110 MinQty If specified on the order |
| 388 | DiscretionInst | If specified on the order |
| 389 | DiscretionOffset | If specified on the order |
| | Standard Trailer | |

Cancel Order

BlockLink supports the order management function of canceling an order. ABCD sends BLK a FIX Cancel Order message and will receive either a FIX execution response with a cancelled order status or an order cancel reject if the order isn't cancelable. The Order Cancel Reject is sent by BlockLink to the sponsoring broker when the cancel order cannot be completed. In addition to the fields provided below, BlockLink may include those fields it derives from the order or provided within the cancel request.

The specification for the cancel and cancel reject messages are given in Table R.

TABLE R

Order Cancel Request

| Tag | Field Name | Req'd | Comments |
|---|---|---|---|
| | Standard Header | Y | MsgType = F |
| 41 | OrigCIOrdID | Y | CIOrdID of the previous order (NOT the initial order of the day) when canceling or replacing an order. |
| 37 | OrderID | N | Unique identifier of most recent order as assigned by broker. |
| 11 | CIOrdID | Y | Unique ID of cancel request as assigned by the institution. |
| 55 | Side | Y | BLK ignores this field. |
| 54 | Symbol | Y | BLK ignores this field. |
| 60 | TransactTime | Y | Time this order request was initiated/released by the trader or trading system. |
| | Standard Trailer | Y | |

Order Cancel Reject

| Tag | Field Name | Comments |
|---|---|---|
| | Standard Header | MsgType = 9 |
| 37 | OrderID | If CxlRejReason = "Unknown order", specify "NONE". |
| 11 | CIOrdID | Unique order id assigned by institution to the cancel request or to the replacement order. |
| 41 | OrigCIOrdID | CIOrdID which could not be canceled/re-placed. CIOrdID of the previous order (NOT the initial order of the day) when canceling or replacing an order. |
| 39 | OrdStatus | OrdStatus value after this cancel reject is applied. |
| 434 | CxlRejResponseTo | |
| 102 | CxlRejReason | |
| 58 | Text | |
| | Standard Trailer | |

Clearing

ABBL must be set up to clear in the same way as ABCD—it will exist within ACT as a regular MPID, and clearing reports will be forwarded to the DTCC via ACT.

Within SelectNet, ABBL exists as a Previously Presented firm type "C" that can enter and receive SelectNet orders in any security and does not post a quote. It can be preferenced only by firms that are set up as type "L" within SelectNet, namely LQTR and LQTM: other market participants will not be able to preference ABBL.

SelectNet reports LQT trades to tape and for clearing.

When the ABBL trade was executed by a sell-side firm (for example, XXYZ is using ABBL as alias to provide permanent anonymity), ABCD will be responsible for generating a clearing report ABBL_XXYZ to net out ABBL.

Message Text Field, Routing and Order Display Criteria

The "Text" field of an unsolicited Previously Presented Single Order allows users to enter routing criteria and IOI display options. When absent, routing and display options are taken from default values, which can be customized through a help desk GUI per client and per security. BLK is configured with default values that have been designed to optimize fill rates and will work well without this optional customization.

FIX Previously Presented Single Order Message's text message may be used to specify display and routing options. Display options allow users to show less size and a less aggressive price. Routing options instruct BLK on the routing criteria for selecting the contras most likely to fill an order.

If a text field does not carry any routing options, BLK will utilize default routing options. Some text field options may overlap with FIX-supported order attributes (such as the displayed quantity). NOTE: Where there is overlap infunctionality between the proper fields within the FIX message and the "Text" field encoding defined here, the FIXfields take precedence and the Text encoded options are ignored. However, if a FIX optionalfield is unspecified but the corresponding field is passed instead in the text message field in validformat, BLK will take the instructions from the text message.

BLK will reject the order if it is unable to parse the "Text" because of invalid characters or incorrect formatting.

BLK will expire the order if the LQT/BLK network is unable to find a contra party based on the given routing options, either for lack of a target that meets the criteria, or because this target is not signed up to receive BLK.

Commonly used delimiters such as '.', ',', ' ' are accepted but not required. For example N3*69 will be parsed in the same way as N3.*69 or N3*69.

Supported Routing Options

Display Size. D<display size> The code "D10M" in the Text field would direct BLK to display 10,000 shares. Recipients will see the character "D" followed by a space in the IOI Text field, so traders get an indication that there is additional size behind the order just delivered and may counter with more size. If the display size is larger than the order size, the originator's order will be rejected.

Price Discretion. <price offset> The trader may direct BLK to display a less aggressive price than the actual limit price. This feature is activated through the "Text" field using the dollar sign indicator. For example "$02" in the text field on an order to buy 10,000 shares EBAY at $50.06 would result in an order preferenced to the best contra to buy 10,000 shares EBAY at $50.04. The text field sent to that recipient would show simply the dollar sign, so the recipient knows a better price is available via a counter order. This feature is only available for limit orders.

Explicit MPID Targeting. <MPID> Specifying the four characters Nasdaq MPID explicitly targets the destination. The IOI recipient will see its MPID in the Text field and will know their firm was targeted explicitly rather than through other data query.

*69 option. *69<number> Originating orders may include "*69" in the text field to direct the BLK/LQT network to display this order to the last counterparty that the order entry firm executed a trade with in that stock, on this side, during this trading day. An optional number following this option as *69<number> indicates that the IOI should be routed to the most recent <number> trading partners within BLK. For example *693 will route to the three most recent BLK contras in this symbol and side. If *69 is the only routing option and the previous counterparty is ineligible to receive BLK IOIs, the order will be expired.

option. #<ExecID>, in the Text field, requests routing to the contra of the fill execution report's ExecID field. BLK will read anything following the # as characters specifying an ExecID reference number, up until it reaches a delimiter; it will not pick up key characters such as the N, B or R options unless a delimiter is used to indicate that the # option character string is complete; avoid any potential confusion it is recommended to use the # option at the end of the text field.

L option. L<number> These characters instruct Liquidity Tracker to add its most recent execution on the contra side in that symbol to the distribution list. L<number> adds the <number> most recent eligible BLK contras.

N option. N<number> instructs Liquidity Tracker to send the order to the <number> firms that have most recently traded net at least as many shares as the order on the contra side in the security.

B option. B<number> instructs the BLK network to route IOIs to the buy-side institutions that have most recently accumulated at least as many shares as the order on the contra side in the security.

R option. R<number> instructs the BLK network to route IOIs to the buy-side institutions that have most recently traded on this network on the contra side in the security.

X, cut on query lookback. X<minutes> used in conjunction with the N or B options limit the search to consider only data on trades executed within this number of minutes. If an order carries the "X" option and does not carry either the "N" or "B" option, the Text is invalid and BLK will reject the order.

Cycle. C<seconds> instructs the LQT/BLK network to phase delivery of IOIs over time, with a delay of the specified number of seconds between one IOI and the next.

Combining Routing Options

BLK limits the number of IOI recipients per Order to Liquidity Tracker's "MaxTargets" system parameter (initial configuration MaxTargets=5). The recipient list will be constructed by parsing the text message from left to right, and will be trimmed to contain at most the top "MaxTargets".

Default Text Message String

If the order does not carry any routing options in the text message, BLK will use default routing options (N2B2X30). This default string is a system configuration parameter and is subject to change.

A summary of the display and routing options is given in Table S.

TABLE S

Summary of display and routing options

| Encoding | Meaning |
| --- | --- |
| *69 or *69<number> | Target the last <number> of firms this order entry firm traded with in that security and side. <number> = 1 by default(*69) |
| # or #<string> | Target the last firm this order entry traded with in that security and side, and where the firms ExecID on the trade ended with <string> |
| N<number> | <number> is a whole value indicating the max number of targets to send the IOI using the default LiquidityTracker query. |
| L<number> | Target <number> most recent parties who have executed Liquidity Tracker trades for symbol on contra side. |
| <MPID> | Target this MPID explicitly |
| $<Price Delta> | Display a price that is less aggressive (by Price Delta cents) than the actual price on the order. |
| D<DisplayedQuantity> | The quantity to display and use in the quantity field of Recipient orders. |
| C or C<number> | Cycle: staggers the IOI delivery to Previously Presented target. Without cycling, all IOI recipients are notified immediately. The optional number attribute overrides the system default time delay (in seconds) between targets. |
| B<number> | Across all BLK installations, target <number> buy-side firms that have most recent NET accumulations. |
| R<number> | Across all BLK installations, target <number> buy-side firms that have demonstrated a recent interest (order or execution) in the security. |
| X<number> | Cut the lookback to seek contras that have done the required size in the last <number> minutes. |

TABLE OF ACRONYMS

| Acronym | Meaning |
| --- | --- |
| IFID | ID of an IOI forwarding firm, meaning a firm that hosts a routing engine |
| BBO | Best bid or offer on the electronic market |
| HTTPS | Secure (encrypted) hypertext transfer protocol |
| MM | Market Maker |
| SOAP | Microsoft's protocol for XML messaging |
| TFID | Same meaning as IFID |
| LQTR | Acronym used to identify the Liquidity Tracker trading system on the Nasdaq Stock Market, for priced limit orders |
| LQTM | Acronym used to identify the Liquidity Tracker trading system on the Nasdaq Stock Market, for midpoint pegged orders |
| ACT | Nasdaq's Automated Confirmation and Transaction system |
| MPID | Market participant ID, a four-letter acronym used to identify a firm on the Nasdaq Stock Market |
| OMS | Order Management System |
| NM | National Market for Nasdaq listed securities |
| SA | Security Administrator: a user with special entitlements within a software system including the ability to create or remove other users |
| SSL | Secure Socket Layer, standard technology for enabling secured communications between computers |
| NMBBO | National Market Best Bid or Offer, is the highest bid or lowest offer posted to buy or sell a security on any electronic marketplace that participates in the National Market System |
| INCA | MPID (see above) given to Instinet |
| BTRD | MPID (see above) given to Bloomberg Tradebook |
| IOC | Immediate or Cancel order |
| ACR | ACT (see above) Risk management service |
| ADS | Automated Directory Service |
| NBBO | Same as NMBBO, see above |
| MID | Midpoint between the National Best Bid and Offer prices in a security |
| NFSC | Acronym used to identify Fidelity's brokerage branch on the Nasdaq Stock Market |
| OATS | Order Audit Trail System, for mandatory reporting of orders handled by brokers in Nasdaq listed stocks to the NASD. |
| INBL | Acronym used to identify the routing engine hosted by Instinet on the Nasdaq Stock Market |
| UM | Unsolicited Message, in reference to Nasdaq's Application Programming Interface documentation for the SelectNet Message Service |

What is claimed is:

1. A computer-implemented method of managing securities market information across a network of securities market data providers, comprising the steps of:
   (a) electronically receiving, from a first securities market participant over a computer network, first data including an electronically executable order and order display attributes and targeting parameters in a first securities market system that protects said first data behind a firewall, said first securities market system comprising at least one of an auction server and a matching engine for initiating searches for contra-side trading interests and enabling executions between said first market participant and qualified contra parties;
   (b) electronically receiving, from a second securities market participant, second data including confidential information regarding said second securities market participant in a second securities market system that protects said-second data behind a firewall, said second securities market system comprising at least one of a routing engine and an interface to a remote database for the purpose of evaluating whether said second participant is qualified to receive information about said first participant's order as instructed by said order display attributes attached to said first participant's order, said second system not informing said second participant of said first participant's order unless said second participant is determined to be qualified to receive said information about said first participant's order;
   (c) electronically issuing, over said computer network, an advertisement request message from said first system to said second system, said advertisement message comprising said order display attributes and said targeting parameters of said first data from said first system;
   (d) electronically prompting said second system via the advertisement request message to use said first data from said first securities market system and said second data from said second securities market system and one or more rules to check whether said second securities market participant has in a system for managing orders an order on the contra side of said first participant's order, and based at least in part on a result of said check, determining whether said second securities market participant is qualified to receive information about the first participant's order as instructed by the order display attributes attached to said first participant's order; and
   (e) displaying on said second system said information about said first participant's order as instructed by said order display attributes attached to said first participant's order based on said qualification from step (d).

2. A computer system for managing securities market information across a network of securities market data providers, comprising:
   (a) a first securities market system for electronically receiving, from a first securities market participant over a computer network, first data including an electronically executable order and order display attributes and targeting parameters, said first securities market system comprising at least one of an auction server and a matching engine for initiating searches for contra-side trading interests and enabling executions between said first market participant and qualified contra parties; and
   (b) a second securities market system for electronically receiving, from a second securities market participant, second data including confidential trading interest information regarding market participants, said second securities market system comprising at least one of a routing engine and an interface to a remote database for the purpose of evaluating whether said second participant is qualified to receive information about said first participant's order as instructed by said order display attributes attached to said first participant's order, said second system not informing said second participant of said first participant's order unless said second participant is determined to be qualified to receive said information about said first participant's order; said first system being configured for electronically issuing an advertisement request message to said second system, said advertisement message comprising said order display attributes and said targeting parameters from said first system; said second system being configured to be electronically prompted via the advertisement request message to use said first data from said first securities market system and said second data from said second securities market system and one or more rules to check whether said second securities market participant has in a system for managing orders an order on the contra side of said first participant's order, and based at least in part on a result of said check, determining whether said second securities market participant is qualified to receive information about the first participant's order as instructed by the order display attributes attached to said first participant's order; and said second system being configured for displaying said information about said first participant's order as instructed by said order display attributes attached to said first participant's order based on said qualification.

3. The method of claim 1, wherein said second data comprise an electronically executable order.

4. The method of claim 1, wherein said second data comprise an indication of interest.

5. The method of claim 1, wherein said second data comprise information contained in an Order Management System (OMS).

6. The method of claim 1, wherein said second data comprise information contained about unfilled orders.

7. The method of claim 1, wherein said second data comprise data on executed trades.

8. The method of claim 1, wherein said second data comprise data on past usage data.

9. The method of claim 1, wherein said first system attaches default order display attributes and targeting parameters if said order display attributes and targeting parameters have not been provided by said first market participant.

10. The method of claim 1, wherein said order display attributes comprise routing instructions.

11. The method of claim 1, wherein said order display attributes comprise price.

12. The method of claim 11, wherein said price is set in relation to a trading benchmark.

13. The method of claim 1, wherein said order display attributes comprise time in force.

14. The method of claim 1, wherein said order display attributes comprise symbol.

15. The method of claim 1, wherein said order display attributes comprise side.

16. The method of claim 1, wherein said order display attributes comprise quantity.

17. The method of claim 1, wherein said order display attributes comprise minimum quantity.

18. The method of claim 1, wherein said order display attributes comprise advertisement request message duration.

19. The method of claim 1, wherein said order display attributes comprise a price aggression flag.

20. The method of claim 1, wherein said order display attributes comprise display instructions.

21. The method of claim 1, wherein said order display attributes comprise advertisement request message ID.

22. The method of claim 1, wherein said order display attributes comprise current midpoint price of symbol.

23. The method of claim 1, wherein said targeting parameters comprise an advertisement request message reason.

24. The method of claim 1, wherein said targeting parameters comprise minimum requirements for validating said second participant as qualified to receive information about the first participant's order.

25. The method of claim 1, wherein said step of determining if said second participant is qualified to receive information about said first participant's order comprises checking for appropriate advertisement request message reason.

26. The method of claim 1, wherein said routing engine or said interface to said remote database also serves as an order entry intermediary in the form of a Graphic User Interface (GUI).

27. The method of claim 26, wherein said routing engine enables said market participants to configure default order display attributes and targeting parameters.

28. The method of claim 26, wherein said routing engine supports specifying user attributes, including an interest list that gives the set of market securities said second participant is interested in.

29. The method of claim 28, further comprising permitting said second market participants to use said interest list to associate default order display attributes and targeting parameters with items on said list.

30. The method of claim 29, further comprising permitting said second market participants to use said interest list to make changes to said default order display attributes and targeting parameters in a single step.

31. The method of claim 29, further comprising permitting said second market participants to use said interest list as a filter for managing the receipt of said advertisement request messages from said first system.

32. The method of claim 1, wherein said display of said information regarding said first participant's order on said second system is removed when said first participant cancels said electronically executable order.

33. The method of claim 1, wherein said display of said information regarding said first participant's order on said second system is removed when said electronically executable order is filled by a response from one of said second participants.

34. The method of claim 1, wherein said display of said information regarding said first participant's order expires.

35. The method of claim 1, wherein said display of said information regarding said first participant's order on said second system is removed when said first participant modifies any of said order display attributes of said electronically executable order.

36. The method of claim 1, wherein said display of said information regarding said first participant's order on said second system is removed and replaced when said first participant modifies any of said order display attributes of said electronically executable order.

37. The method of claim 1, wherein said displaying of said order information about said first participant's electronically executable order on said second system is enabled via an email message alert to said second market participant.

38. The method of claim 37, further comprising permitting said second market participant to use said email message alert to launch an order entry dialog for submitting a responding order.

39. The method of claim 1, wherein said displaying of said order information about said first participant's electronically executable order on said second system is enabled via a pager alert to said second market participant.

40. The method of claim 39, further comprising permitting said second market participant to use said pager alert to launch an order entry dialog for submitting a responding order.

41. The method of claim 1, wherein said displaying of said order information about said first participant's electronically executable order on said second system is enabled via a mobile phone alert to said second market participant.

42. The method of claim 41, further comprising permitting said second market participant to use said mobile phone alert to launch an order entry dialog for submitting a responding order.

43. The method of claim 1, wherein said displaying of said order information about said first participant's electronically executable order on said second system is enabled via a telephone call to said second market participant.

44. The method of claim 1, wherein said displaying of said order information about said first participant's electronically executable order on said second system is enabled via an instant message on said second market participant's computer.

45. The method of claim 44, further comprising permitting said second market participant to use said instant message to launch an order entry dialog for submitting a responding order.

46. The method of claim 1, wherein said displaying of said order information about said first participant's electronically executable order on said second system is enabled via a pop up alert on said second market participant's computer.

47. The method of claim 46, further comprising permitting said second market participant to use said pop up alert to launch an order entry dialog for submitting a responding order.

48. The method of claim 1, wherein the first system communicates with the first securities market participant using encrypted communication.

49. The method of claim 1, wherein the second system communicates with the second securities market participants using encrypted communication.

50. The method of claim 1, wherein said first system communicates with said second system using encrypted communication.

51. The method of claim 1, wherein said routing engine or interface to said remote database is hosted by a broker with its own client communication servers, such that said routing engine or interface to said remote database acts as interface to deliver advertisement request messages to said broker's servers which forward the messages to said brokers exiting client GUIs.

52. The method of claim 1, wherein said routing engine or said interface to said remote database is hosted at a third-party site.

53. The method of claim 1, where said first securities market participant simultaneously enters said electronically executable order into said first system and requests that said electronically executable order be exposed to an electronic market or alternative trading system.

54. The method of claim 53, wherein said simultaneous exposure of said first participant's electronically executable order is enabled by the use of a placeholder order on said electronic market or alternative trading system.

55. The method of claim 53, further comprising permitting said first participant to control how much of said electronically executable order is displayed via said first system and said electronic market or alternative trading system.

56. The method of claim 53, further comprising permitting said first participant to control the order display attributes used to determine how orders are displayed on said electronic market or alternative trading system.

57. The method of claim 1, wherein said electronically executable order in said first data comprises an aggregate order.

58. The method of claim 57, wherein said first system is configured to enable pairs trading or basket trading.

59. The method of claim 57, wherein said aggregate order comprises a plurality of individual orders to buy or sell a set of securities.

60. The method of claim 57, wherein said first system advertises said individual orders independently to said second market participants as in claim 1; but only executes said aggregate order.

61. The method of claim 57, wherein said first system advertises said individual orders independently to said second market participants but only enables executions according to rules that couple said individual order.

62. The method of claim 1, further comprising permitting said second participant to place an order in response to a display of said information about said first participant's order.

63. The method of claim 62, wherein said first system records and monitors activity of said second participants to determine how often each of said second market participants responds to said display of said first participant's order information with a responding order.

64. The method of claim 62, wherein said first system records and monitors activity of said second participants to determine whether said second participants show a tendency to penny-jumping.

65. The method of claim 63, wherein said first system places one of said second participants in a penalty box in the event said second participant receives said display of information about said first participant's order and does not respond such that said second participant in said penalty box is prevented from receiving any further displays of information for some system defined period of time.

66. The method of claim 65, wherein said second participant is placed into the penalty box or not in accordance with a level of aggressiveness of said first participant's order.

67. The method of claim 62, wherein said response order is a match to said first participant's order, and said matching engine or auction server executes a trade between said first participant's order and said response order.

68. The method of claim 62, wherein, in a case in which said response order does not match the terms of said first participant's order, a negotiation is initiated between said first and second participants.

69. The method of claim 62, wherein said second participant uses said routing engine or said interface to said remote databases to enter said response order.

70. The method of claim 62, wherein said response order is incorporated into an order book of said matching engine or auction server applying matching rules to determine the opportunity and nature of execution.

71. The method of claim 62, wherein in a case in which said first participant's order cannot be filled by one of said response orders, said first participant's order is posted on an exchange or alternative trading system for execution.

72. The method of claim 1, wherein the entirety of said first participant's electronically executable order is routed to said second securities market systems for advertisement while simultaneously smaller pieces of said electronically executable order are sent to an algorithm or algorithmic trading engine.

73. The method of claim 30, wherein said placeholder order takes the form of a suspended order that enables said matching engine or auction sever to register the existence of said order without executing said order.

74. The method of claim 62, wherein, in a case in which said first participant's order cannot be filled by one of said response orders, said first participant's order is sent to an algorithm or algorithmic trading engine to be worked in smaller pieces.

75. The method of claim 1, wherein said first participant's order display attributes comprises an indication of a rate at which said algorithm or algorithmic trading engine should work said smaller pieces of said electronically executable order.

76. The method of claim 72, wherein said first participant's order display attributes comprises an indication of a rate at which said algorithm or algorithmic trading engine should work said smaller pieces of said electronically executable order.

77. The method of claim 74, wherein said first participant's order display attributes comprises an indication of a rate at which said algorithm or algorithmic trading engine should work said smaller pieces of said electronically executable order.

78. The method of claim 75, wherein, in a case in which said algorithm or said algorithm switching engine is not able to fill said smaller pieces of said electronically executable order at the rate indicated in the order display attributes, said algorithm or algorithmic trading engine changes its management of said smaller pieces of said electronically executable order to accelerate execution.

79. The method of claim 62, wherein, in a case in which said first participant's order cannot be filled by one of said response orders, portions of said first participant's order are simultaneously posted on an exchange or alternative trading system for execution and sent to an algorithm or algorithmic trading engine to be worked in smaller pieces.

80. The method of claim 79, wherein, in a case in which said matching engine receives a response order from one of said second market participants after portions of said first participant's order were posted on an exchange or alternative trading system for execution said smaller orders that are still open are cancelled as needed to match with said response order.

81. The method of claim 79, wherein, in a case in which said matching engine receives a response order from one of said second market participants after portions of said first participant's order were sent to be divided into smaller pieces through an algorithm or algorithmic trading engine said smaller pieces of said order that are still open are cancelled as needed to enable a match with said response order.

82. The method of claim 1, wherein said first participant's order display attributes comprises a price range in which an order is immediately executable.

83. The method of claim 1, wherein said first participant's order display attributes comprises a price range in which the order is negotiable.

84. The method of claim 1, wherein said first participant's order display attributes comprises two prices, one for smaller sized executions and one for larger sized executions.

85. The method of claim 1, wherein said first participant's order display attributes comprises two prices, one price being a display price attribute and one being a discretionary price.

86. The method of claim 62, wherein said second participant's responding order contains instructions as to when the order is immediately executable.

87. The method of claim 62, wherein said second participant's responding order contains instructions as to when the order can initiate a negotiation.

88. The method of claim 83, wherein the price range in which the order is immediately executable comprises a first price range for a first order size range and a second price range for a second order size range.

89. The method of claim 1, wherein said first system does not receive any information in response to said advertisement request message sent to said second system unless a trade is executed between some portion of said first electronically executable order and a responding order from one of said second market participants.

90. The method of claim 1, wherein the first system receives information in response to said advertisement request message sent to said second system, the information received in response comprising an indication of whether said advertisement request message successfully identified one of said second participants qualified to receive said information about said first participant's order.

91. The method of claim 90, wherein the first system receives said information immediately.

92. The method of claim 90, wherein the first system receives said information after a system defined delay period.

93. The method of claim 90, wherein said first system imposes restrictions on said first participant's electronically executable order to discourage said first participant from using the system to extract information about potential counter parties.

94. The method of claim 90, wherein the timing and content of said information received by said first participant is tied to said order display attributes of said first participant's electronically executable order.

95. The method of claim 93, wherein said restrictions comprise at least one of minimum quantity, price aggression and time in force.

96. The method of claim 95, wherein said first system rejects said first participant's electronically executable order if said electronically executable order does not meet at least one of said restrictions.

97. The method of claim 90, wherein, when there are no such qualified second participants, the confidential trading interest information is declined.

98. The method of claim 90, wherein the information received in response further comprises an indication of whether said display attributes have been displayed.

99. The method of claim 90, wherein the information received in response further comprises an indication of a number of parties to whom the display attributes have been displayed.

100. The method of claim 99, wherein the indication of the number of parties is delayed.

101. The method of claim 1, wherein the display attributes are displayed only to parties who tend to act on the display attributes.

102. The method of claim 1, wherein the confidential trading interest information comprises an indication of a interest in selling a first item and buying a second item as part of a transaction.

103. The method of claim 102, wherein one of the selling and the buying is conditioned on the other of the selling and the buying.

104. The system of claim 2, wherein said second data comprise an electronically executable order.

105. The system of claim 2, wherein said second data comprise an indication of interest.

106. The system of claim 2, wherein said second data comprise information contained in an Order Management System (OMS).

107. The system of claim 2, wherein said second data comprise information contained about unfilled orders.

108. The system of claim 2, wherein said second data comprise data on executed trades.

109. The system of claim 2, wherein said second data comprise data on past usage data.

110. The system of claim 2, wherein said first system is configured to attach default order display attributes and targeting parameters if said order display attributes and targeting parameters have not been provided by said first market participant.

111. The system of claim 2, wherein said order display attributes comprise routing instructions.

112. The system of claim 2, wherein said order display attributes comprise price.

113. The system of claim 112, wherein said price is set in relation to a trading benchmark.

114. The system of claim 2, wherein said order display attributes comprise time in force.

115. The system of claim 2, wherein said order display attributes comprise symbol.

116. The system of claim 2, wherein said order display attributes comprise side.

117. The system of claim 2, wherein said order display attributes comprise quantity.

118. The system of claim 2, wherein said order display attributes comprise minimum quantity.

119. The system of claim 2, wherein said order display attributes comprise advertisement request message duration.

120. The system of claim 2, wherein said order display attributes comprise a price aggression flag.

121. The system of claim 2, wherein said order display attributes comprise display instructions.

122. The system of claim 2, wherein said order display attributes comprise advertisement request message ID.

123. The system of claim 2, wherein said order display attributes comprise current midpoint price of symbol.

124. The system of claim 2, wherein said targeting parameters comprise an advertisement request message reason.

125. The system of claim 2, wherein said targeting parameters comprise minimum requirements for validating said second participant as qualified to receive information about the first participant's order.

126. The system of claim 2, wherein said second system determines if said second participant is qualified to receive information about said first participant's order by checking for appropriate advertisement request message reason.

127. The system of claim 2, wherein said routing engine or said interface to said remote database also serves as an order entry intermediary in the form of a Graphic User Interface (GUI).

128. The system of claim 127, wherein said routing engine enables said market participants to configure default order display attributes and targeting parameters.

129. The system of claim 127, wherein said routing engine supports specifying user attributes, including an interest list that gives the set of market securities said second participant is interested in.

130. The system of claim 129, wherein said second system permits said second market participants to use said interest list to associate default order display attributes and targeting parameters with items on said list.

131. The system of claim 130, wherein said second system permits said second market participants to use said interest list to make changes to said default order display attributes and targeting parameters in a single step.

132. The system of claim 130, wherein said second system permits said second market participants to use said interest list as a filter for managing the receipt of said advertisement request messages from said first system.

133. The system of claim 2, wherein said display of said information regarding said first participant's order on said second system is removed when said first participant cancels said electronically executable order.

134. The system of claim 2, wherein said display of said information regarding said first participant's order on said second system is removed when said electronically executable order is filled by a response from one of said second participants.

135. The system of claim 2, wherein said display of said information regarding said first participant's order expires.

136. The system of claim 2, wherein said display of said information regarding said first participant's order on said second system is removed when said first participant modifies any of said order display attributes of said electronically executable order.

137. The system of claim 2, wherein said display of said information regarding said first participant's order on said second system is removed and replaced when said first participant modifies any of said order display attributes of said electronically executable order.

138. The system of claim 2, wherein said displaying of said order information about said first participant's electronically executable order on said second system is enabled via an email message alert to said second market participant.

139. The system of claim 138, wherein said second system permits said second market participant to use said email message alert to launch an order entry dialog for submitting a responding order.

140. The system of claim 2, wherein said displaying of said order information about said first participant's electronically executable order on said second system is enabled via a pager alert to said second market participant.

141. The system of claim 140, wherein said second system permits said second market participant to use said pager alert to launch an order entry dialog for submitting a responding order.

142. The system of claim 2, wherein said displaying of said order information about said first participant's electronically executable order on said second system is enabled via a mobile phone alert to said second market participant.

143. The system of claim 142, wherein said second system permits said second market participant to use said mobile phone alert to launch an order entry dialog for submitting a responding order.

144. The system of claim 2, wherein said displaying of said order information about said first participant's electronically executable order on said second system is enabled via a telephone call to said second market participant.

145. The system of claim 2, wherein said displaying of said order information about said first participant's electronically executable order on said second system is enabled via an instant message on said second market participant's computer.

146. The system of claim 145, wherein said second system permits said second market participant to use said instant message to launch an order entry dialog for submitting a responding order.

147. The system of claim 2, wherein said displaying of said order information about said first participant's electronically executable order on said second system is enabled via a pop up alert on said second market participant's computer.

148. The system of claim 147, wherein said second system permits said second market participant to use said pop up alert to launch an order entry dialog for submitting a responding order.

149. The system of claim 2, wherein the first system communicates with the first securities market participant using encrypted communication.

150. The system of claim 2, wherein the second system communicates with the second securities market participants using encrypted communication.

151. The system of claim 2, wherein said first system communicates with said second system using encrypted communication.

152. The system of claim 2, wherein said routing engine or interface to said remote database is hosted by a broker with its own client communication servers, such that said routing engine or interface to said remote database acts as interface to deliver advertisement request messages to said broker's servers which forward the messages to said brokers exiting client GUIs.

153. The system of claim 2, wherein said routing engine or said interface to said remote database is hosted at a third-party site.

154. The system of claim 2, where said first securities market participant simultaneously enters said electronically executable order into said first system and requests that said electronically executable order be exposed to an electronic market or alternative trading system.

155. The system of claim 154, wherein said simultaneous exposure of said first participant's electronically executable order is enabled by the use of a placeholder order on said electronic market or alternative trading system.

156. The system of claim 154, wherein said first system permits said first participant to control how much of said electronically executable order is displayed via said first system and said electronic market or alternative trading system.

157. The system of claim 154, wherein said first system permits said first participant to control the order display attributes used to determine how orders are displayed on said electronic market or alternative trading system.

158. The system of claim 2, wherein said electronically executable order in said first data comprises an aggregate order.

159. The system of claim 158, wherein said first system is configured to enable pairs trading or basket trading.

160. The system of claim 159, wherein said aggregate order comprises a plurality of individual orders to buy or sell a set of securities.

161. The system of claim 158, wherein said first system advertises said individual orders independently to said second market participants as in claim 1; but only executes said aggregate order.

162. The system of claim 158, wherein said first system advertises said individual orders independently to said second market participants but only enables executions according to rules that couple said individual order.

163. The system of claim 2, wherein said second system permits said second participant to place an order in response to a display of said information about said first participant's order.

164. The system of claim 163, wherein said first system records and monitors activity of said second participants to determine how often each of said second market participants responds to said display of said first participant's order information with a responding order.

165. The system of claim 163, wherein said first system records and monitors activity of said second participants to determine whether said second participants show a tendency to penny-jumping.

166. The system of claim 164, wherein said first system places one of said second participants in a penalty box in the event said second participant receives said display of information about said first participant's order and does not respond such that said second participant in said penalty box is prevented from receiving any further displays of information for some system defined period of time.

167. The system of claim 166, wherein said second participant is placed into the penalty box or not in accordance with a level of aggressiveness of said first participant's order.

168. The system of claim 163, wherein said response order is a match to said first participant's order, and said matching engine or auction server executes a trade between said first participant's order and said response order.

169. The system of claim 163, wherein, in a case in which said response order does not match the terms of said first participant's order, a negotiation is initiated between said first and second participants.

170. The system of claim 163, wherein said routing engine or said interface to said remote databases is configured such that said second participant uses said routing engine or said interface to said remote databases to enter said response order.

171. The system of claim 163, wherein said response order is incorporated into an order book of said matching engine or auction server applying matching rules to determine the opportunity and nature of execution.

172. The system of claim 163, wherein in a case in which said first participant's order cannot be filled by one of said response orders, said first participant's order is posted on an exchange or alternative trading system for execution.

173. The system of claim 2, wherein the entirety of said first participant's electronically executable order is routed to said second securities market systems for advertisement while simultaneously smaller pieces of said electronically executable order are sent to an algorithm or algorithmic trading engine.

174. The system of claim 131, wherein said placeholder order takes the form of a suspended order that enables said matching engine or auction sever to register the existence of said order without executing said order.

175. The system of claim 163, wherein, in a case in which said first participant's order cannot be filled by one of said response orders, said first participant's order is sent to an algorithm or algorithmic trading engine to be worked in smaller pieces.

176. The system of claim 2, wherein said first participant's order display attributes comprises an indication of a rate at which said algorithm or algorithmic trading engine should work said smaller pieces of said electronically executable order.

177. The system of claim 173, wherein said first participant's order display attributes comprises an indication of a rate at which said algorithm or algorithmic trading engine should work said smaller pieces of said electronically executable order.

178. The system of claim 175, wherein said first participant's order display attributes comprises an indication of a rate at which said algorithm or algorithmic trading engine should work said smaller pieces of said electronically executable order.

179. The system of claim 176, wherein, in a case in which said algorithm or said algorithm switching engine is not able to fill said smaller pieces of said electronically executable order at the rate indicated in the order display attributes, said algorithm or algorithmic trading engine changes its management of said smaller pieces of said electronically executable order to accelerate execution.

180. The system of claim 163, wherein, in a case in which said first participant's order cannot be filled by one of said response orders, portions of said first participant's order is simultaneously posted on an exchange or alternative trading system for execution and sent to an algorithm or algorithmic trading engine to be worked in smaller pieces.

181. The system of claim 180, wherein, in a case in which said matching engine receives a response order from one of said second market participants after portions of said first participant's order were posted on an exchange or alternative trading system for execution said smaller orders that are still open are cancelled as needed to match with said response order.

182. The system of claim 180, wherein, in a case in which said matching engine receives a response order from one of said second market participants after portions of said first participant's order were sent to be divided into smaller pieces through an algorithm or algorithmic trading engine said smaller pieces of said order that are still open are cancelled as needed to enable a match with said response order.

183. The system of claim 2, wherein said first participant's order display attributes comprises a price range in which an order is immediately executable.

184. The system of claim 2, wherein said first participant's order display attributes comprises a price range in which the order is negotiable.

185. The system of claim 2, wherein said first participant's order display attributes comprises two prices, one for smaller sized executions and one for larger sized executions.

186. The system of claim 2, wherein said first participant's order display attributes comprises two prices, one price being a display price attribute and one being a discretionary price.

187. The system of claim 163, wherein said second participant's responding order contains instructions as to when the order is immediately executable.

188. The system of claim 163, wherein said second participant's responding order contains instructions as to when the order can initiate a negotiation.

189. The system of claim 184, wherein the price range in which the order is immediately executable comprises a first price range for a first order size range and a second price range for a second order size range.

190. The system of claim 2, wherein said first system does not receive any information in response to said advertisement request message sent to said second system unless a trade is executed between some portion of said first electronically executable order and a responding order from one of said second market participants.

191. The system of claim 2, wherein the first system receives information in response to said advertisement request message sent to said second system, the information received in response comprising an indication of whether said advertisement request message successfully identified one of said second participants qualified to receive said information about said first participant's order.

192. The system of claim 191, wherein the first system receives said information immediately.

193. The system of claim 191, wherein the first system receives said information after a system defined delay period.

194. The system of claim 191, wherein said first system imposes restrictions on said first participant's electronically executable order to discourage said first participant from using the system to extract information about potential counter parties.

195. The system of claim 191, wherein the timing and content of said information received by said first participant is tied to said order display attributes of said first participant's electronically executable order.

196. The system of claim 194, wherein said restrictions comprise at least one of minimum quantity, price aggression and time in force.

197. The system of claim 196, wherein said first system rejects said first participant's electronically executable order if said electronically executable order does not meet at least one of said restrictions.

198. The system of claim 191, wherein, when there are no such qualified second participants, the confidential trading interest information is declined.

199. The system of claim 191, wherein the information received in response further comprises an indication of whether said display attributes have been displayed.

200. The system of claim 191, wherein the information received in response further comprises an indication of a number of parties to whom the display attributes have been displayed.

201. The system of claim 200, wherein the indication of the number of parties is delayed.

202. The system of claim 2, wherein the display attributes are displayed only to parties who tend to act on the display attributes.

203. The system of claim 2, wherein the confidential trading interest information comprises an indication of a interest in selling a first item and buying a second item as part of a transaction.

204. The system of claim 203, wherein one of the selling and the buying is conditioned on the other of the selling and the buying.

205. An article of manufacture for managing market information across a network of data providers, the article of manufacture comprising:

a computer-readable storage medium; and code on the computer-readable storage medium, the code, when executed on one or more computers, controlling the one or more computers for:

(a) electronically receiving, from a first securities market participant over a computer network, first data including an electronically executable order and order display attributes and targeting parameters in a first securities market system that protects said first data behind a firewall, said first securities market system comprising at least one of an auction server and a matching engine for initiating searches for contra-side trading interests and enabling executions between said first market participant and qualified contra parties;

(b) electronically receiving, from a second securities market participant, second data including confidential trading interest information regarding said second securities market participant in a second securities market system that protects said second data behind a firewall, said second securities market system comprising at least one of a routing engine and an interface to a remote database for the purpose of evaluating whether said second participant is qualified to receive information about said first participant's order as instructed by said order display attributes attached to said first participant's order, said second system not informing said second participant of said first participant's order unless said second participant is determined to be qualified to receive said information about said first participant's order;

(c) electronically issuing, over said computer network, an advertisement request message from said first system to said second system, said advertisement request message comprising said order display attributes and said targeting parameters of said first data from said first system;

(d) electronically prompting said second system via the advertisement request message to use said first data from said first securities market system and said second data from said second securities market system and one or more rules to check whether said second securities market participant has in a system for managing orders an order on the contra side of said first participant's order, and based at least in part on a result of said check, determining whether said second securities market participant is qualified to receive information about the first participant's order as instructed by the order display attributes attached to said first participant's order; and (e) displaying on said second system said information about said first participant's order as instructed by said order display attributes attached to said first participant's order based on said qualification from step (d).

* * * * *